(12) United States Patent
Lundgren et al.

(10) Patent No.: US 9,504,949 B2
(45) Date of Patent: Nov. 29, 2016

(54) AIR/OIL SEPARATOR ASSEMBLIES; COMPONENTS; AND METHODS

(75) Inventors: Thomas Lundgren, Bloomington, MN (US); Veli Kalayci, Farmington, MN (US); Paul Peterson, New Prague, MN (US); Daniel Adamek, Bloomington, MN (US); Wade Mosset, Savage, MN (US); Robert Wood, Hoeilaart (BE)

(73) Assignee: Donaldson Company, Inc., Minneapolis, MN (US)

( * ) Notice: Subject to any disclaimer, the term of this patent is extended or adjusted under 35 U.S.C. 154(b) by 73 days.

(21) Appl. No.: 14/127,081

(22) PCT Filed: Jun. 29, 2012

(86) PCT No.: PCT/US2012/045034
§ 371 (c)(1),
(2), (4) Date: Apr. 9, 2014

(87) PCT Pub. No.: WO2013/003769
PCT Pub. Date: Jan. 3, 2013

(65) Prior Publication Data
US 2014/0208702 A1 Jul. 31, 2014

Related U.S. Application Data

(60) Provisional application No. 61/503,008, filed on Jun. 30, 2011, provisional application No. 61/665,501, filed on Jun. 28, 2012.

(51) Int. Cl.
*B01D 46/24* (2006.01)
*F01M 13/04* (2006.01)

(52) U.S. Cl.
CPC .......... *B01D 46/2414* (2013.01); *F01M 13/04* (2013.01); *B01D 2265/026* (2013.01);
(Continued)

(58) Field of Classification Search
CPC .......... B01D 46/0004; B01D 46/2411; B01D 46/2414; B01D 2265/021; B01D 2265/026; B01D 2271/02; B01D 2271/027; F01M 13/04; F01M 2013/0438
See application file for complete search history.

(56) References Cited

U.S. PATENT DOCUMENTS 3,692,186 A * 9/1972 Marzocchi ......... B01D 39/2017
210/494.1
6,918,939 B2 7/2005 Dworatzek et al.
(Continued)

FOREIGN PATENT DOCUMENTS

EP 1 382 810 1/2004
WO WO 99/37386 7/1999
(Continued)

OTHER PUBLICATIONS

International Search Report for PCT/US2012/045034 mailed Jan. 4, 2013 (6 pages).
(Continued)

*Primary Examiner* — Robert Clemente
(74) *Attorney, Agent, or Firm* — Merchant & Gould, P.C.

(57) ABSTRACT

According to the present disclosure, arrangements, systems, components, features and methods for separating hydrophobic fluid such as oil entrained as aerosols from gas streams, such as crankcase ventilation gas streams are described. The components specifically described include a filter cartridge with preferred features for interaction with a filter housing, and a filter housing with preferred features for convenient installation. Methods of assembly and use are also characterized.

32 Claims, 62 Drawing Sheets

(52) U.S. Cl.
CPC ..... *B01D2265/028* (2013.01); *B01D 2271/02* (2013.01); *B01D 2271/027* (2013.01); *F01M 2013/0438* (2013.01); *Y10T 29/49876* (2015.01)

(56) References Cited

U.S. PATENT DOCUMENTS

| | | | |
|---|---|---|---|
| 7,524,349 B2 * | 4/2009 | Schrage | ............ B01D 46/0004 123/198 E |
| 8,404,029 B2 | 3/2013 | Lundgren et al. | |
| 8,499,749 B2 | 8/2013 | Mosset et al. | |
| 8,714,142 B2 | 5/2014 | Jacob et al. | |
| 8,758,467 B2 | 6/2014 | Lundgren et al. | |
| 8,834,610 B2 | 9/2014 | Lundgren et al. | |
| 9,353,658 B2 | 5/2016 | Jacob et al. | |
| 2001/0054418 A1 | 12/2001 | Burgess | |
| 2008/0245037 A1 | 10/2008 | Rogers et al. | |
| 2014/0215982 A1 | 8/2014 | Wood et al. | |

FOREIGN PATENT DOCUMENTS

| | | |
|---|---|---|
| WO | 2006/084282 | 8/2006 |
| WO | WO 2008/157251 | 12/2008 |

OTHER PUBLICATIONS

Pending claims corresponding to U.S. Appl. No. 14/126,674 as of Jun. 24, 2016.
Pending claims corresponding to U.S. Appl. No. 15/167,034 as of Jun. 24, 2016.
Pending claims corresponding to U.S. Appl. No. 14/126,674, as of Jan. 29, 2016.
Pending claims corresponding to U.S. Appl. No. 14/273,801, as of Jan. 29, 2016.
Pending claims corresponding to U.S. Appl. No. 14/485,896, as of Jan. 29, 2016.
Pending claims corresponding to U.S. Appl. No. 14/269,552, as of Jan. 29 , 2016.

* cited by examiner

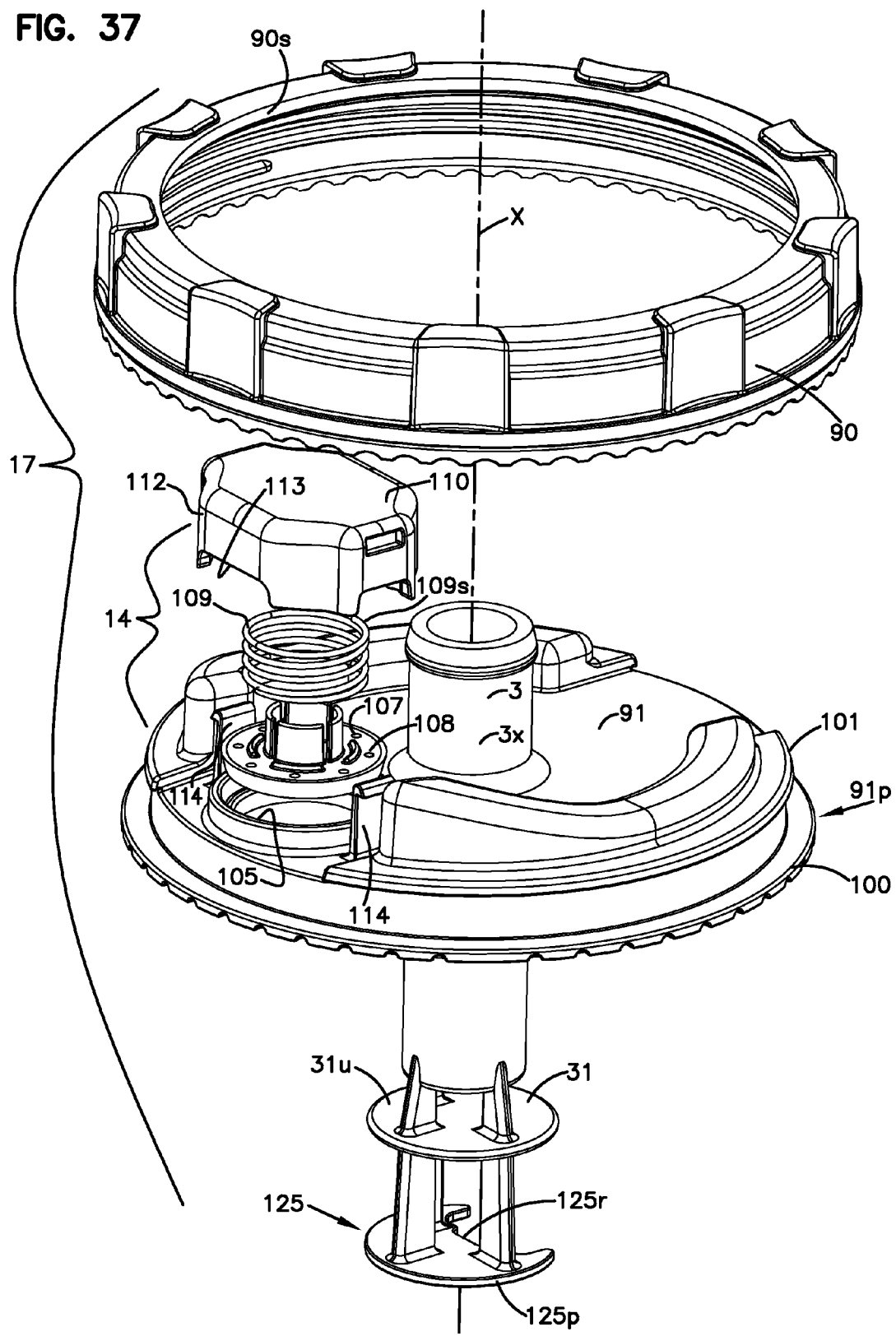

AIR/OIL SEPARATOR ASSEMBLIES; COMPONENTS; AND METHODS

This application is being filed on 17 Dec. 2013, as a National Stage of PCT International Patent application No. PCT/US2012/045034, filed 29 Jun. 2012 in the name of Donaldson Company, Inc., a U.S. national corporation, applicant for the designation of all countries except the US, and Thomas Lundgren, a citizen of the U.S., Veli Kalacyi, a citizen of Turkey, Paul Peterson, Daniel Adamek, Richard Osendorf, Wade Mosset, all citizens of the U.S., and Robert Wood and Gert Willems, both citizens of Belgium, applicants for the designation of the US only.

CROSS REFERENCE TO RELATED APPLICATION

The present application includes, with edits, the disclosure of PCT/US2012/045034, filed Jun. 29, 2012, U.S. Provisional Ser. No. 61/503,008 filed Jun. 30, 2011 and U.S. Provisional Ser. No. 61/665,501, filed Jun. 28, 2012. PCT/US2012/045034, U.S. Provisional Ser. No. 61/503,008 and U.S. Provisional Ser. No. 61/665,501 are incorporated herein by reference. To the extent appropriate, a claim of priority is made to PCT/US2012/045034, 61/503,008 and 61/665,501.

FIELD OF DISCLOSURE

This disclosure relates to arrangements, systems, components, features and methods for separating hydrophobic fluids (such as oils), which are entrained as aerosols, from gas streams (for example air streams). Further, the arrangements also provide for filtration of other contaminants such as carbon material from the gas streams. The arrangements are typically used to filter crankcase ventilation gases from engine systems. Methods for conducting the separations are also provided.

BACKGROUND

Certain gas streams, such as engine blow-by gases (crankcase ventilation filter gases from engine crankcases) carry substantial amounts of entrained oil(s) (liquid) therein as aerosol. Often the oil (liquid) droplets within the aerosol are within the size of 0.1-5.0 microns.

In addition, such gas streams also carry substantial amounts of fine particulate contaminant such as carbon contaminant. Such contaminants often have an average particle size within the range of about 0.5-3.0 microns.

In some systems, it is desirable to vent such gases to the atmosphere. In general, it is preferred that before the gases are vented to the atmosphere, they be cleaned of a substantial portion of aerosol and/or organic particulate contaminant therein.

In other instances, it is desirable to direct the air or gas stream into equipment. When such is the case, it still can be desirable to separate aerosolized liquids and/or particulates from the stream during circulation, in order to provide such benefits as: reduced negative effects on the downstream equipment; improved efficiency; recapture of otherwise lost oil; and/or to address environmental concerns.

Improvements in crankcase ventilation filter systems, (i.e. blow-by or crankcase ventilation filter gas filtration systems) constructed for application with a variety of engine equipment systems are generally sought.

Herein improved features for such arrangements are provided, for convenience of installation, use, assembly and/or operation.

SUMMARY

According to the present disclosure, crankcase ventilation filter assemblies, features, components, and methods of assembly and use are provided. The features and methods described provide for convenient assembly; efficient space usage; and/or preferred operation.

There is no specific requirement that a crankcase ventilation filter assembly, component, feature, method of use or method of assembly include all of the features and techniques disclosed herein, in order to obtain some advantage. In general, selected use of the features and/or methods, without the use of others, can still lead to an advantageous system.

In an example system characterized herein, the cartridge is configured to provide for advantageous assembly, and for use with efficient utilization of the media pack positioned therein, relative to the vertical space available for installation. The filter cartridge can also be provided which includes features appropriate for rotational indexing with a housing base component, and/or a service cover component.

BRIEF DESCRIPTION OF THE DRAWINGS

in FIG. 6 broken cross-lines showing an assembly center and a location of an assembly central axis.

in FIG. 9, the housing base component being depicted devoid of certain features normally attached thereto as components of an optional regulator valve assembly.

in FIG. 12 the view depicting the base component of FIG. 9 with certain features of an optional regulator valve assembly normally mounted thereon shown in exploded view.

in FIG. 21 cross-lines indicates a center and thus a location of a cartridge central axis.

in FIG. 25, cross-lines indicating a center and thus a location of a central axis.

in FIG. 27, cross-lines showing a center and thus a location of a central cartridge axis.

FIG. 37 is a schematic exploded perspective view of the cover assembly depicted in FIG. 10.

DETAILED DESCRIPTION

I. General Issues and Features

Figure 1:
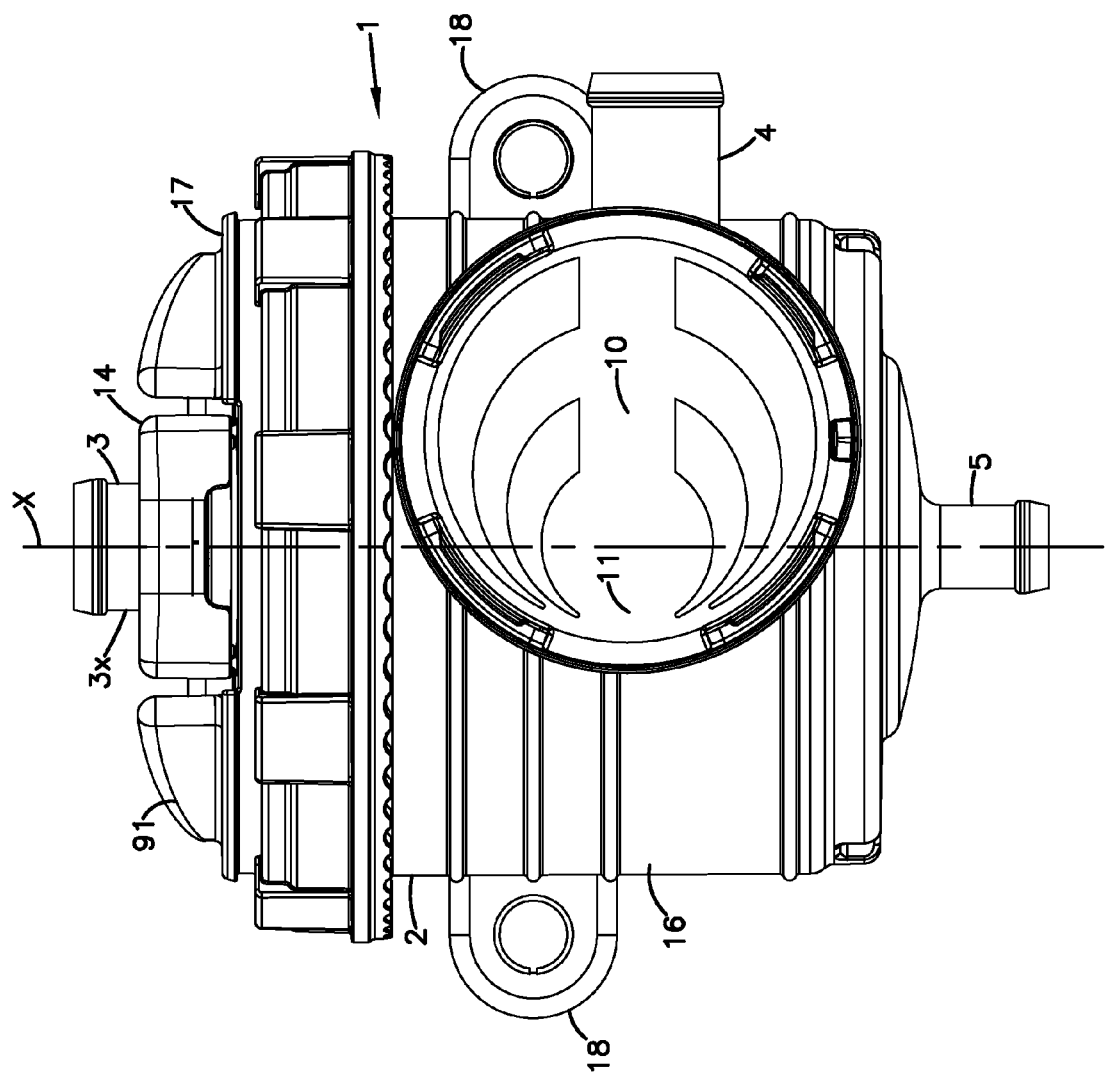
FIG. 1 is a schematic side elevational view of a first crankcase ventilation filter arrangement or assembly according to the present disclosure.

As indicated previously, the present disclosure relates, in general, to systems, arrangements, features, components and methods concerning crankcase ventilation filter assemblies.

The Assignee of the present application is Donaldson Company, Inc. of Bloomington, Minn. As such, the application, in part, relates to other Donaldson Company, Inc. crankcase ventilation filter assemblies, including, for example, those described in WO 2007/053411; WO 2008/147585; WO 2008/115985; WO 2005/157251; and, WO 2009/018454; the complete disclosures of which each being incorporated herein by reference.

The present disclosure relates to certain usable features for crankcase ventilation filter assemblies that can provide advantage relating to one or more of: assembly operation; assembly servicing; component operation and/or servicing; and/or, assembly or component generation, as described herein. There is no specific requirement that an assembly, component, feature, arrangement, system or method be applied with all of the detailed features as described herein, in order to obtain some benefit according to the present disclosure. This will be apparent from the descriptions herein, as well as a general understanding of the principles described.

As will be learned from detailed description herein below, many of the features depicted in the current assembly were developed, in part, for applications to enhance desirable crankcase ventilation filter assembly features and effects even when the installation location has limited vertical dimension for installation or when it is desirable to more efficiently use vertical space available. Indeed, herein example systems are described, and example dimensions are provided. However, there is no specific requirement that an assembly be constructed in accord with the specific dimensions provided in the examples, nor is there a requirement that the principles only be applied in assemblies configured for installation in systems of similar limited vertical space. Nevertheless, many of the features depicted and described are particularly advantageous for applications involving limited vertical installation space and/or to take beneficial advantages of the vertical dimension of the space available.

Herein, in some instances a mounting location of limited vertical dimension may be characterized as a "vertically challenged" application situation. Again, certain of the techniques described herein are particularly well adapted for "vertically challenged" installation situations.

In the present disclosure, two embodiments are depicted, first embodiment in FIGS. 1-37 and a second embodiment in FIGS. 39-64. In general, identified features of the first embodiment can be incorporated in the second embodiment; and, identified features of the second embodiment can be incorporated in the first embodiment. This will be, in general, understood by a person of skill in the art based on the following descriptions of each embodiment.

General features and operation of an example crankcase ventilation filter assembly can be understood by reference to FIGS. 1-8. Thus, attention is first directed to these figures.

The reference numeral 1, FIG. 1, generally depicts a crankcase ventilation filter assembly including example features according to the present disclosure. The assembly 1 can be generally characterized as comprising a housing 2 having: a gas flow inlet arrangement 3; a filtered gas flow outlet arrangement 4; and, a liquid drain outlet arrangement 5.

In typical operation, gas carrying liquid particulate therein (and other contaminant) is directed into the assembly 1 through gas flow inlet arrangement 3. Within the assembly 1, the gas flow is directed through a filter cartridge component 20 (not viewable in FIG. 1) discussed below. Within the filter cartridge component 20, liquid component is coalesced and drained and other contaminant (such as solid particulate) tends to become trapped within media of the filter. The liquid component can drain downwardly, for example under gravity influence, to drain outlet arrangement 5, and outwardly from housing 2. Of course, the liquid draining out from the filter cartridge 20 and through the liquid drain outlet arrangement 5, can carry some of the solid particulate component from the media. The filtered gases leave the assembly 1 through filtered gas flow outlet arrangement 4. The filtered gases can be vented to the atmosphere, or, in some instances, they can be directed other to componentry, such as to an engine air intake or induction system.

It is noted that for the particular assembly 1 depicted, the gas flow inlet arrangement 3, the gas flow outlet arrangement 4 and the liquid drain arrangement 5 are each depicted as single apertures in single flow tubes. While this is typical, alternate assemblies are possible in which one or more of the gas flow inlet arrangement, gas flow outlet arrangement and/or liquid flow outlet arrangement is provided as a multiple aperture and/or multiple tube arrangement.

The typical assembly 1, includes a housing 2 configured so that when installed on equipment for use, the liquid drain outlet 5 is directed downwardly. The liquid, typically oil or a similar material that drains through outlet 5, can be directed to a sump or back into equipment as desired. Valving arrangements can be used to manage liquid flow from the liquid drain outlet 5 to the equipment as desired.

Still referring to FIG. 1, the particular assembly 1 depicted includes two optional gas valve assemblies thereon. A first, optional, gas valve assembly, indicated generally 10, is a regulator valve assembly, which, in the example depicted, regulates gas flow to the gas flow outlet arrangement 4. At 11, a cover for the regulator valve assembly 10 is depicted in the example having a design thereon. The design is a source-indicating mark of Donaldson Company, Inc., the Assignee of the present application, for various equipment and services. It is noted that the design is typically used in association with the mark "Spiracle" another source indicating mark of Donaldson.

At 14, is depicted on optional pressure release valve assembly or vent valve assembly. Assembly 14 is generally configured to rapidly open and thus to allow venting of gases from an interior of housing 2, to protect against an overpressure condition within housing 2. Specific features of the vent valve assembly 14 are discussed further herein below.

Still referring to FIG. 1, the example housing 2 depicted can be characterized as generally comprising two components: housing bottom or base component 16; and, service cover (cover assembly or component) 17. In general, during use, the housing 2 is mounted on equipment with which the assembly 1 is to be used, for example a vehicle or other equipment. Typically, assembly 1 is mounted by having the housing base component 16 secured in place on the equipment. The particular housing 2 depicted is shown with mounting flanges 18 positioned on the housing base component 16, to provide for this mounting, although alternate mounting approaches are possible.

The service cover 17 is generally removably mounted on the housing base 16, to allow service access to an interior of the housing 2. Service access provides for installation and/or removal of an interiorly positioned filter cartridge arrangement 20 (not shown in FIG. 1) as discussed below.

Still referring to FIG. 1, the particular housing 2 depicted is provided with a top, downwardly directed (inlet) gas flow tube arrangement 3x as the gas flow (inlet) arrangement 3. The inlet tube arrangement 3x, in the example depicted, comprises a portion of a cover component 91 of the access cover 17, as discussed below, although alternatives are possible.

In FIG. 1, the housing 2 is configured with gas the flow outlet arrangement 4 and the liquid drain outlet arrangement 5 positioned on the housing base 16. Since the housing base 16 is generally the bottom of the assembly 1, the drain outlet 5 will typically be positioned on this component. Positioning the gas flow outlet arrangement 4 on the housing base arrangement 16 is advantageous for the particular assembly depicted and gas flow therethrough, as will be understood from further discussion below.

It is noted that for the particular assembly 1 depicted, the housing base 16 comprises a single integral base member. In alternate applications of principles according to the present disclosure, the base 16 could comprise sidewall section and a removable bottom section, having similar overall features.

Although the general location for the inlet flow arrangement 3, outlet arrangement 4 and liquid drain arrangement 5 will be typically as shown, alternate locations are possible with some of the principles described herein. For example in some systems, the inlet arrangement 3 can be provided in the housing base with the outlet arrangement on the service cover, or both can be provided in the housing base or on the service cover. (Also, they can be directed differently). However especially for certain vertically challenged applications, the configuration depicted has some advantages, for reasons that will be apparent from descriptions herewith.

Also, referring to FIG. 1, for the particular assembly 1 depicted, the gas flow inlet direction, through inlet 3, and the gas flow outlet direction through outlet 4 are generally perpendicular (orthogonal) to one another. This will be typical, although alternatives are possible.

Figure 2:
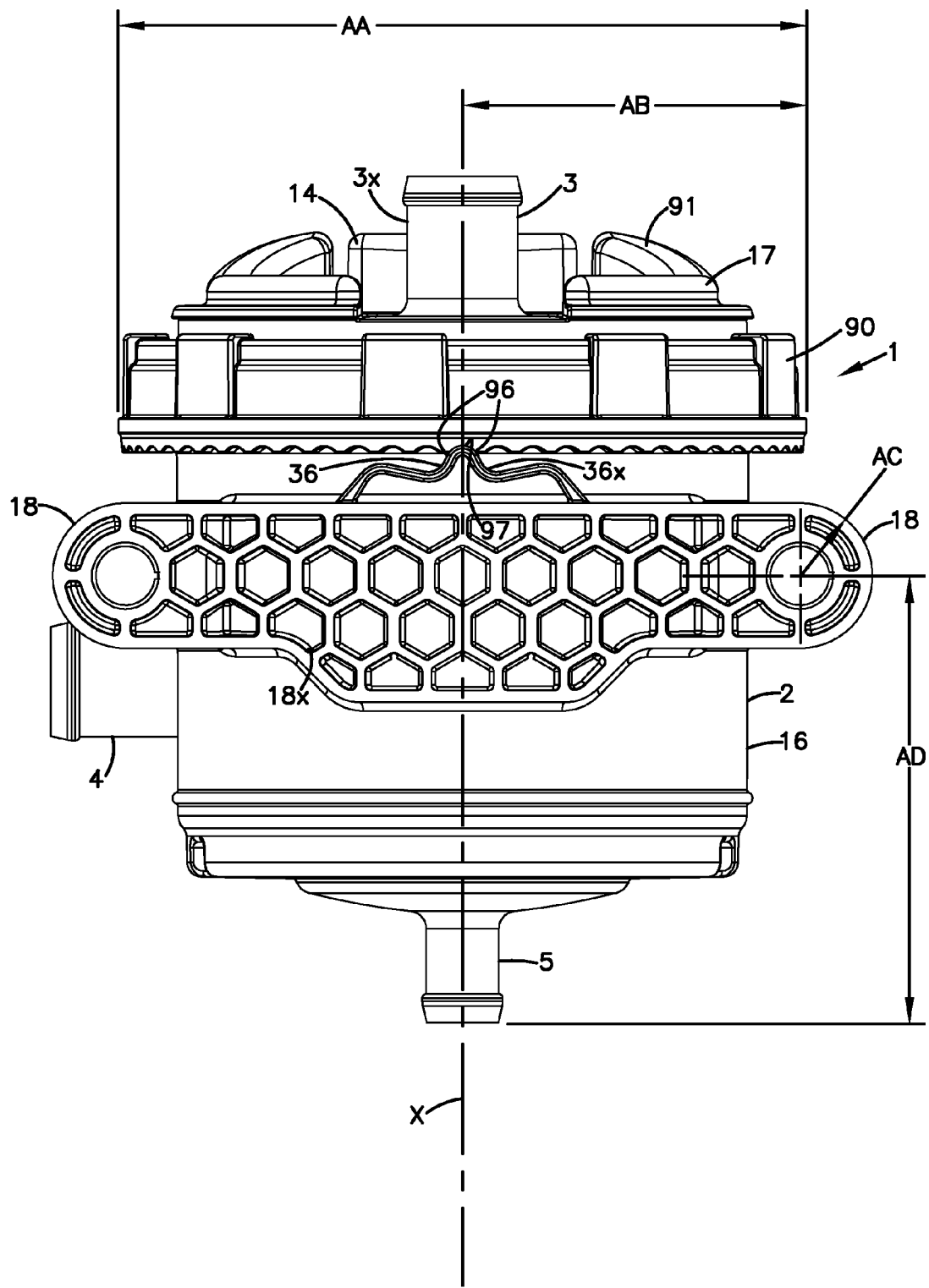
FIG. 2 is a second schematic side elevational view of the assembly of in FIG. 1; generally the view of FIG. 2 being toward a side opposite that of FIG. 1.

In FIG. 2, a side elevational view of crankcase ventilation filter assembly 1 is provided, generally opposite the view of FIG. 1. Mounting flanges 18 can be seen comprising a portion of mounting pad arrangement 18x configured for mounting on a portion of equipment with which the assembly 1 is to be used. Of course, the mounting pad arrangement 18x can be configured in a variety of specific arrangements. For example, it can be custom configured for engagement with a selected portion of equipment for use; the mounting pad arrangement 18x depicted merely being an example. It is noted that in some alternate applications, the housing base 16 can be provided without a mounting pad arrangement, with securement to the equipment alternately provided, for example through an attachable mounting band or similar structure.

It is noted that in some instances, the assembly 1 will be mounted on the engine for the equipment of concern. The mounting pad arrangement 18x can be configured for convenient mounting in this manner.

Figure 3:
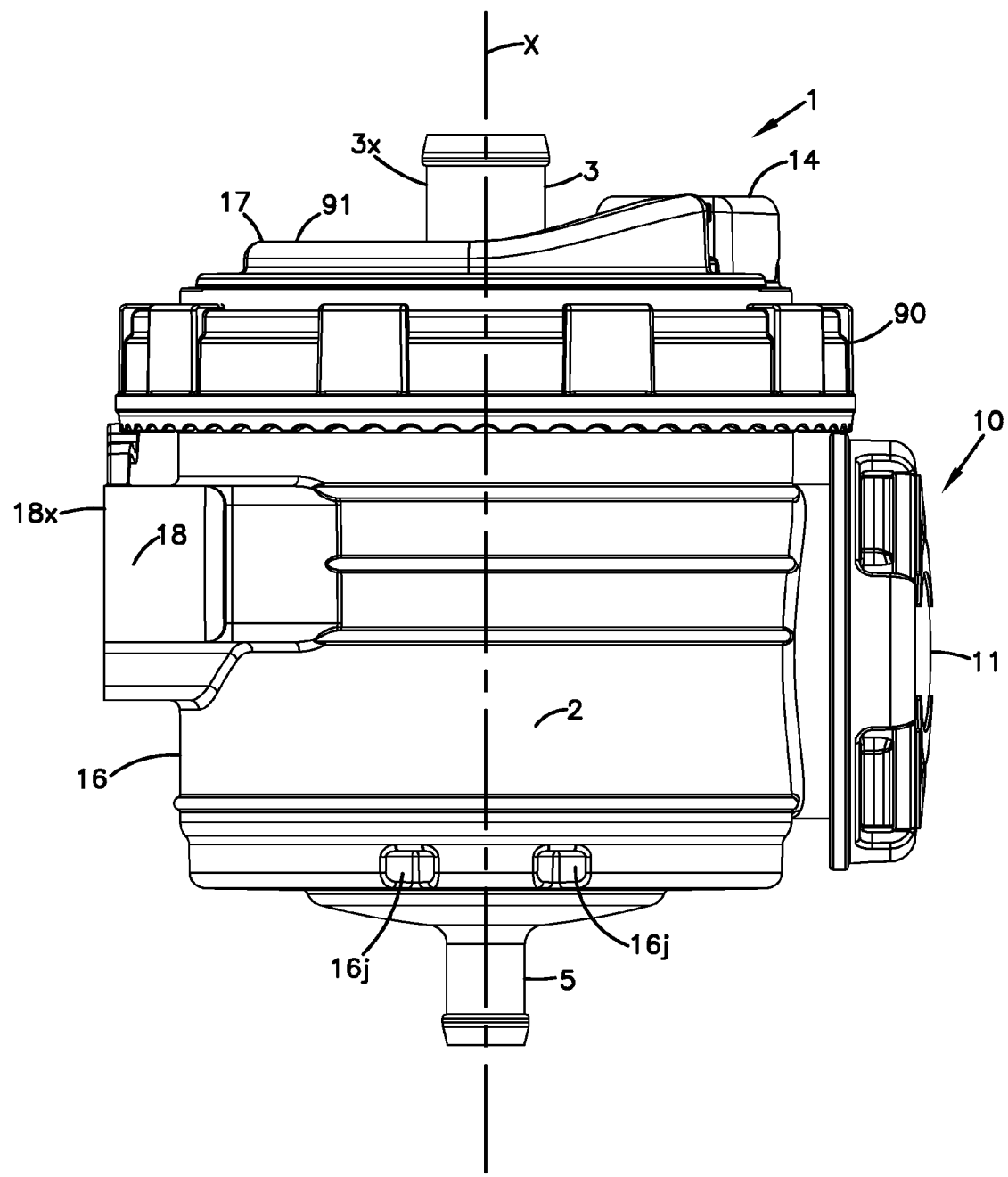
FIG. 3 is a third schematic side elevational view of the assembly depicted in FIG. 1, generally the view being taken toward a left side of FIG. 1.

Referring to FIGS. 1-3, the assembly 1, and in particular the housing 2 and an internally received cartridge 20 (not viewable in FIGS. 1-3), can be characterized as having a central assembly, housing, cartridge or component axis X. The axis X is depicted in FIGS. 1-3, and is generally centrally located through each of the cover assembly 17, base 16, thus the overall housing 2 and an internally received filter cartridge 20 discussed below. The axis X is generally oriented vertically, in typical use.

Figure 4:
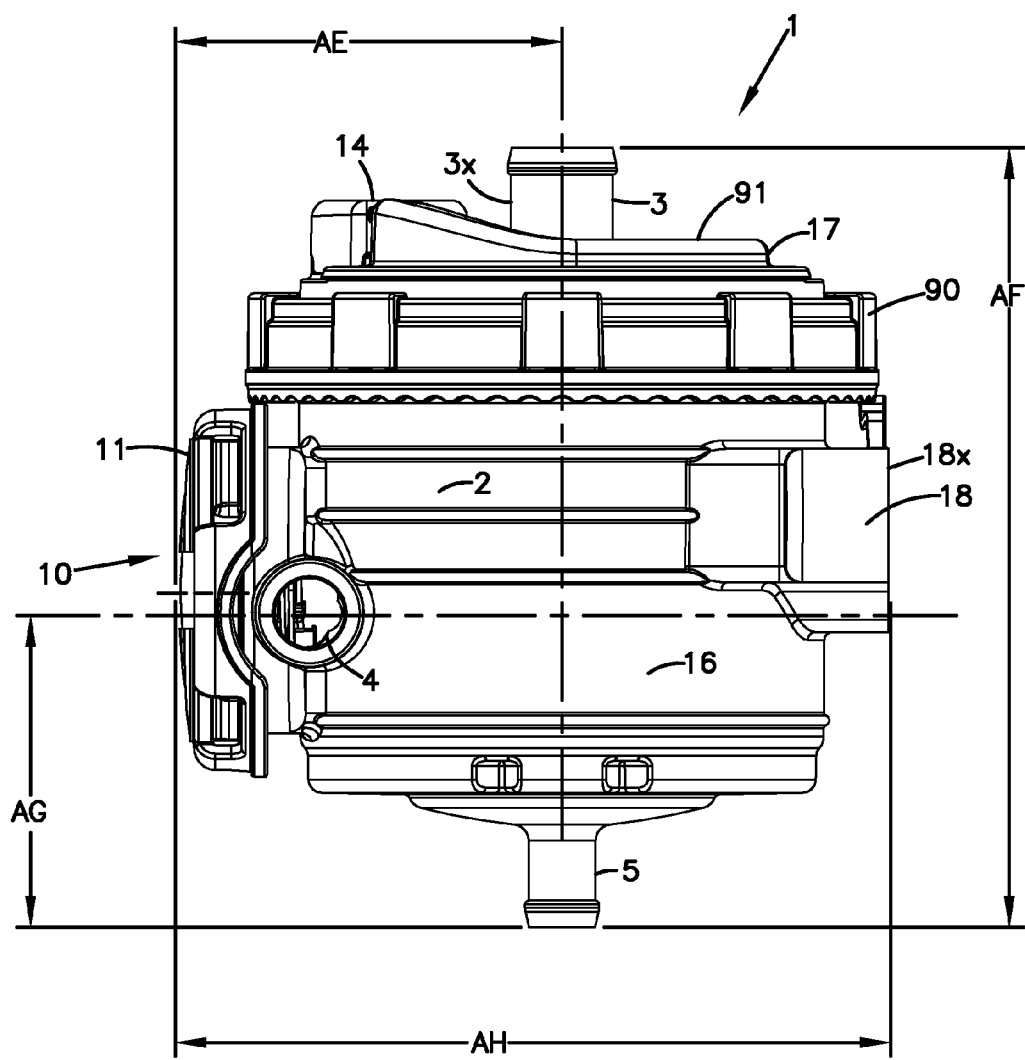
FIG. 4 is fourth schematic side elevational view of the assembly depicted in FIG. 1, generally the view being taken toward the right side of the assembly as depicted in FIG. 1.

In FIG. 3, a third side elevational view of the assembly 1 is depicted generally taken toward the left side of FIG. 1. FIG. 4, a side view opposite that of FIG. 3 is provided.

Figure 5:
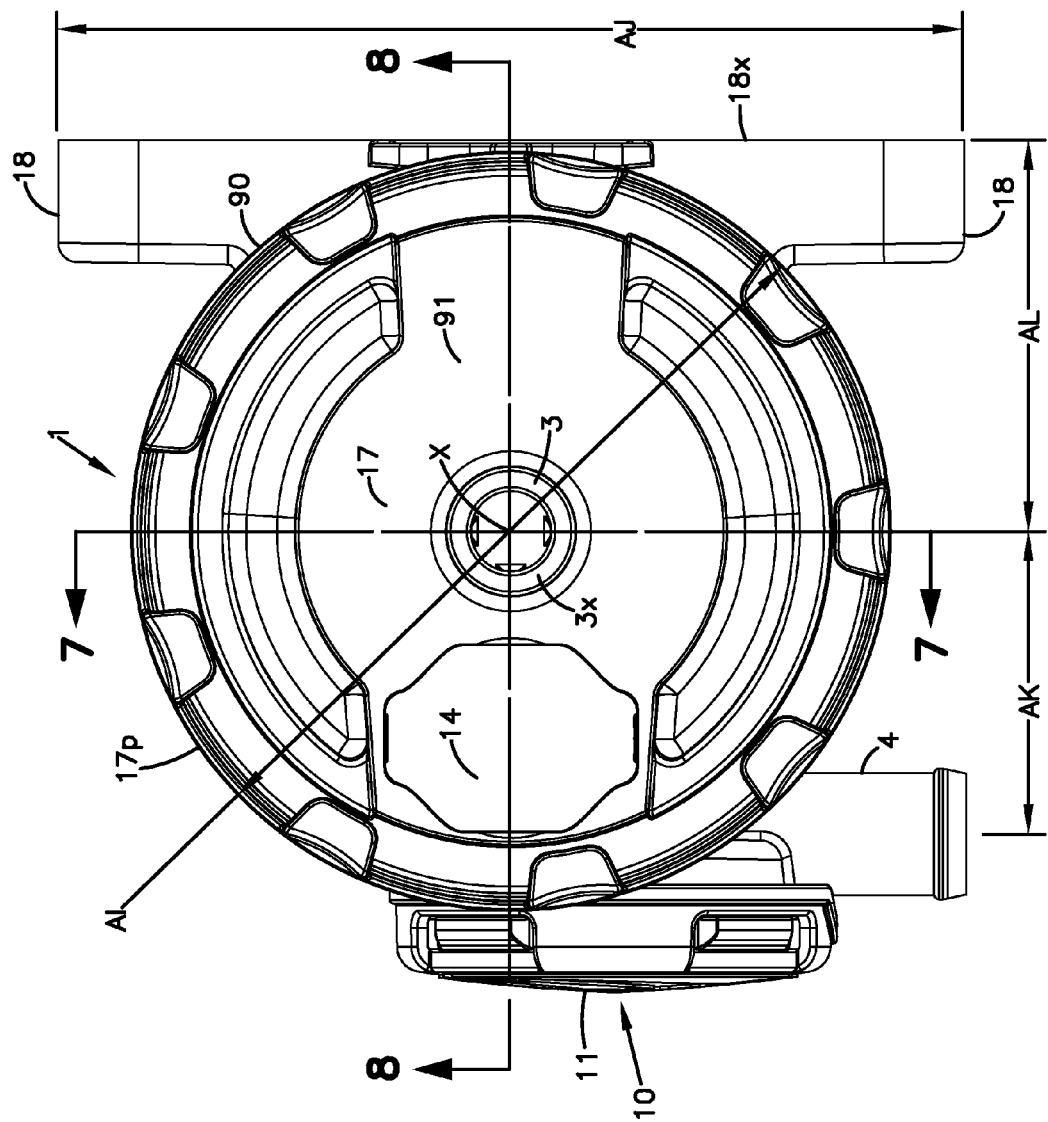
FIG. 5 is a schematic top plan view of the assembly depicted in FIG. 1.

Attention is now directed to FIG. 5. FIG. 5 is a top plan view of the assembly 1. In FIG. 5 it can be seen that the example top cover or service cover 17 has an outer perimeter lip and that the inlet tube 3x is centrally positioned relative to the outer perimeter 17p of the service cover 17. By "centrally positioned" in this context, it is meant that the vertical inlet tube 3x is positioned centered on a center (vertical) axis X (FIGS. 1-4) defined where lines 7-7 and 8-8 cross at X, FIG. 5.

In more general terms, the access cover or service cover 17 has an outer perimeter 17p. The "center" of the outer perimeter will generally be a location where a line along a longest dimension of that perimeter, across the service cover 17, is intersected by a perpendicular line half-way along that longest line. For a circular perimeter, of course, the two lines could be a pair of orthogonal (perpendicular) diameter lines. In general, the location where the two lines cross, will be characterized as the "center" of the service cover 17 and perimeter 17p. In a typical application, this center will also correspond to a central (vertical) axis X of the assembly 1 and a service cartridge 3, as discussed below. Herein, when it is said that the inlet tube 3x is positioned "centrally" on the access cover 17, it is thus meant that it is centered around the identified center above. When it is stated that the inlet tube 3x is positioned "centrally" in the assembly 1, it is meant that it is centered on the central cartridge axis X or housing central axis X as defined herein below. For the particular assembly 1 depicted, the inlet tube 3x is centrally positioned with respect to each of: the outer perimeter 17p of the service cover 17, a cartridge central axis X, and a housing central axis X. As discussed below, many of the principles of the present application can be applied in an arrangement in which the inlet tube 3x is not positioned centrally, i.e. when it is positioned "eccentrically." In some arrangements, this can provide advantage, and features can be modified to accommodate for this, as discussed below.

The particular tube 3x depicted, has an interior definition which is circular in cross-section. This will be typical, but is not specifically required all applications of the many of the principles described according to the present disclosure.

It is noted that many of the principles of the present disclosure can be applied when the air flow inlet arrangement 3, i.e. the gas flow tube 3x through the cover assembly 17 is eccentrically, axially, positioned on the central axis X, as opposed to being centrally positioned. However, for the particular assembly depicted, the central positioning provides for some accommodation and advantage, discussed further below.

Figure 6:
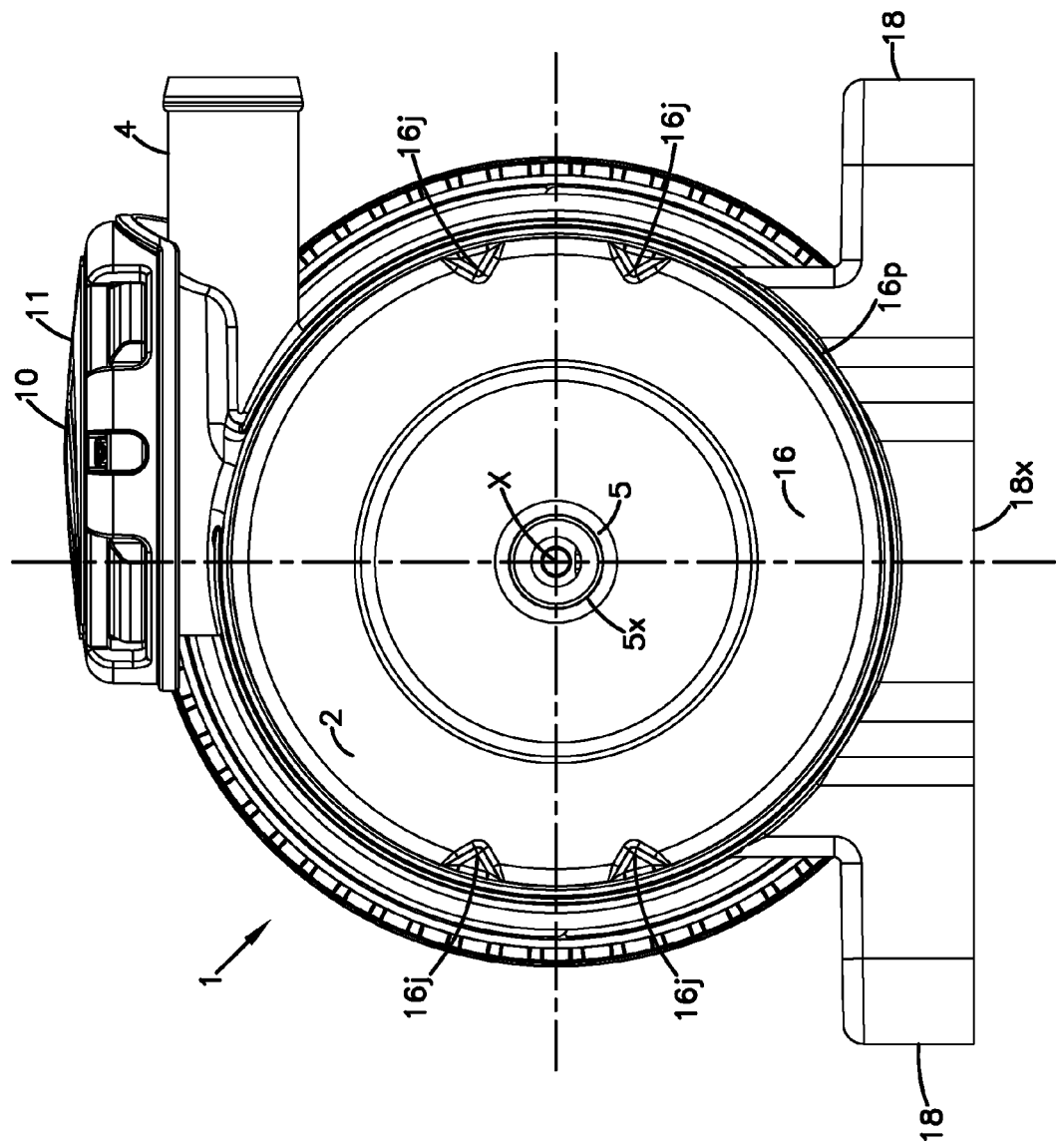
FIG. 6 is a schematic bottom plan view of the assembly depicted in FIG. 1.

In FIG. 6, a bottom plan view of the assembly 1 is depicted. Referring to FIG. 6, it can be seen that the housing base component 16, except for componentry positioned thereon, and some recesses at 16j (discussed below) generally has a circular outer perimeter 16p as well. The liquid outlet drain 5 is typically centrally positioned, as shown. It is noted that although alternatives are possible, typically, a central (not eccentric) position around center X will be typical and preferable for the drain outlet arrangement 5, as will be understood from further discussion below. Still referring to FIG. 6, it is noted that the particular liquid outlet arrangement 5 depicted comprises a tube 5x having a generally circular interior definition, in cross-section. While this shape is not required, it will be typical.

Figure 7:
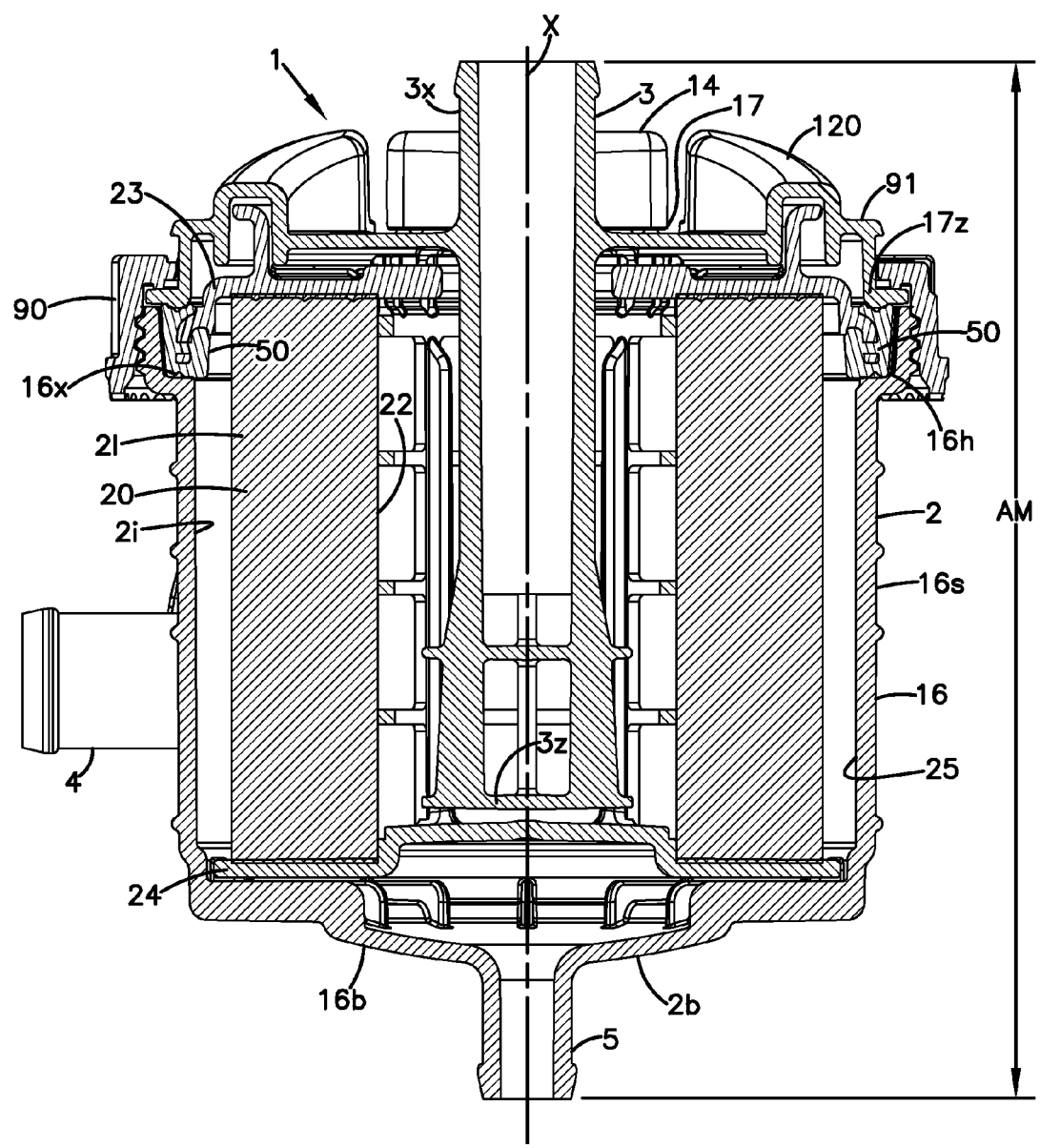
FIG. 7 is a schematic cross-sectional view taken generally along line 7-7, FIG. 5.

Attention is now directed to FIG. 7, a cross-sectional view taken generally along line 7-7, FIG. 5. Referring to FIG. 7, the housing 2 can generally be understood to define a housing interior 2i. Within the housing 2 or housing interior 2i is positioned serviceable filter cartridge 20. Filter cartridge 20 generally comprises filter media 21 positioned surrounding an open filter interior 22, positioned between, and typically extending between, opposite cartridge end pieces 23, 24 and defining central cartridge axis X (in the example also corresponding to a central axis for housing 2 and assembly 1).

Herein the term "serviceable" when used in association with filter cartridge 20, is meant to refer to a filter cartridge 20 that can be removed and be replaced within the housing 2. Thus, the filter cartridge 20 is a service component. Typically, the filter cartridge 20 will be removed and be replaced during servicing operation for the equipment involved, since the filter cartridge 20 will, in time, load with material. Of course, servicing in some instances can comprise refurbishment, but typically it will be replacement.

As noted above, the particular filter media 21 depicted is positioned around a central cartridge axis X. The axis X is generally a vertical axis extending through a center around which the media 21 is positioned, and also generally through a center defined by the housing base component 16.

By referring to FIG. 7, inlet gas flow and liquid drain operation can be understood. As gas enters through downwardly directed inlet tube 3x, it is directed into cartridge interior 22. Then, it is directed through the media 21 into filtered gas annulus 25, which, for the system depicted, is a portion of the housing interior 2i that surrounds the cartridge 20. Annulus 25 is a clean or filtered gas flow annulus in flow communication with outlet arrangement 4, FIG. 1.

Liquid coalesced within the media 20 generally drains downwardly to housing bottom 2b (which, for the housing 2 depicted, comprises bottom 16b of base arrangement 16) and outwardly through drain arrangement 5.

As thus far described, the assembly 1 is configured for "in-to-out" flow through the filter cartridge 20, during filtering. By this, it is meant that the gas flow through the media 21, with filtering, is, generally, from an inside 22 of the cartridge 20 to a region outside of the cartridge 20. Many of the techniques described herein can be applied in applications in which an opposite "out-to-in" flow during filtering is involved. This is discussed briefly herein below.

In general, annulus 25 is in flow communication with port 35 (FIG. 12) in a sidewall 16s of base 16. Port 35 (not viewable in FIG. 7) is configured with outlet 4 and the regulator valve assembly 10 thereon, as discussed further below.

Figure 8:
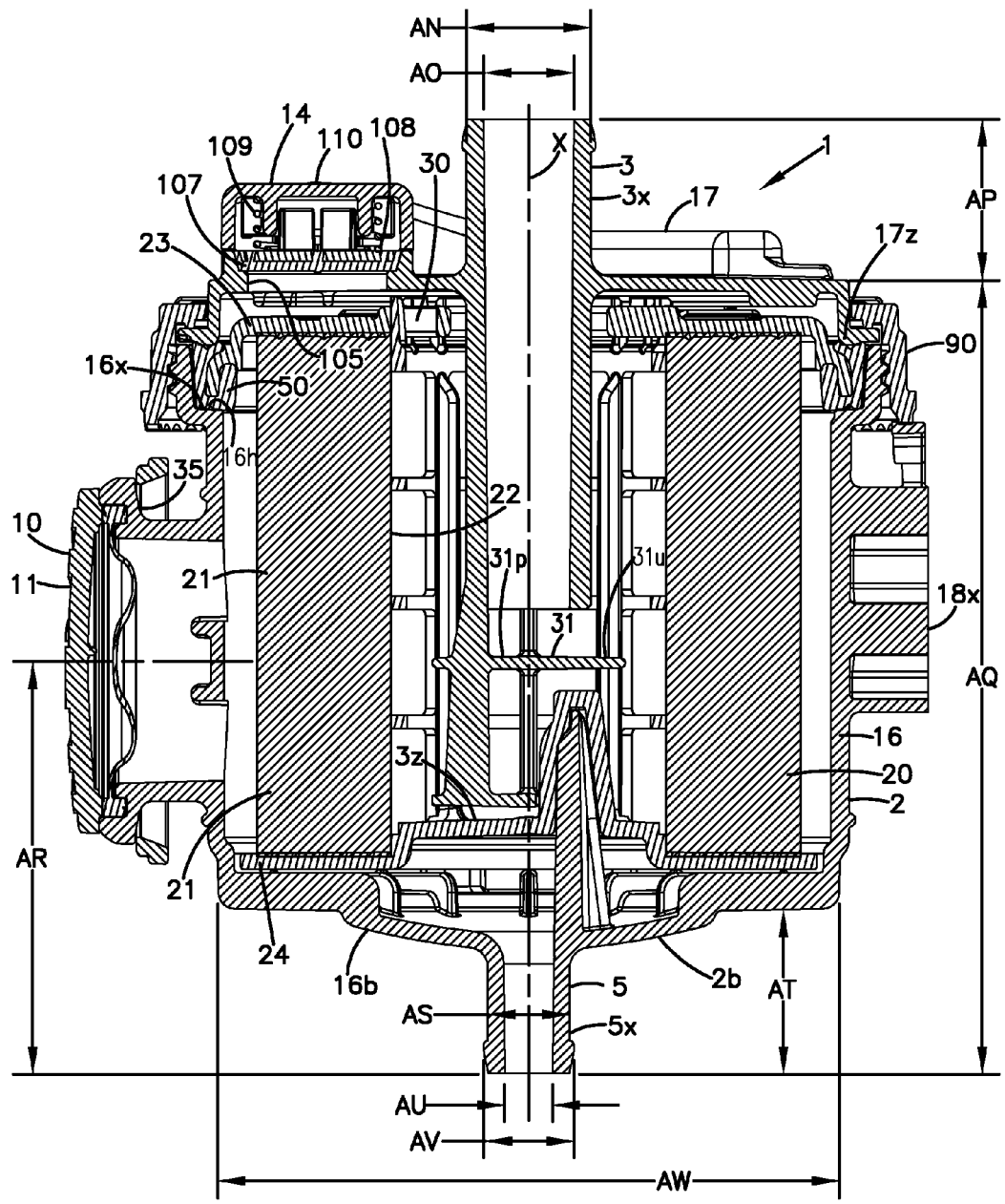
FIG. 8 is a schematic cross-sectional view taken generally along line 8-8, FIG. 5.

In FIG. 8, a second cross-sectional view of assembly 1, taken generally along line 8-8, FIG. 5, is depicted. In FIG. 8, cover 11 of regulator valve assembly 10 can be seen in position on port 35.

Still referring to FIG. 8, at 30 is depicted an aperture arrangement through end piece 23, in communication with open interior 22. The aperture arrangement 30, in part, allows that should pressure build-up in the region of inlet 3 and interior 22, to a potential over pressure condition, that pressure (via vent 30) is communicated to vent valve arrangement 14, for release. Other paths for gas venting through end piece 23 are provided. This is discussed further below.

Still referring to FIG. 8, at 31, on inlet 3x is provided an optional inertial impaction arrangement 31 at an internal end of inlet tube 3x, to facilitate liquid collection. Advantages from such an optional inertial impaction arrangement 31 will be understood from further discussion below. In general, as gases are directed through inlet tube 3x, they are directed toward inertial impaction plate 31p, and a portion of liquid carried by the gases can collect on an upper surface 31u of inertial impaction plate 31p as droplets, which then can drop downward and flow into a liquid head to media 21, without necessarily redispersing as aerosol, to advantage. Again, this is described in further detail below. (It is noted that the second embodiment of FIGS. 39-64 does not depict the use of such an inertial impaction arrangement. However, an inertial impaction arrangement of the type depicted in FIG. 8 could be adapted for this latter embodiment).

II. The Main Assembly Components; Housing Base 16; Service Cover 17; Serviceable Filter Cartridge 20

A. General Features—FIGS. 9-11

Figure 9:
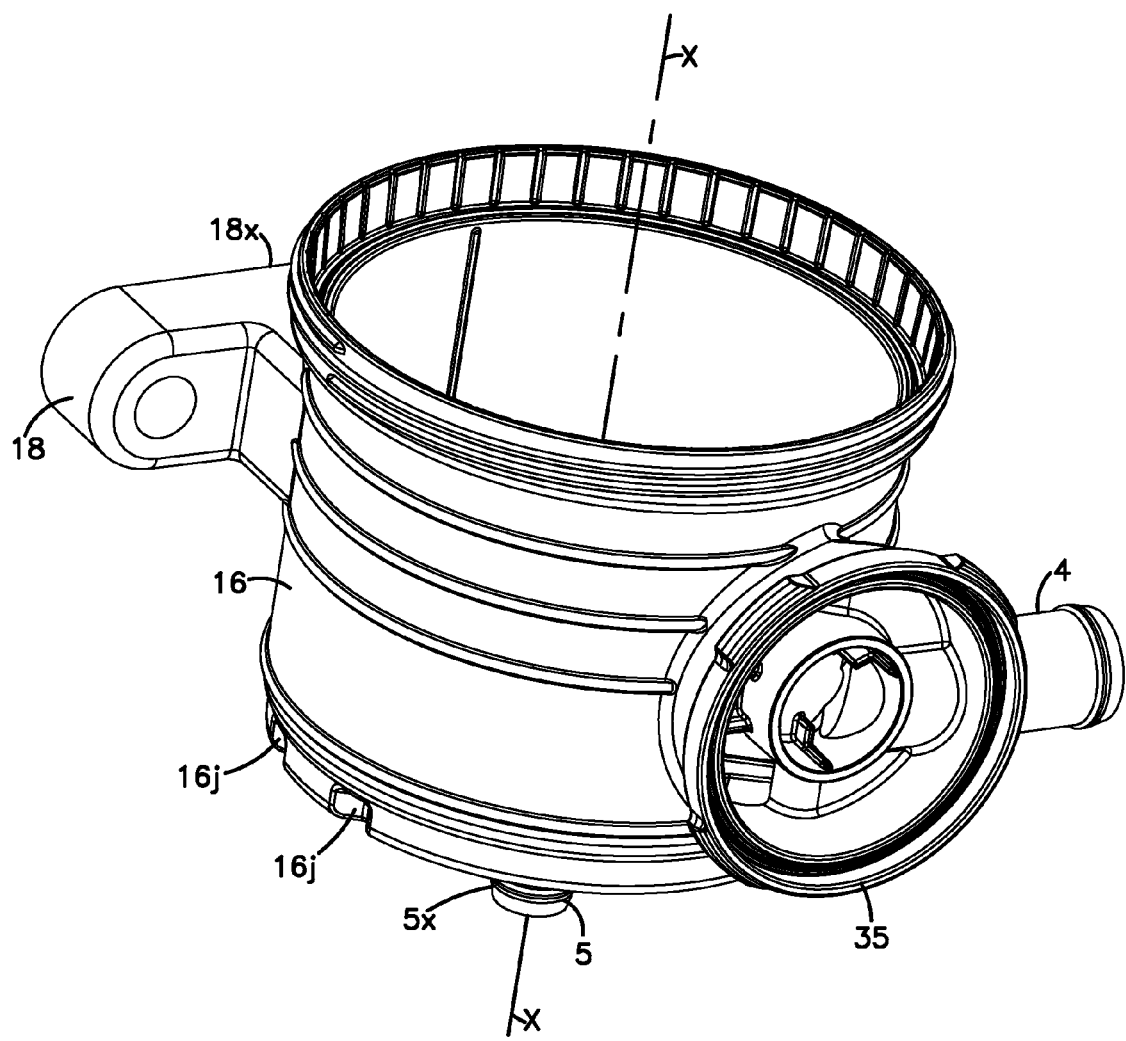
FIG. 9 is a schematic top perspective view of a housing base component of the assembly depicted in FIGS. 1-8.

In FIG. 9, a top perspective view of housing base component 16 is depicted. It is noted that the housing base component 16 is depicted in FIG. 9, without selected portions of the regulator valve assembly 10 positioned thereon. The particular portion of housing base component 16 depicted generally will comprise a unit that can (if desired) be molded as a single, unitary, construction, from plastic. This will be typical for a preferred construction according to the present disclosure.

Again, it is noted that the regulator valve assembly 10 is an optional component. If the housing base component 16 were part of an assembly which is does not include such a regulator valve assembly, or includes a regulator valve assembly alternately mounted, the housing base component 16 could be formed without those selected features of the regulator valve assembly 10 depicted, thereon.

Figure 10:
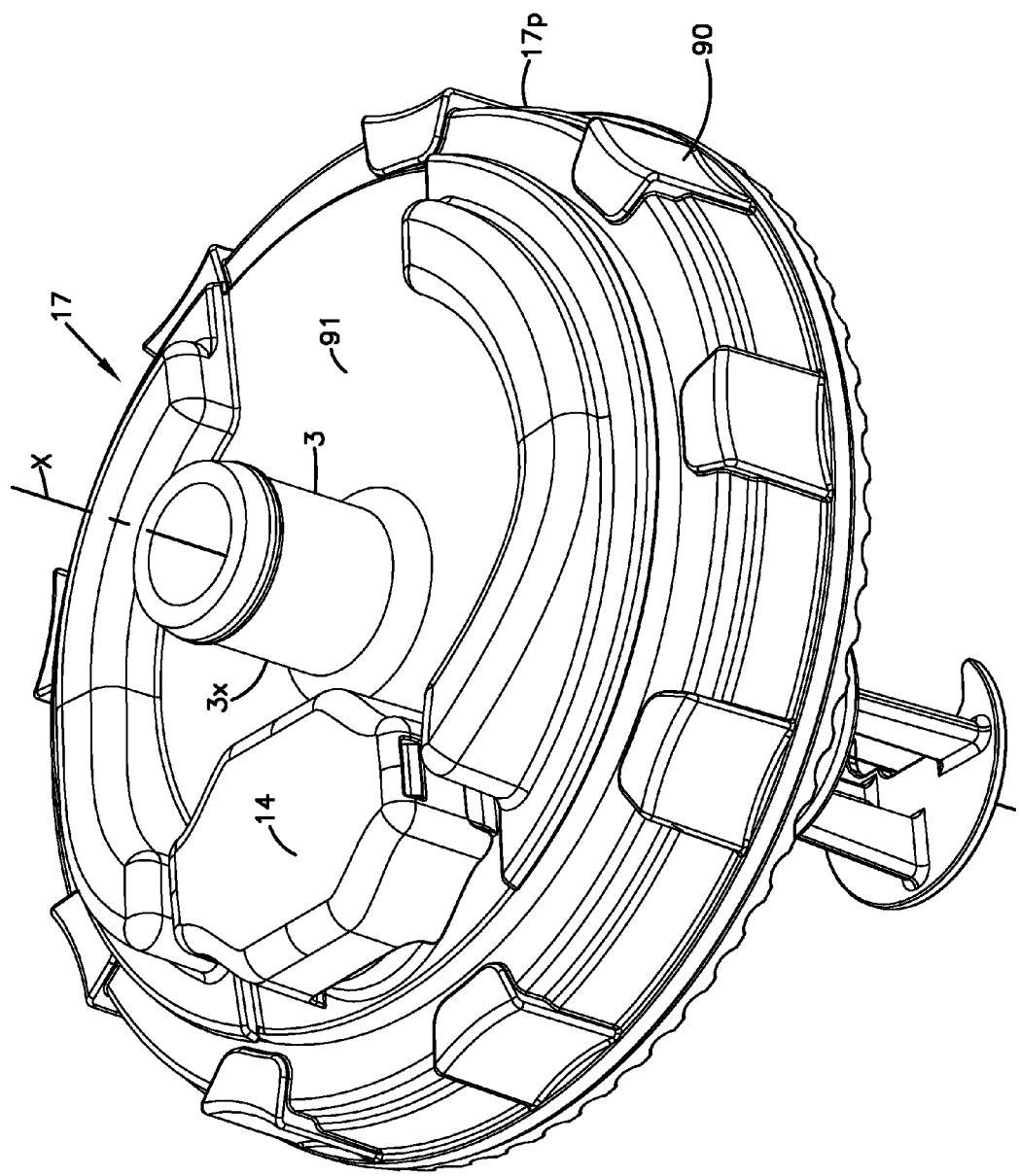
FIG. 10 is a schematic top perspective view of a service cover or cover assembly for the crankcase ventilation filter assembly depicted in FIGS. 1-8.
Figure 11:
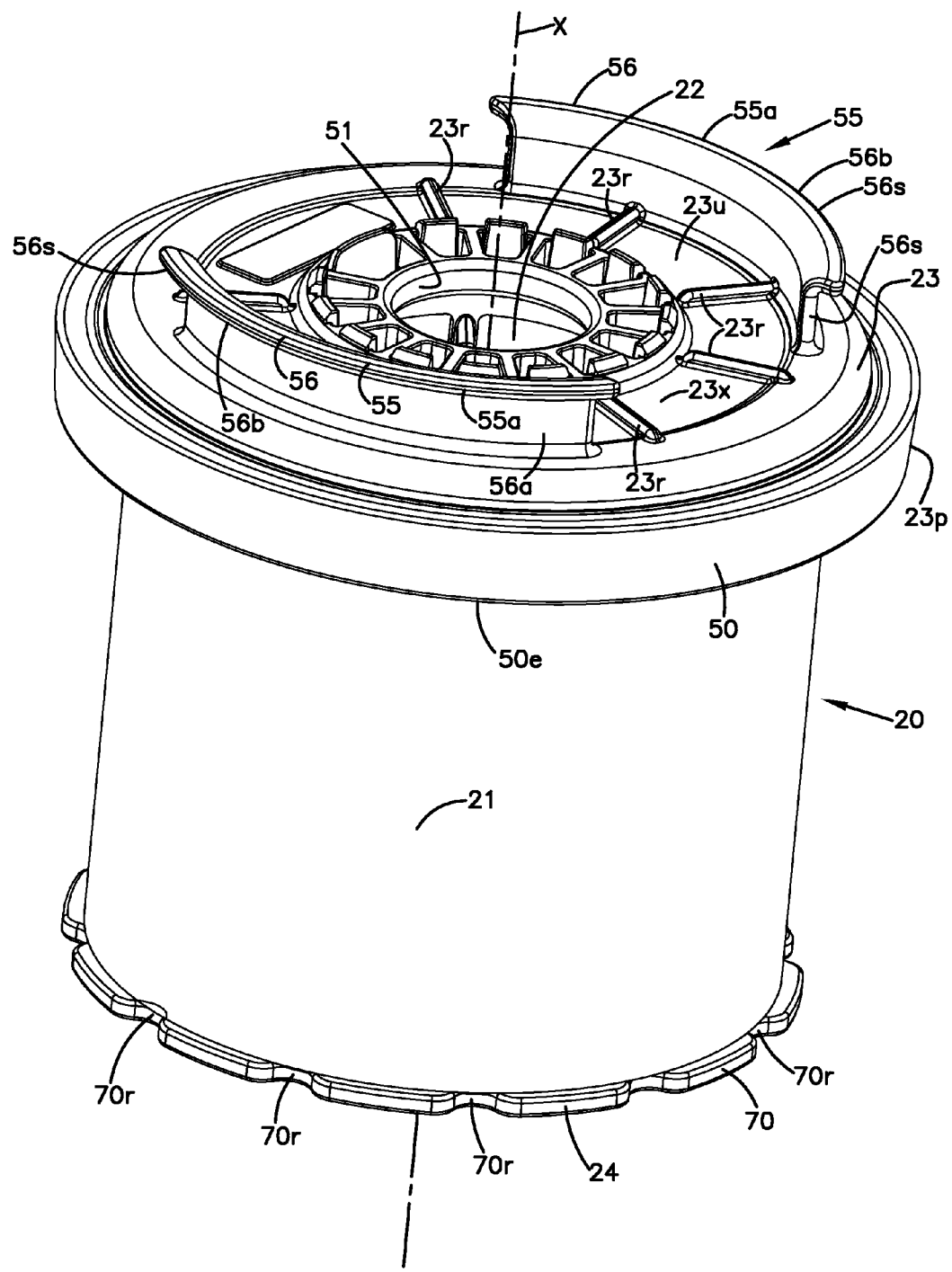
FIG. 11 is a schematic top perspective view of a serviceable filter cartridge component viewable in the interior of the assembly depicted in FIGS. 1-8.

In FIG. 10, service cover or service cover assembly arrangement 17 is viewable in top perspective view. In FIG. 11, filter cartridge 20 is depicted in top perspective view.

Assembly 1 can be assembled for use by installing cartridge 20 (FIG. 11) in housing base component 16 (FIG. 9) and positioning service cover 17 in place over a top end 16e of housing base component 16 (FIG. 9). (It is noted that typically housing base component 16, FIG. 9, will have been provided with remaining components of the regulator valve assembly 10 thereon before cartridge 20 and service cover assembly 17 are positioned.)

From detailed descriptions below, it will be understood that many of the features described herein not only relate to configuration for good utilization of space and efficient and effective filter operation, but also to helping ensure that the cartridge which is positioned within an assembly according to the present disclosure is a proper cartridge for that assembly and is properly positioned and retained for appropriate use.

The inlet arrangement 3, outlet arrangement 4 and drain outlet arrangement 5 can be attached to appropriate conduits for gas flow and liquid flow as appropriate. During a typical servicing operation, for an installed complete assembly, there is no specific need to disattach (detach) hosing or tubing from the assembly 1, during serving, depending on the nature of the tubing attached. Indeed, typically the housing base component 16 remains in place and does not move; and, if the tubing attached to inlet arrangement 3 is sufficiently flexible, the access cover 17, as will be understood from further discussion below, can be removed from the housing base 16 without disattaching the tubing from the inlet 3.

B. The Housing Base 16 Generally—FIGS. 12-16

Figure 12:
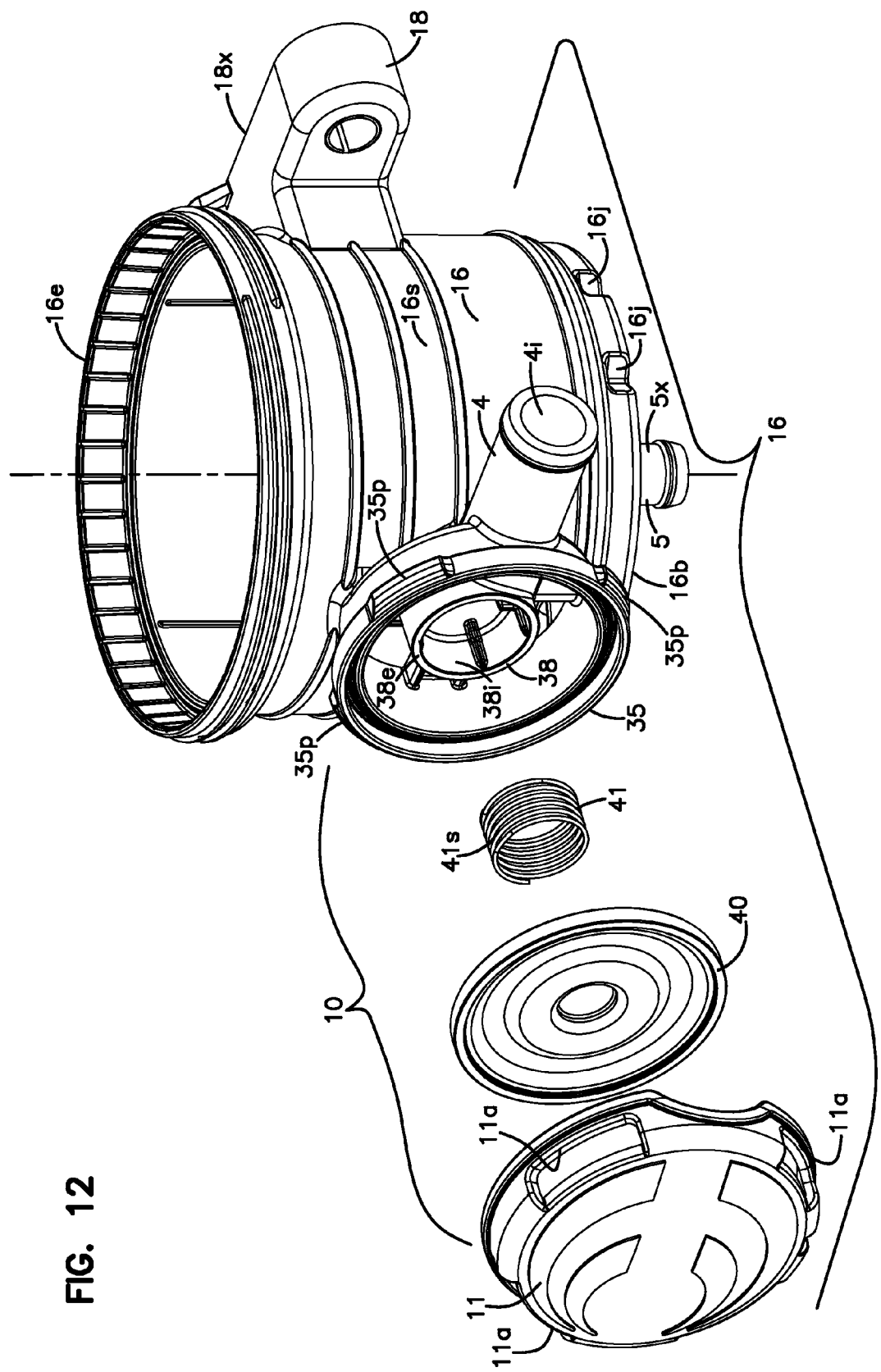
FIG. 12 is a schematic exploded perspective view of the housing base component of FIG. 9.

Attention is now directed to FIG. 12. FIG. 12 is an exploded perspective view of housing base component 16. In FIG. 12, selected componentry of the optional regulator valve assembly 10 is depicted and it is this componentry which is shown in exploded view.

Referring to FIG. 12, housing base component or base 16 is depicted in perspective view, as comprising sidewall 16s, bottom 16*b* with drain outlet arrangement 5 therein, open top end 16*e* and mounting pad arrangement 18*x*.

Figure 13:
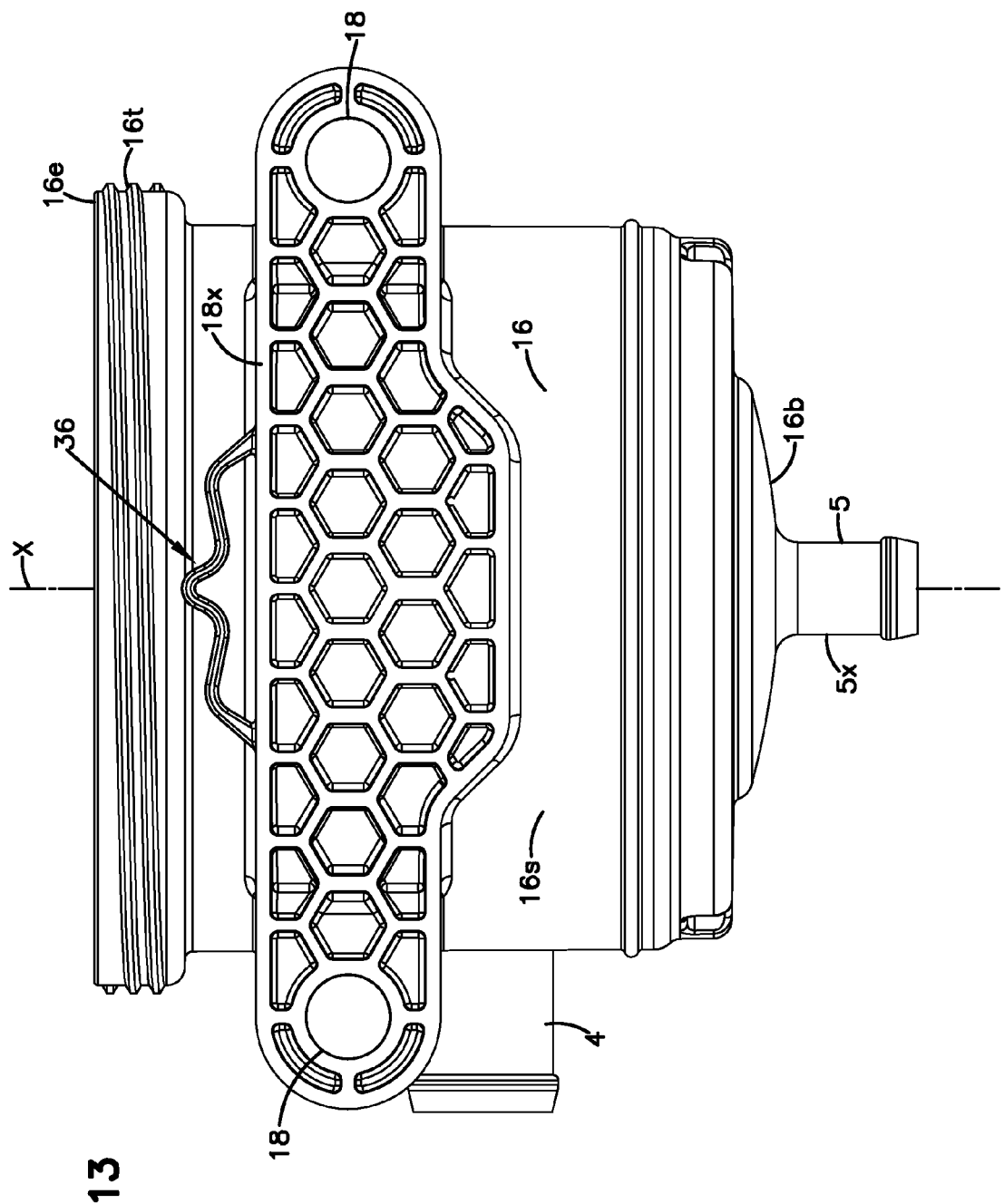
FIG. 13 is a schematic side elevational view of the base component of FIG. 9.

In FIG. 13, a side elevational view of base component 16 is provided, taken toward mounting pad arrangement 18*x*. Also viewable in FIG. 13, is lock projection arrangement 36, on an outer surface of sidewall 16*s* adjacent, and spaced from, top edge 16*e*. Also, around an upper portion of sidewall 16*s*, between lock projection arrangement 36 and open end 16*e* is provided thread arrangement 16*t*. As will be understood from discussion below, the particular assembly 1 depicted is configured so that service cover arrangement 17 is threadably mounted on housing base 16 at thread arrangement 16*t*. Alternate methods of connection are possible, as shown in the embodiment of FIGS. 39-64 but a threaded connection is convenient here. (The non-threaded arrangement of FIGS. 39-64 can be adapted for the embodiment of FIG. 12). As will be understood from further discussion below, lock projection arrangement 36 is positioned to be engaged by a portion of service cover 17 in a manner inhibiting undesirable unlocking during use due to equipment vibration.

Referring back to FIG. 12, at 4 the gas flow outlet arrangement is depicted, in communication with port 35. Port 35 is mounted on, and typically molded integral with, sidewall 16*s*. Positioned interiorly of port 35 is provided conduit ring 38, also typically molded integrally with housing base 16. An interior 38*i* of ring 38 is in direct flow communication with interior 4*i* of gas flow arrangement 4. That is, for the example assembly 1 depicted, for gases to reach outlet 4, they must flow into and through interior 38*i* of ring 38. Alternate constructions, however, are possible.

In FIG. 12, at 40, a diaphragm valve member is depicted. At 41 a biasing arrangement is depicted, in the example depicted configured as a coiled spring 41*s*. When assembled, cover 11 is positioned over, and secures, diaphragm 40 over port 35, closing the port 35. Diaphragm 40 is supported spaced from end 38*e* of inner ring 38 by biasing member 41.

Operation of the regulator valve arrangement 10 can be understood from the following example. Assume that the outlet flow arrangement 4 directs gas flow to an air cleaner or engine air intake. Fluctuation demands of the engine will fluctuate the amount of draw on the gas in outlet arrangement 4. It may be undesirable to transfer such a negative pressure (or draw) into the assembly 1 and the cartridge 20. Thus, the regulator valve 10 under the circumstance will tend to draw closed. More specifically, if the engine draw at outlet arrangement 4 is sufficient, this draw will tend to bias diaphragm 40 toward edge 38*e*, inhibiting gas flow and inhibiting as high a vacuum condition from being transferred through housing 2. On the other hand, if gas flow from the engine is high, relative to the draw at tube 4, the biasing arrangement 41 will bias the valve member 4 away from edge 38*e*, opening gas flow. The biasing arrangement 41 and valve arrangement 40 can be configured so that if the draw at outlet tube 4 is sufficiently high, diaphragm 40 will completely close aperture 38*e*. This is a matter of preference dependent up expected conditions and operation.

The general issue, then, is that for gases to reach tube 4, they must pass over edge 38*e* and into an interior 38*i* of tube 38. It is that flow which is regulated by the valve arrangement 10 including the diaphragm valve 40, sometimes characterized as a rolling hinge valve.

Still referring to FIG. 12, it is noted that a snap-fit can be used for the cover 11, the snap-fit comprising apertures 11*a* on the cover 11 engaging projections 35*p* on the port 35. This will secure the diaphragm 40 and the biasing arrangement 41 in place.

Regulator valve arrangements have been used in connection with crankcase ventilation filter assemblies before, and examples are depicted in WO 2007/053411; WO 2008/147585; WO 2008/115985; and, WO 2009/018454, incorporated herein by reference.

In FIG. 13, again, a side elevational view of housing base 16 is depicted. The view is taken generally toward mounting pad 18*x*. Selected previously identified features viewable include: Sidewall 16*s*; top end 16*e* with threads 16*t* adjacent thereto; lock arrangement 36, mounting pad 18*x* with flanges 18; and bottom 16*b* with outlet 5 (as tube 5*x*). Central housing axis X which also corresponds to a central cartridge axis is depicted, directed through bottom drain outlet 5, and for the example depicted the drain outlet 5 is centered on axis X. Outlet arrangement 4, previously discussed, is also depicted.

Figure 14:
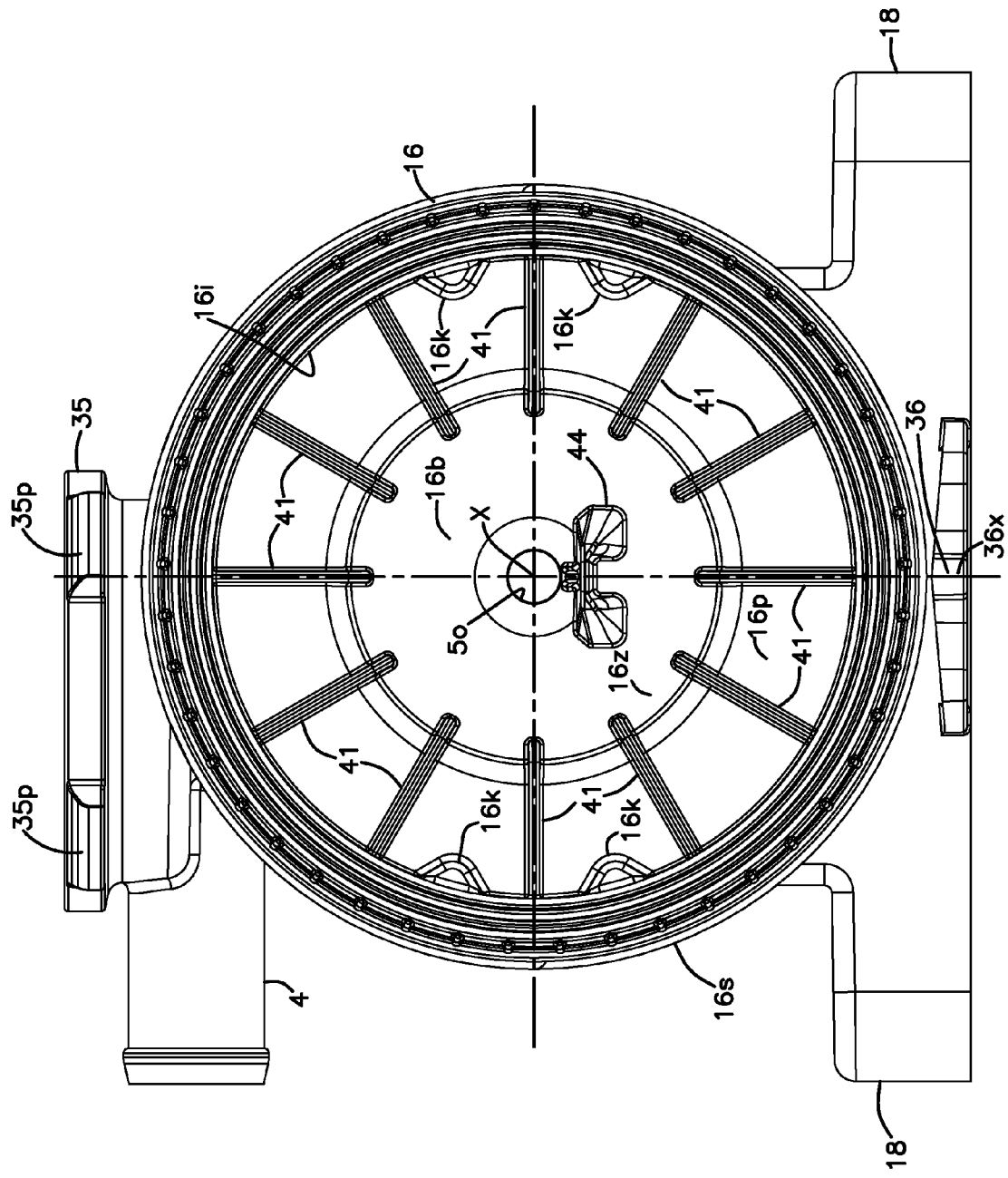
FIG. 14 is a schematic top plan view of the base component depicted in FIG. 9.

In FIG. 14, a top plan view of housing base component 16 is depicted. The view in FIG. 14 is generally of the housing base component 16, without mounting of the separable components of the regulator valve assembly 10 thereon. Thus, the view in FIG. 14 is of the base 16 as it can be molded as a single integral piece.

Referring to FIG. 14, selected exterior features of the housing base component 16, previously described, that are viewable include: Port 35; outlet 4; lock arrangement 36; mounting pad 18*x* with flanges 18 and sidewall 16*s*.

Also in FIG. 14, it can be seen that the particular housing base component 16 depicted, includes only one lock projection 36*x* as lock projection arrangement 36, FIG. 12. It is noted that in some applications of the techniques described herein, the lock projection arrangement 36 can include two or more lock projections 36*x*.

Still referring to FIG. 14, it can be seen that for the example arrangement depicted, housing base component 16 generally includes sidewall 16*s* defining a generally circular interior 16*i*. The circular interior 16*i* extends around, and is typically concentrically positioned relative to central axis X, FIG. 13, which a vertical axis extending through the housing 2 and the cartridge 20. Alternatives are possible.

In FIG. 14, an interior surface 16*z* of bottom 16*b* can be seen. The interior surface 16*z* of bottom 16*b* includes a plurality of radial ribs 41 thereon, which, in part, provide strength to the bottom surface 16*z*.

In FIG. 14, at 5*o*, an opening to the bottom drain arrangement 5, FIG. 1, is shown. Positioned adjacent opening 5*o* for the drain 5, FIG. 14, is a projection arrangement 44. The projection arrangement 44 generally projects from a portion of bottom surface 16*z* in a direction away from drain 5 and generally toward upper end 16*e* of base 16; i.e. toward service cover 17, FIG. 1. Projection arrangement 44 is configured to interact with serviceable filter cartridge 20 in manners discussed below. For the particular arrangement depicted, the projection arrangement 44, is a member of a (first) projection/receiver arrangement, of which another member is positioned on the cartridge 20. For the particular assembly 1 depicted, projection arrangement 44 is (optionally) also part of a cartridge-to-housing component (or housing component-to-cartridge) rotational orientation (or alignment) indexing arrangement, which ensures that the cartridge 20 is installed in a selected rotational orientation relative to the housing base component 16. This helps ensure that the cartridge 20 is a proper cartridge for the assembly and is appropriately oriented.

Also viewable in FIG. 14, are radially inwardly projecting tabs 16*k*, formed by recesses 16*j*, FIG. 12. The tabs 16*k* are oriented adjacent bottom 16*z*, and will mate with selected portions of a cartridge 20 as discussed below.

Figure 15:
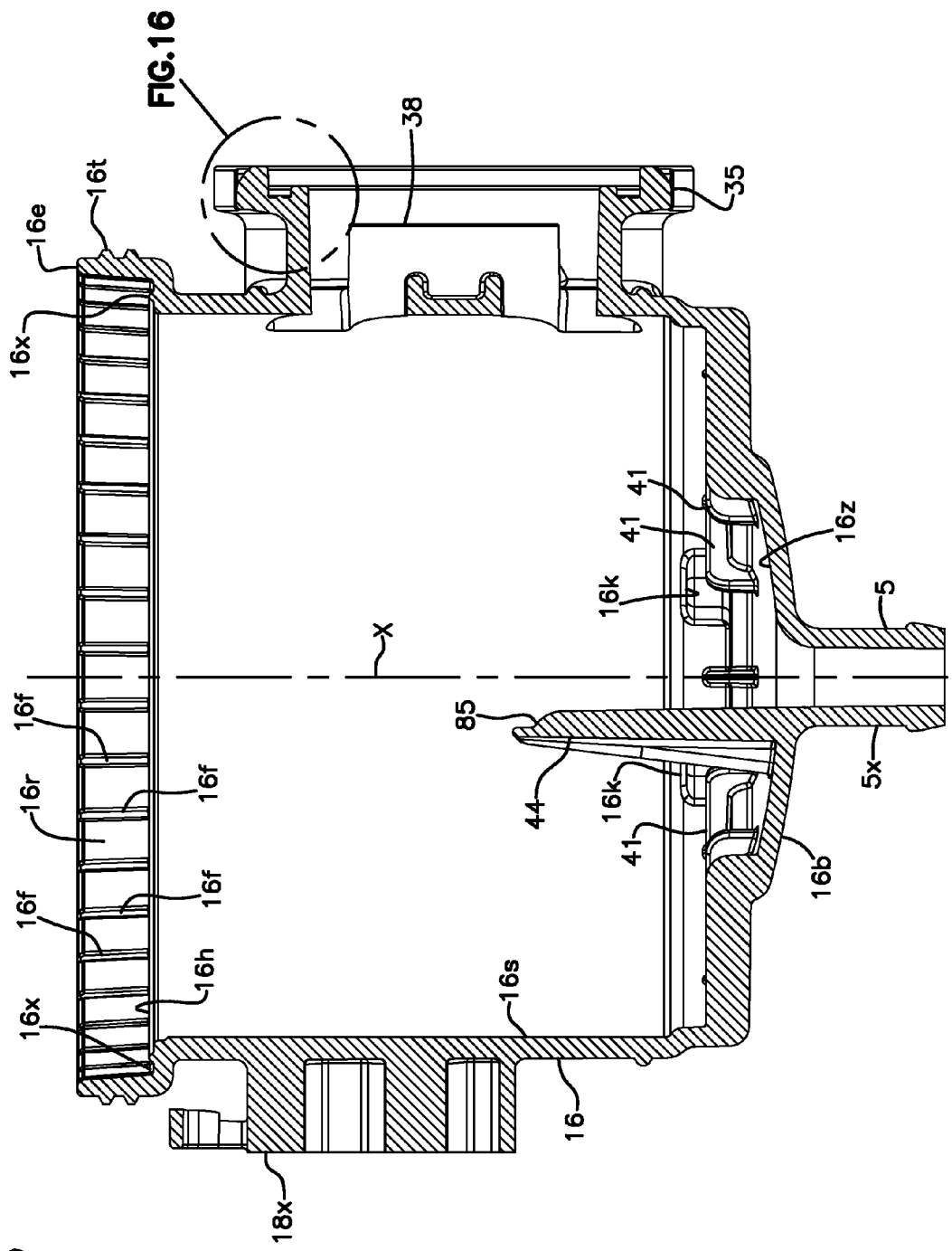
FIG. 15 is a schematic side cross-sectional view taken generally along line 15-15, FIG. 14.

Attention is now directed to FIG. 15, a cross-sectional view taken generally along line 15-15, FIG. 14. Here, the projection arrangement 44 can be seen projecting toward end 16e and, in assembly 1, FIG. 1, toward access cover 17. It is noted, referring to FIG. 14, that in FIG. 15, half of the projection arrangement 44 is depicted, the opposite half typically being a mirror image. Again, features of projection arrangement 44 configured for interaction with the cartridge 20, will be better understood from discussion below after the cartridge 20 is discussed.

Still referring to FIG. 15, other features viewable in the cross-section, as previously described, include: threads 16t; port 35; inner ring 38; mounting pad 18x; bottom ribs 41; projection 16k; and, drain outlet 5o. It can be seen that the ribs 41 create flow spaces therebetween for drain flow under a received cartridge 20, in use.

Figure 16:
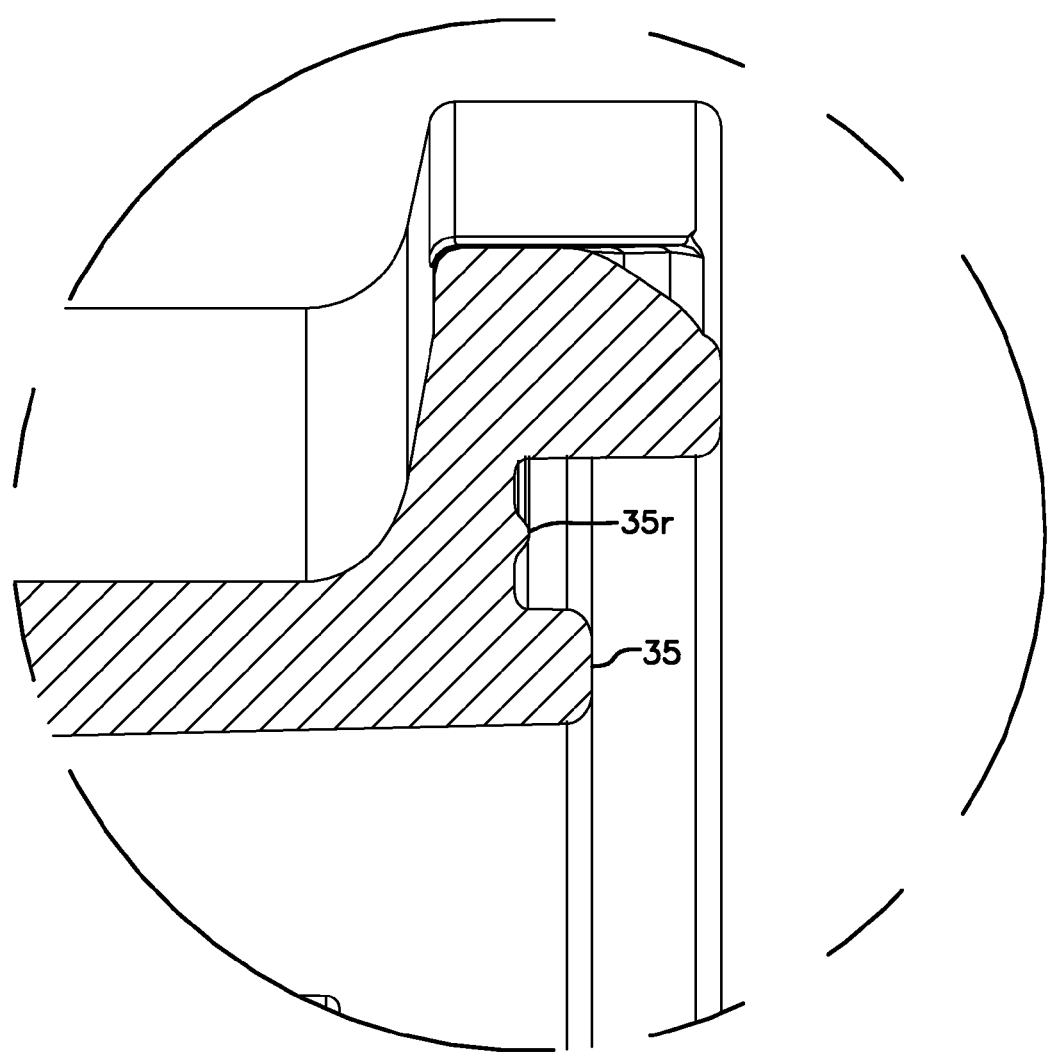
FIG. 16 is a schematic enlarged fragmentary view of an identified portion of FIG. 15.

FIG. 16 is a fragmentary cross-sectional view of a portion of FIG. 15. Rib 35r is shown positioned in port 35 to engage a rim portion of the diaphragm 40, FIG. 12, to facilitate sealing.

C. The Filter Cartridge Generally, FIGS. 11 and 17-30

Attention is now directed to FIG. 11, in which filter cartridge 20 is depicted in top perspective view. The filter cartridge 20, as previously indicated, generally comprises media 21 positioned in extension around an open filter interior 22. The media 21 is positioned between opposite first and second end pieces 23, 24. The media 21 is generally configured to receive gases directed therethrough, and to allow for coalescing of liquid within the media 21 with trapping of certain contaminant. A variety of media appropriate for gas/liquid separation can be used, and the choice of one for the application of interest is not critical to many of the particular features described herein. Example usable media include those described in WO 2006/084282; WO 2007/0535411; WO 2008/115985; and, WO 2006/91594 incorporated herein by reference.

The particular cartridge 20 depicted is configured to be vertically oriented when installed. That orientation is typically with first end piece 23 oriented as an upper end piece and with second end piece 24 generally oriented as lower or bottom end piece.

Referring to FIG. 11, attention is directed to first (upper) end piece 23. The first end piece 23 includes an outer perimeter region 23p, which, in the example depicted, comprises a housing seal member 50. The term "housing seal" and variants thereof as used herein, is meant to refer to a seal member positioned on a serviceable cartridge 20 such that when the cartridge 20 is installed in a housing 2, the housing seal member 50 is positioned and configured to form a seal with a portion of a housing 16. In addition, a "housing seal" as the term is used herein, is a seal that is releasable, i.e. which separates from sealing when the cartridge 20 is removed from the housing 2, without damage to the housing 2 or seal member 50.

The particular housing seal member 50 depicted, is shown positioned on the first end piece 23, oriented as a perimeter housing seal. The particular housing seal 50 depicted, is configured to form a downwardly directed seal at edge 50e with a portion of the housing 2, in installation. In particular, and referring to FIG. 15, housing base 16 includes, in sidewall 16s, an upper seal shoulder 16x spaced downwardly from end 16e. The shoulder 16x receives pushed downwardly (axially) thereagainst, lower end 50e of seal member 50, when the cartridge is installed. Sealing occurs by the downward (axially directed) force on the seal 50 against the shoulder 16x. To facilitate sealing, the shoulder 16x includes a rib 16h thereon, FIG. 15 that will be pressed into the seal member 50.

Such a seal is sometimes referred to as axially directed seal, since the sealing forces are in the longitudinal direction of extension of central axis X. Such seals are sometimes referenced as "pinch" seals, since the sealing occurs by pinching the seal member 50 between housing components. In the cross-sectional view of FIGS. 7 and 8, the seal member 50 can be seen as pressed downwardly against shoulder 16x to cause the sealing described. Ribs 16h is viewable. Also, viewable is a portion 17z of access cover 17 oriented to push downwardly on seal member 50, as the cover 17 is mounted, to facilitate sealing. (It is noted that the embodiment of FIGS. 1-37 can be adapted to use a radially directed housing seal arrangement, for example, analogously to the embodiment of FIGS. 39-64, or with alternative configurations. A radially directed seal is configured with sealing forces, directed generally toward or away from central axis X).

Referring to FIG. 15, it is noted that shoulder 16x is surrounded by upwardly directing flange 16r. Flange 16r has a threaded outer surface. The inside portion of flange 16r is provided with optional recesses or grooves 16f therein, extending generally aligned with axis X. It is not intended that the surface 16r be used as a seal surface in the assembled filter arrangement. Grooves 16f will help inhibit any such use. It is noted that ribs can be included on surface 16r to, in part, address this issue also. (If surface 16r was intended to be used as a seal surface for a radial seal, the ribs 16f would not be present).

Referring again to FIG. 11, upper end piece 23 is depicted as having gas flow aperture 51 extending therethrough, in communication with the open filter interior 22. Aperture 51, for an in-to-out flow system as depicted, is an aperture that allows for gas flow entry, of gas to be filtered into interior 22. For the particular assembly depicted, the upper aperture 51 receives, projecting therethrough, a portion of inlet tube 3x, as discussed further below.

Typically, the aperture 51 is sized and configured to have a largest dimension thereacross of at least 8 mm, usually at least 10 mm and often an mount within the range of 15-40 mm, usually 15-25 mm, although alternatives are possible. The particular aperture 51 is circular in outer perimeter definition, although alternatives are possible.

Typically, the first end piece 23 is a multi-piece construction, comprising: a preformed, typically rigid, central frame portion 23x; and, seal member 50 comprising a gasket secured to, or molded-in-place on, the frame portion 23x. The rigid portion 23x has an upper surface 23u with strengthening ribs 23r thereon, in the depicted example.

The particular cartridge 20 depicted, includes a projection arrangement 55 projecting upwardly from central frame portion 23x, of end piece 23, in a direction generally away from end piece 24 of media 21. The projection arrangement 55 comprises at least one projection 55a, in the example at least two projections 55a, each of which project away from the media 21 a distance of (at least) 5 mm, usually at least 10 mm, and often at least 15 mm in total height, from adjacent portion of ridge center 23x. The projection arrangement 55 can be used to facilitate radial orientation of the access cover 17 relative to the cartridge 20 and a housing base 16, as discussed below. (It is noted that the cartridge 20 can be configured with only a single such projection, for example, in accord with the embodiment of FIGS. 39-64).

For the particular cartridge 20 depicted, the projection arrangement 55 also comprises a handle arrangement 56.

The handle arrangement 56 facilities grasping of the cartridge 20 for installing it in the housing base component 16 and removing it therefrom. The particular handle arrangement 56 depicted comprises at least one, and in the example two, handle member(s) 56b (although a single handle member could be used). Although alternatives are possible, in the example depicted the two handle members 56b are radially spaced, arcuate, extensions 56b, each projecting upwardly and laterally outwardly, and thus having an axial extension 56a and an upper, radial (outward) lip or rim 56s. The lips or rims 56s are oriented and shaped to facilitate handling of cartridge 20.

Referring to FIG. 11, it is noted that the two projection members 55a each have an arcuate shape around a central axis X, FIG. 8 that extends around an axis X over an angular arc of at least 50°, usually an amount within the range of 50°-150°, inclusive, and often at least 70°, although alternatives are possible. Further, the two projection members 55a are closer to one another at one end than in another. Alternately stated, the projection members 55a, in the example depicted comprising handle member 56b, are asymmetrically positioned around central axis X.

It is noted that on uppermost end 56a of each member 56 need not necessarily extend in a plane perpendicular to axis X. That is, upper edges 56a can slant upwardly in extension from one end of each member 55a to the other.

Figure 17:
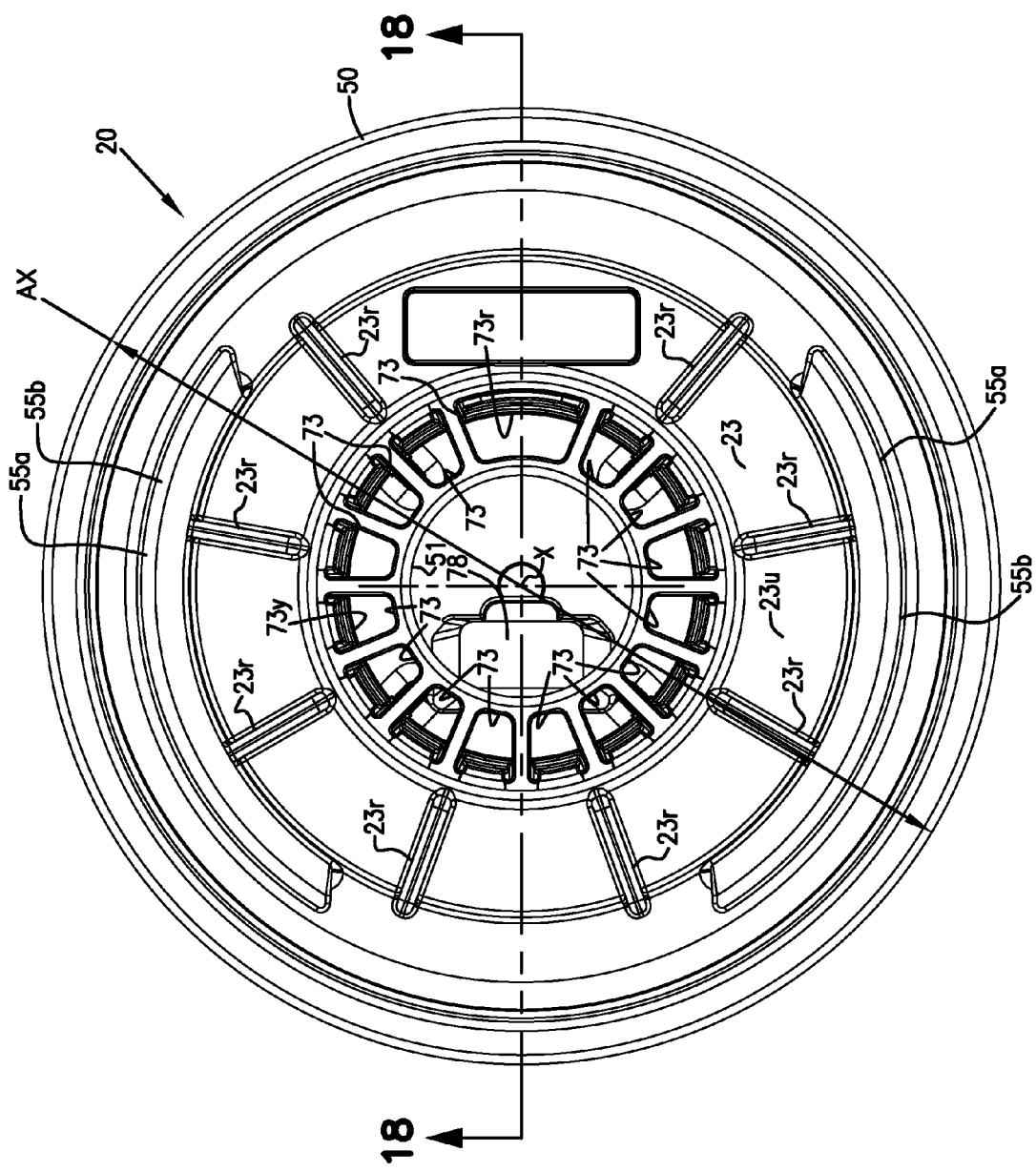
FIG. 17 is a schematic top plan view of the filter cartridge component depicted in FIG. 11.

Attention is now directed to FIG. 17, a top plan view of the cartridge 20; the view of FIG. 17, therefore being taken toward upper surface 23u of end piece 23. It can be seen that the depicted aperture 51 is centrally positioned, i.e. is centered on a central axis X of the cartridge 20 and media 21, FIGS. 7 and 8.

Figure 18:
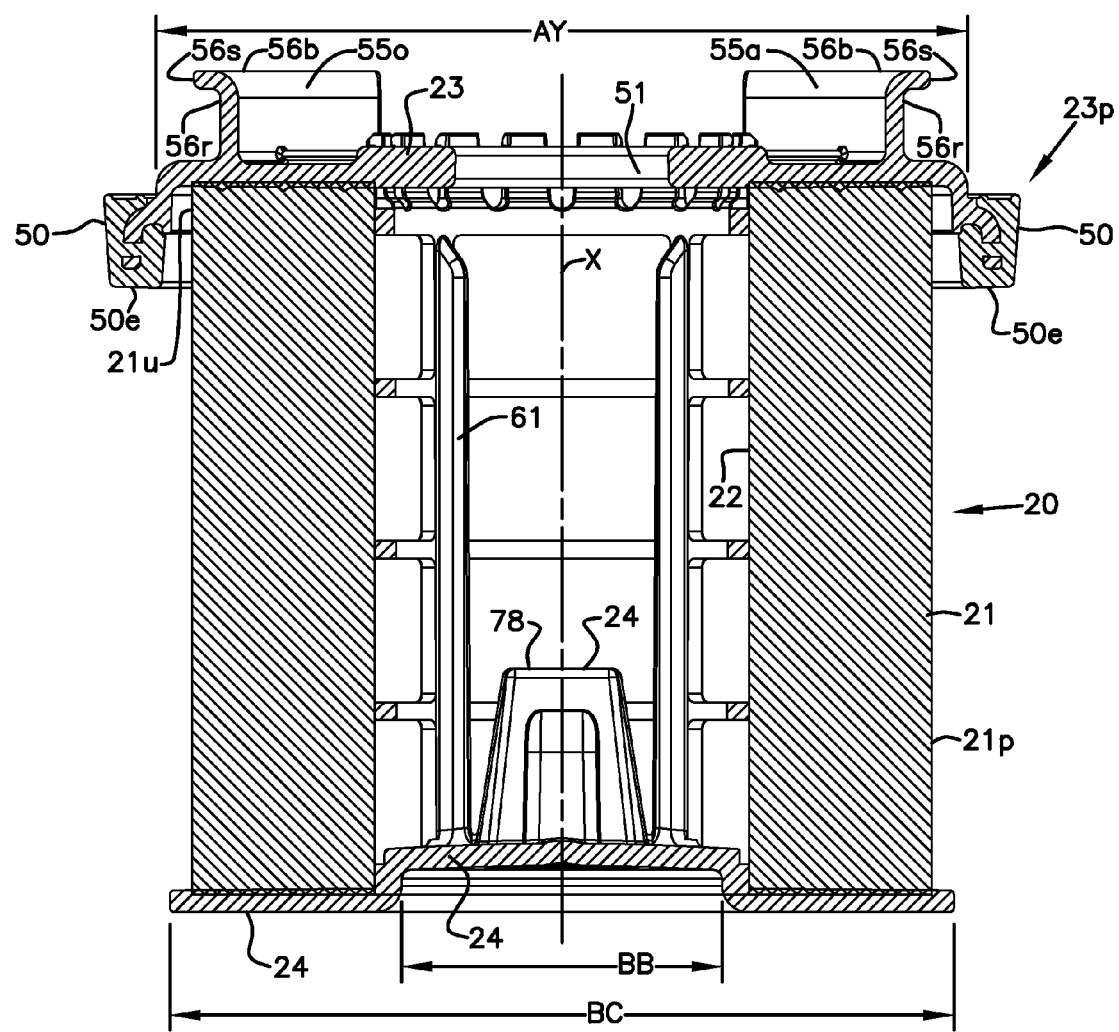
FIG. 18 is a schematic cross-sectional view of the filter cartridge component of FIG. 11, taken generally along line 18-18, FIG. 17.

Attention is now directed to FIG. 18, a cross-sectional view taken generally along line 18-18, FIG. 17. Referring to FIG. 18, features previously described and viewable, generally include: media 21 surrounding and defining open filter interior 22, and in the example depicted, centered on central axis X; end piece 23 with central aperture 51 therethrough, outer perimeter 23p with housing seal member 50 to provide seal end 50e; and, second end piece 24. Further, portions of the handle members 56b (projections 55a) are viewable.

In FIG. 18, recess 56r under lips 56s, of the handle members 56b, can be seen. It will be understood that this will facilitate grasping the cartridge. Typically, lip 56s will be configured so that the space underneath it has a vertical dimension of at least 5 mm, typically at least 7 mm. Again, this space or recess 56r can increase if upper lips 56s slant upwardly.

Still referring to FIG. 18, for the particular cartridge 20 depicted, perimeter 23p and seal member 50 are positioned surrounding an end (in the example upper end 21u) of media 21. In particular, the seal member 50 and perimeter 23p extend axially toward end piece 24, from upper end 21u of the media 21, an amount of at least 3 mm, typically at least 5 mm and often at least 7 mm, for example, within the range of 7-20 mm. Although alternatives are possible, in a cartridge analogous to cartridge 20 (in which at least a portion of the perimeter 23p and seal member 50 are oriented surrounding a portion of the media 21 and projecting downwardly from upper end 21u of the media 21) a distance as described has advantages for "vertically challenged" applications, as discussed below.

In more general terms, the first end piece 23 includes a perimeter rim 23p having a portion projecting at least 3 mm toward the second end piece 24 while also completely surrounding the media 21. This portion typically projects at least 5 mm, usually at least 7 mm and typically an amount within the range of 7-20 mm as defined. When these terms and dimensions are used, it is meant that an axial extension of the rim portion 23p which both extends in the axial direction of the second end piece 24 and which also surrounds, completely, the media pack 21, has the minimum distance or distance range as defined. Portions of the preform 23 which do not surround the media 21 are not counted within this dimensional definition. Reasons for this will be understood from certain discussions below.

The feature of the perimeter 23p and seal member 50 having at least a portion thereof surrounding the media 21 distinguishes the specific units depicted in WO 2008/115985; WO 2008/157251; and, WO 2009/018454, incorporated herein by reference. It is noted that with the arrangements depicted in WO 2008/115985; WO 2008/157251; and, WO 2009/018454, it was described that the cartridge could comprise a spool shaped, integral, preform member, with the upper end piece and lower end piece formed integrally with a central cartridge support. This was readily possible, because the media could be wound in place on the central cartridge support or spool.

In an arrangement in which the perimeter 23p and seal member 50 surround an end 21u of the media, this winding of the media 21 onto such a central "spool shaped" construction is not as readily accomplished since a such winding operation would be inhibited by the rim 23p on the end piece 23. However, winding of the media 21 in place on a central support is a preferred manner of manufacture, with some media types. To accommodate this, the preferred cartridge 20 depicted comprises multiple components that are secured together, for example with a snap fit or other attachment arrangement, to form the full rigid framework portion thereof after the media is in place. These components can be viewed in FIG. 18, as comprising: upper end piece 23; and, central cartridge support 61. The central cartridge support 61 and bottom end piece 24 can (optionally) be formed as a single integral unit, for example, molded from plastic, and the end piece 23 can be secured thereon, for example with a snap-fit or other attachment arrangement, after the media 21 is in place.

Of course, alternate constructions can be made. For example, the first end piece 23, second end piece 24, and central cartridge support 61 can be separately made and be secured together. Further, in some applications, the first end piece 23 can be secured integral with the central cartridge support 61, and the second end piece 24 can be snap-fit in place. However the when the first end piece includes a perimeter 23p that projects axially as described, it will be convenient to load the media 21 onto the central cartridge support 61 before the end piece 23 is in place. Since there is no similar rim which would interfere with assembly on the second end piece 24, it is convenient to form the central cartridge support 61 and second end piece 24 integral with one another, as a preform 60.

Of course, alternate methods of connecting the components, beside snap-fit, can be used. For example, with two preformed components can be secured together with sonic welding or heat welding, or with adhesive, or by alternate means. However, a snap-fit connection is particularly convenient for manufacture and assembly.

Figure 19:
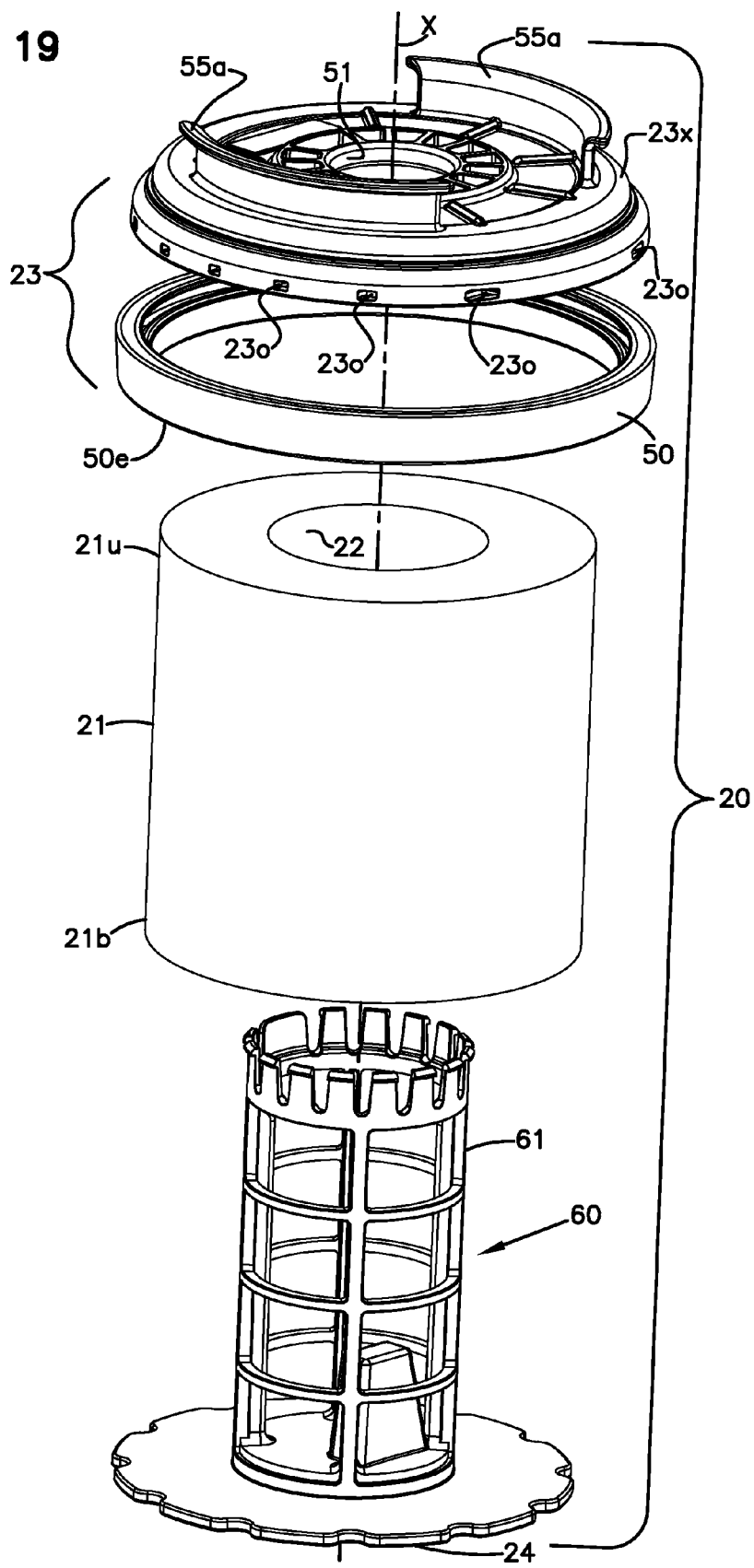
FIG. 19 is a first schematic exploded perspective view of the filter cartridge component of FIG. 11.

With respect to the assembly of cartridge 20 as described, attention is directed to FIG. 19, an exploded perspective view of the cartridge 20. Referring to FIG. 19, viewable are: the first or upper end piece 23 comprising preform center section 23x with aperture 51 therethrough, and seal member 50, shown as exploded from one another. In the depicted examples, the seal member 50 is positioned on (molded-inplace on) piece 23 and is not removable therefrom, although alternatives are possible. In the depiction of FIG. 19, perimeter apertures 23o are positioned in a perimeter of piece 23x. When seal member 50 is molded-in-place, the resin will flow through these apertures 23o, securing the seal 50 against removal.

Also viewable in FIG. 19 is preform 60 comprising central cartridge support 61 and end piece 24. Further, in FIG. 19, media or media pack 21 is viewable. The media 21 is schematically depicted and can comprise a variety of arrangements including: a cylindrical construction formed as a unit or as a coiled construction of media, or alternate configurations.

FIG. 19 is not meant to indicate that the cartridge 20 would be assembled by fitting the parts together in the matter shown, rather the exploded view is provided to understand the various components. Typical assembly will be discussed further herein below.

Figure 20:
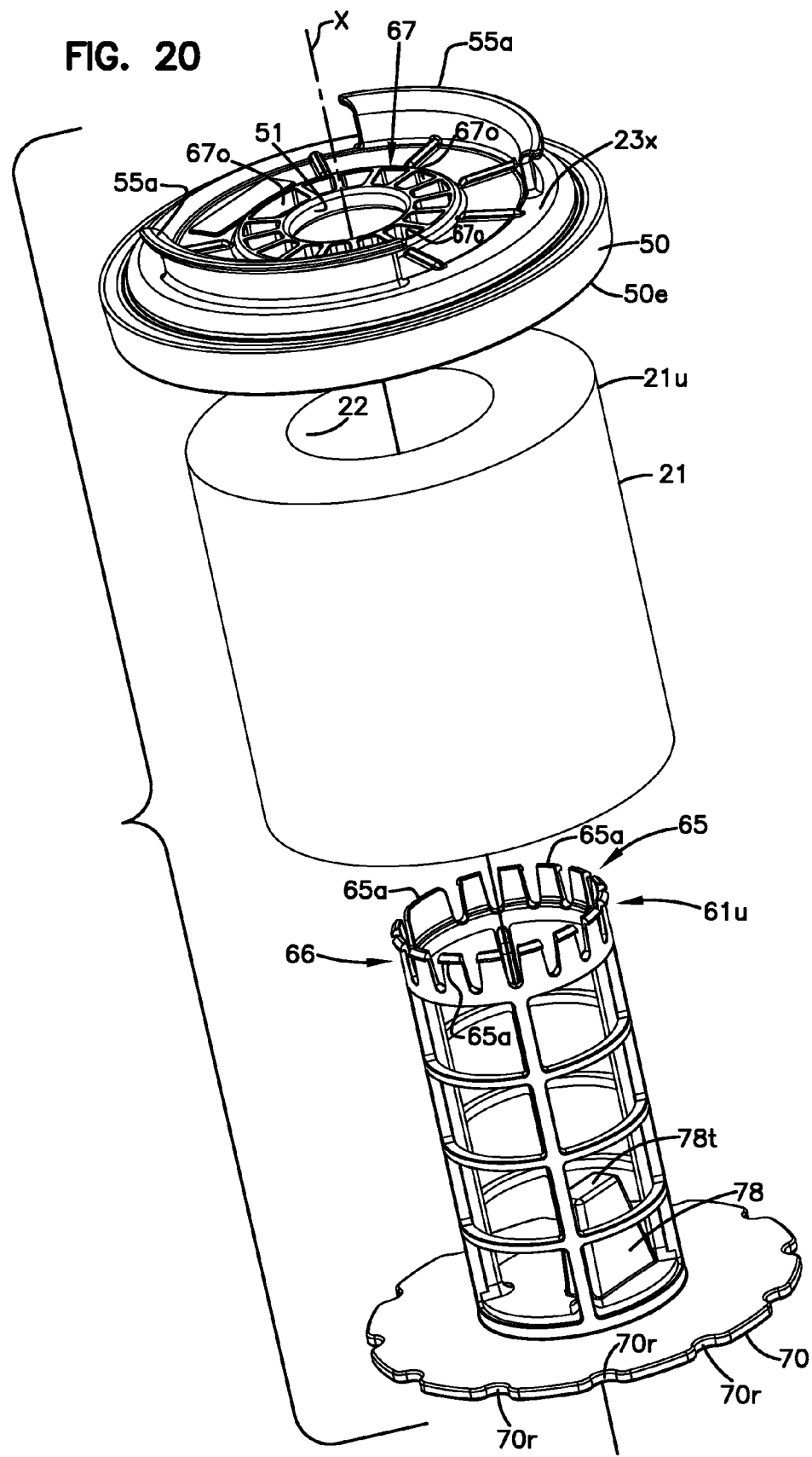
FIG. 20 is a second schematic exploded perspective view of the filter cartridge component depicted in FIG. 11.

In FIG. 20, an alternate exploded view is depicted, generally analogous to FIG. 19, except showing that the end piece 23 would be typically be pre-assembled with seal arrangement 50 thereon.

For a typical assembly, preform 60 would be prepared and the media 21 would be positioned thereon. The media 21, for example, can comprise media coiled around central cartridge support 61.

Referring to FIG. 20, at end 61u (of support 61) opposite end member or end piece 24, the central cartridge support 61 includes a member 65 of a cartridge engagement arrangement 66, for engagement with another member 67 on end piece 23. Typically and preferably, the cartridge engagement arrangement 66 is a snap-fit projection/receiver arrangement, configured so that when the two members 65, 67 are brought together, they engage in a snap-fit manner inhibiting separation. For the particular arrangement depicted, first member 67 is a receiver arrangement, and second member 65 is a projection arrangement; in the example depicted the projection arrangement 65 comprising a hook arrangement and the receiver arrangement 67 comprising a receiver aperture arrangement. For the particular assembly depicted, the projection arrangement 65 comprises a plurality of flexible snap-fit hooks 65a; and, the receiver arrangement 67 comprises a plurality of receiver apertures 67o; the hooks 65a and the apertures 67o being positioned and configured so that when the end piece 23 is pushed over upper end 61u of preform 60, the hooks 65a are deflected radially inwardly until they pass through selected ones of the apertures 67o, at which point they snap back with the hooks 65a preventing the end piece 23 from separating from the cartridge support 61.

It can now be understood that the media 21 can be coiled onto the support 61, even though the upper end piece 23 supports a seal arrangement that surrounds a location projecting along a side of the media. Thus, vertical space is saved (or more effectively used) by not requiring the seal arrangement 50 to be above the media 21 and thus to engage a housing surface at this location.

It is noted that the receiver arrangement 67 comprises a plurality of receiver apertures 67o spaced from central aperture 51, but generally positioned oriented around central axis X. The apertures 67o are in communication with the open filter interior 22.

Figure 21:
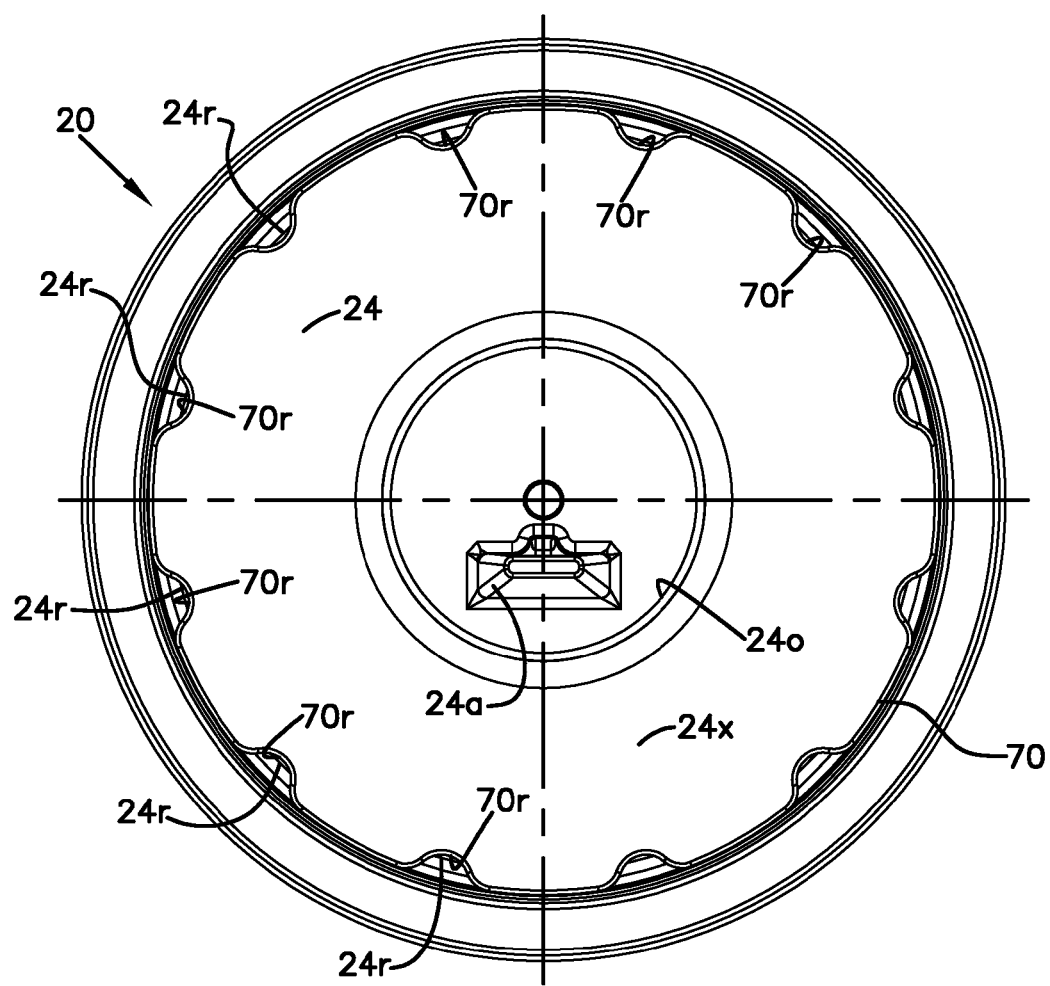
FIG. 21 is a schematic bottom plan view of the filter cartridge component depicted in FIG. 11.

In FIG. 21, a bottom plan view of cartridge 20 is provided. Here, end piece 24 is viewable, along with selected features thereof. Referring to FIG. 21, it is noted that end member 24 includes a central receiver or aperture 24o therein, which defines a closed external receiver 24u for projection arrangement 44, FIGS. 7 and 8, on the housing base 16 during cartridge installation. Aperture 24o extends through a lower most portion 24x of member 24, but it forms a closed external receiver 24u by comprising an arrangement projecting upwardly from portion 24x in preform 60, FIG. 20. This closed external receiver arrangement 24u, FIG. 21 is discussed further below.

By the term "closed" in reference to the receiver 24u, it is meant that the receiver 24u does not include any apertures therethrough, in gas flow communication with the open filter interior 22. Thus, aperture 24o can be viewed as a depression in bottom 24x as opposed to an open aperture through the material of the preform 60.

Referring still to FIG. 21, end piece 24 includes a media axial overlap drain arrangement in accord with various ones of the features described in WO 2007/053411; WO 2005/115985; WO 2008/157251; and, WO 2009/018454, incorporated herein by reference. The media axial overlap drain arrangement is generally a portion of a lower end piece 24, in this instance portion 24r, which is a direct axial overlap with the media 21, so that liquid collected within the media 21 can at least, in part, drain directly downwardly through the end piece 24, without needing to pass completely through the media pack 21 along with the filtration gases. In this instance, the media axial overlap drain arrangement comprises a plurality of recesses 70r in an outer perimeter 70 of the end piece 24. The recesses 70r recess toward central aperture 24o (or central axis X) from outer perimeter 70, the locations axially overlapped by the media 21; i.e. to locations positioned directly underneath the media 21 when the cartridge 20 is oriented for use.

For the particular assembly 1 depicted, gas flow during filtration is from a media inner perimeter 21i, FIG. 18, to an outer perimeter 21p, FIG. 18. During the gas flow, liquid will coalesce within the media 21 and begin to build-up a liquid head therein. Some of this liquid can drain efficiently downwardly through the recesses 70r, FIG. 21, i.e. through the bottom end 21b of the media 21, without needing to pass all the way to the outer perimeter 21p. Of course, some of the liquid may be pushed all the way to the outer perimeter 21p by the gas flow. However, the axial drain arrangement underneath the media 21 helps efficient flow of the coalesced liquid from the media 21 and facilitate operation. Again, such features are similar to ones described in various publications referenced above. It is noted that additional apertures can optionally be included through end member 24 to facilitate liquid drainage.

Comparing FIGS. 11, 14, 20 and 21, it is noted that projections 16k in a bottom portion of housing base 16 (FIG. 14) are sized and positioned to project into selected ones of recesses 70r (FIGS. 11, 20 and 21) of lower end piece 24 of cartridge 20. This helps ensure that as the cartridge 20 is lowered into the housing base 16, the cartridge 20 and housing base 16 are rotationally oriented appropriately relative to one another and that the cartridge 20 is a proper one for use in the assembly 1. There are additional means, provided to help ensure this as well. The projections 16k are optional, but, again, do help the service provider understand that the cartridge 20 is an appropriate one for the system in which it is being inserted.

The engagement between selected ones of the receivers 70r and projection 16k also helps maintain a cartridge in appropriate orientation during handling and use. It is noted that not all of the receivers 70r would be expected to have projection 16k extending therein, rather, typically, a majority of the receivers 70r would not.

With respect to the overall construction of the typical, preferred, preform 60, comprising central cartridge support 61, the lower end piece 24, and the receiver 24u, attention is directed to FIGS. 22-25.

Figure 22:
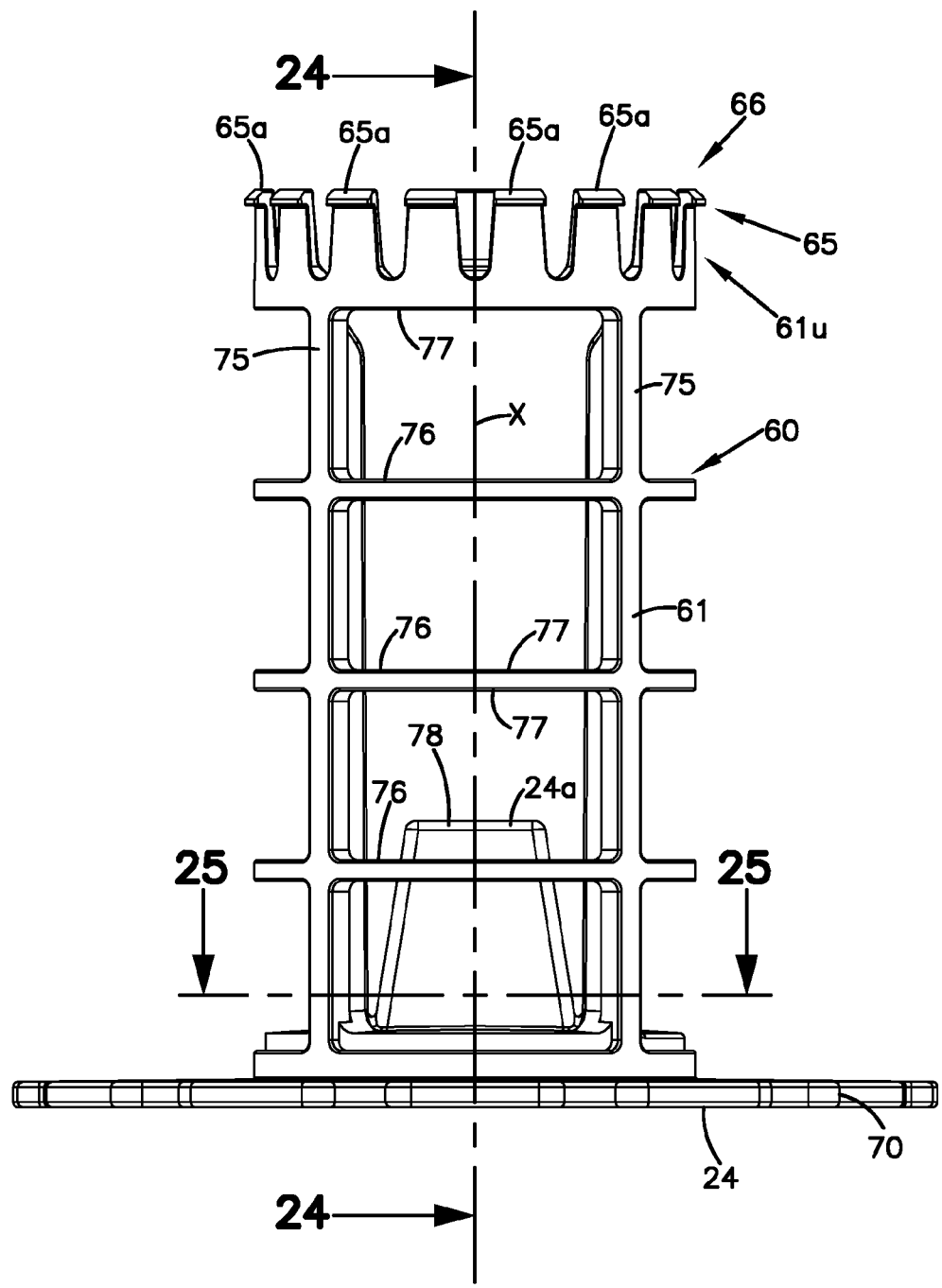
FIG. 22 is a schematic side elevational view of a preform component of the filter cartridge component depicted in FIG. 11.

Referring first to FIG. 22, a side elevational view of the preform 60 is provided. Features previously described include: end piece 24; central cartridge support 61; and, member 65 of the engagement arrangement 66, comprising hooks 65a.

Figure 23:
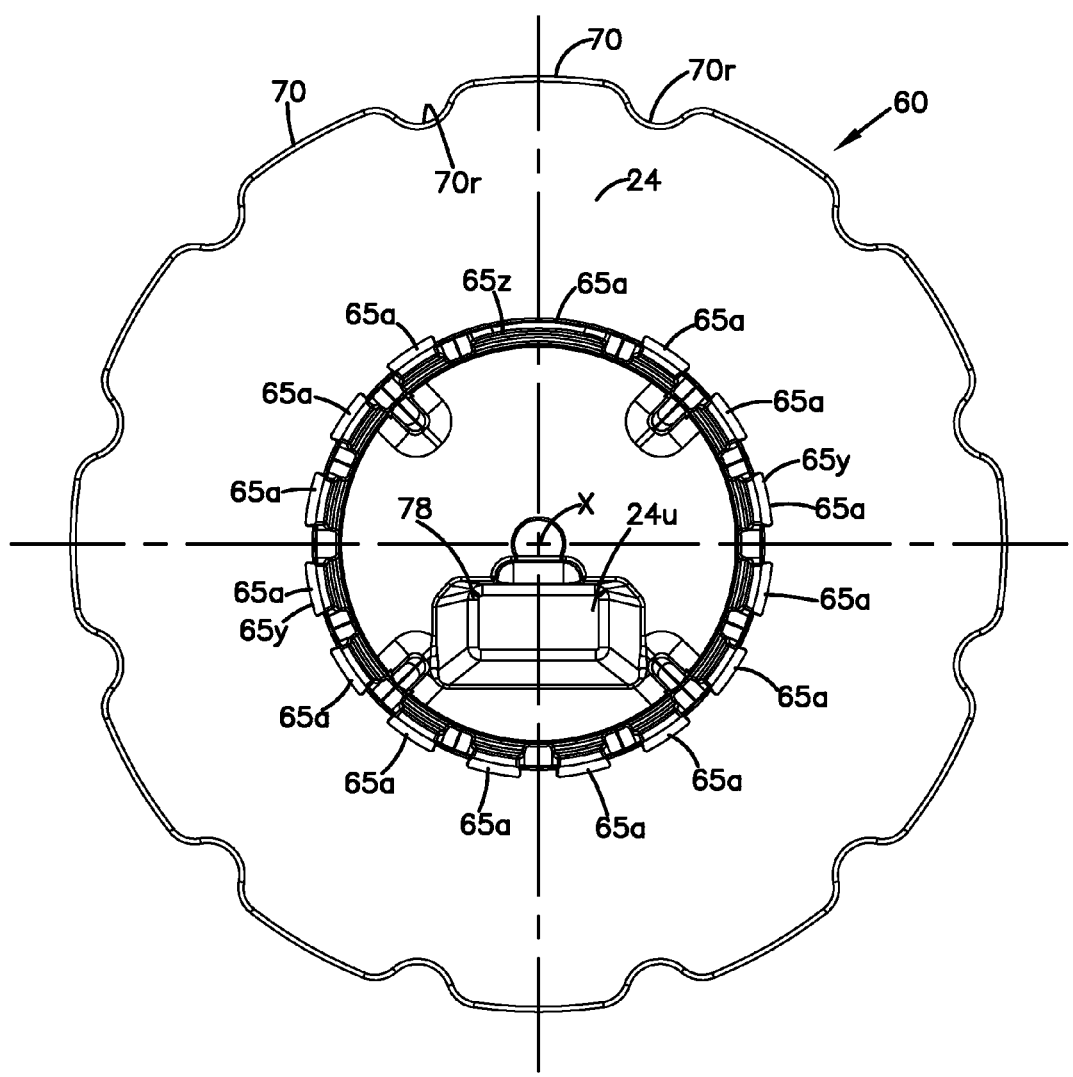
FIG. 23 is a schematic top plan view of the component depicted in FIG. 22.

In FIG. 23, a top plan view of preform 60 is shown. It can be seen, referring to FIG. 23, that individual hooks 65a do not all have the same perimeter dimension, rather some are narrower and at least one is wider; for example at 65z, a wide hook is depicted and at 65y a narrow hook is depicted. Correspondingly, referring to FIG. 17, various ones of apertures 73 which operate as receivers for the second member 67 of the engagement arrangement 66 are narrow or wide, at 73x a wide aperture being shown and at 73y a narrow are being depicted. The configuration of narrow and wide hooks 65a and receiver apertures 73 are selected so that the end piece 23 can only be snap-fit on the preform 60 in one (or a limited number) of relative rotational orientations, preferably only one relative rotational orientation. Alternatives are possible.

Referring to FIG. 22, it can be seen that the central cartridge support 61 comprises an open porous structure, and in the example depicted, comprising a plurality of supports 75 interconnected by ribs 76. From the above description of operation of the assembly 1, it will be understood that gas generally flows through the open pores 77 formed in central cartridge support 61 from this construction.

Still referring to FIG. 22, the receiver 24u optionally defines a single receiver (projection) member 78 positioned offset from central axis X. The receiver (projection) member 78 is configured to receive projecting upwardly therein, a portion of projection arrangement 44 in housing base 16. The manner in which this optionally provides for selected rotational orientation of the cartridge 20 relative to the housing base 16 is discussed further below.

In FIG. 23, again, a top plan view of central cartridge support 70 is provided. Wide hook 65z and narrow hooks 65y can be seen. It is noted that the particular preform 60 depicted, includes only one wide hook 65z although the principles can be practiced with alternate constructions. Also viewable in FIG. 23 are features previously discussed as follows: recesses 70r in end piece 24; and, receiver 24u comprising projection member 78.

Figure 24:
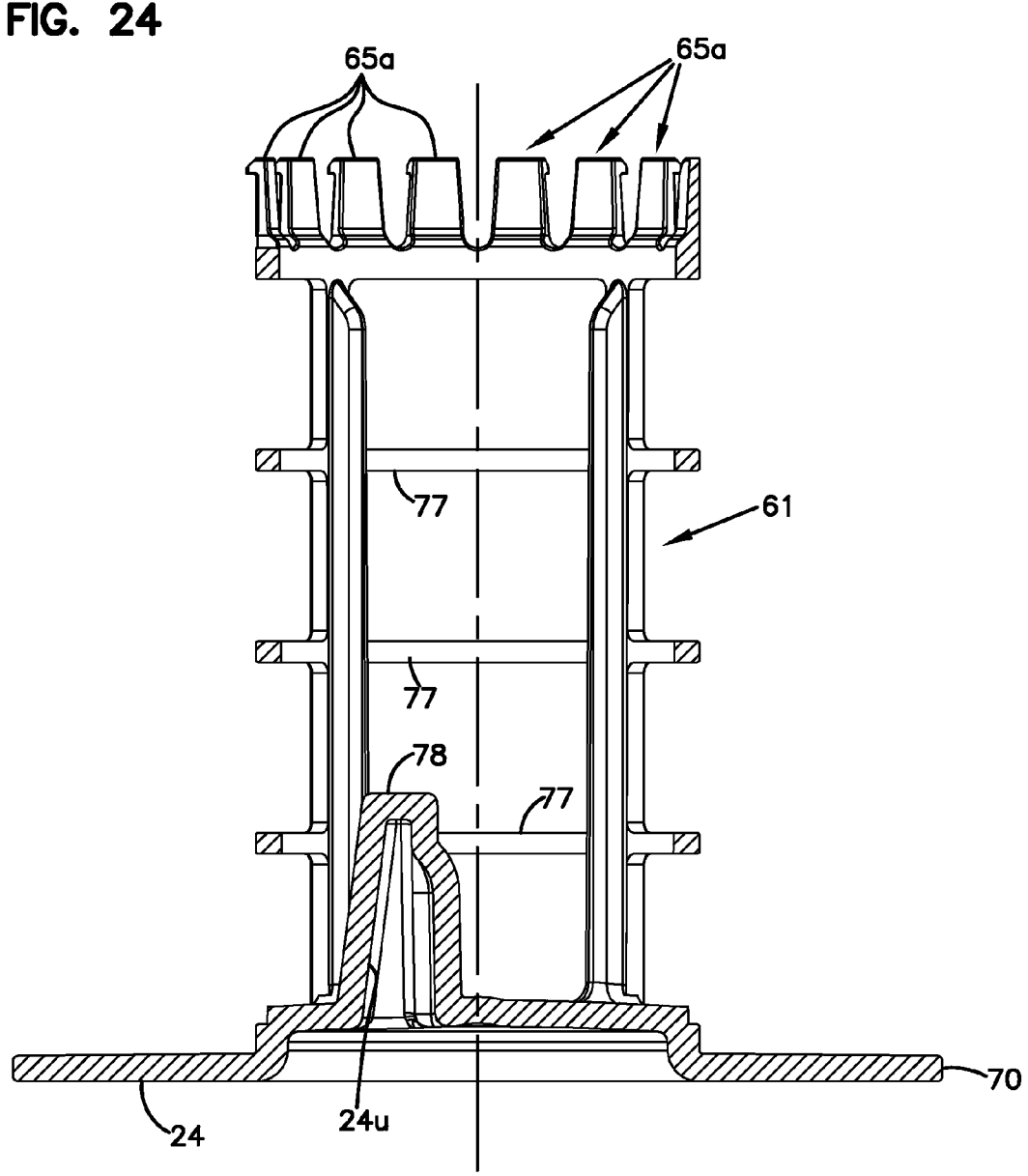
FIG. 24 is a schematic cross-sectional view of the component depicted in FIGS. 23 and 24, taken generally along line 24-24, FIG. 22.

In FIG. 24, a cross-sectional view taken generally along line 24-24, FIG. 22 is depicted. Here features previously discussed and viewable include: central cartridge support 61 with ports 77 therein; hooks 65a; end piece 24 with a perimeter rim 70; and, central receiver 24u defined by receiving member 78.

Figure 25:
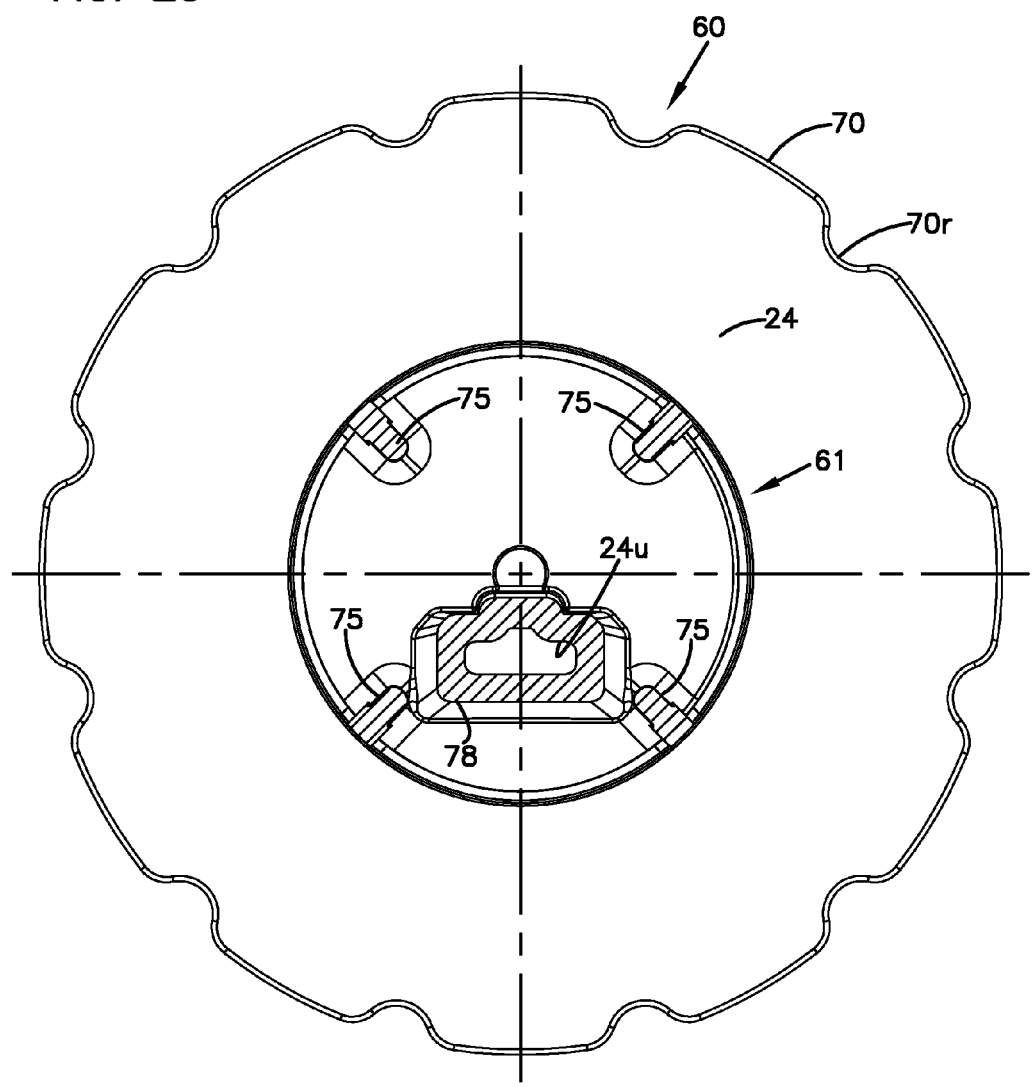
FIG. 25 is an enlarged schematic cross-sectional view taken generally along line 25-25, FIG. 22.

In FIG. 25, an enlarged fragmentary cross-sectional view taken generally along line 25-25, FIG. 22 is provided. This is a downward view into a lower portion of the receiver 24u along an inside thereof.

Figure 26:
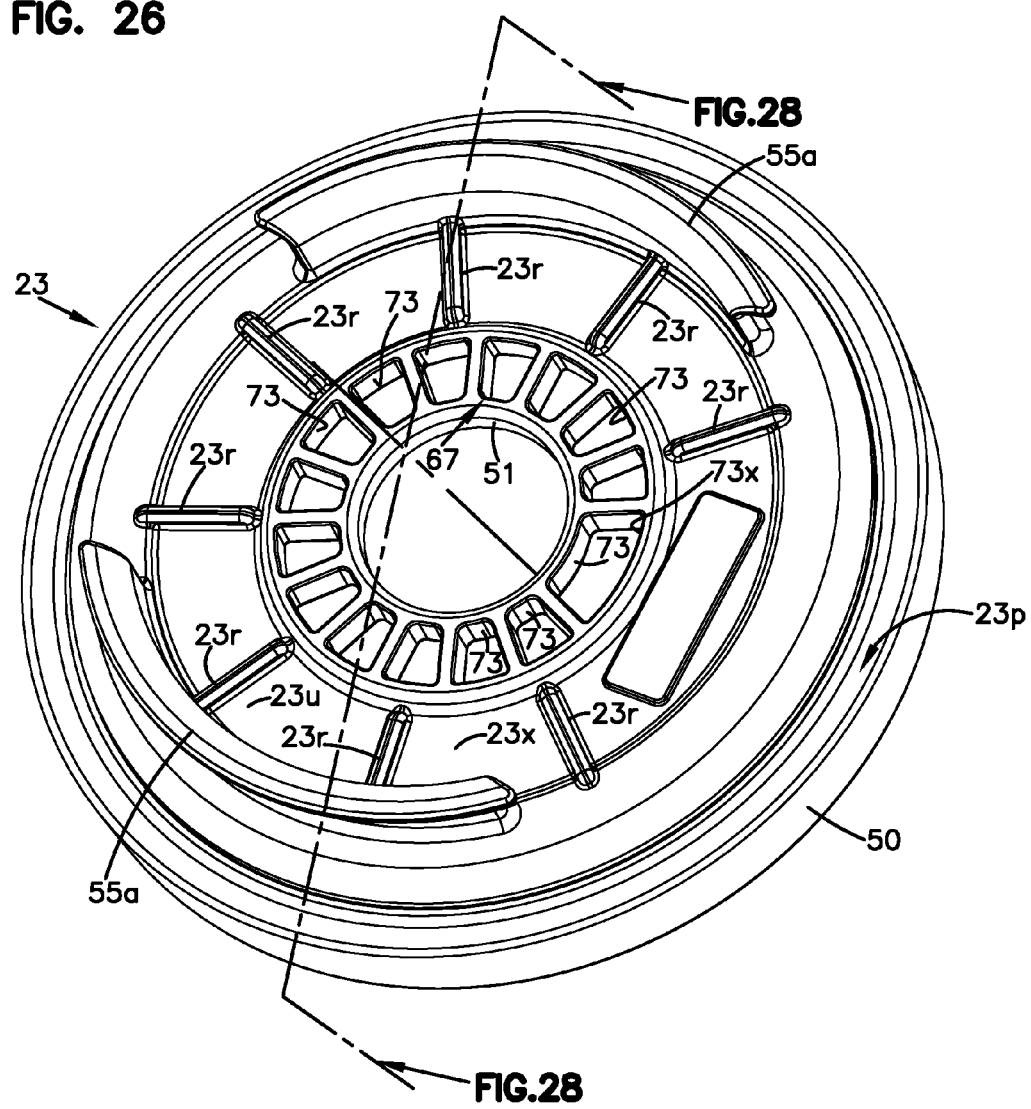
FIG. 26 is a schematic top perspective view of a top piece component of the filter cartridge depicted in FIG. 11.

In FIGS. 26-30, selected features of the top piece 23 can be viewed. Referring first to FIG. 26, a top perspective view of the end piece 23 is shown. Viewable within the figure are previously described features as follows: central portion 23x with upper surface 23u and ribs 23r; perimeter 23p with housing seal member 50; central aperture 51, centrally positioned; projection members 55a; and, apertures 73 which, as described above, operate as a receiver arrangement 67 for the projection arrangement 65 comprising hook 65a, previously described. A single wide aperture 73x, for receipt of the single wide hook is shown. This ensures, again, that the top piece 23 can only be snap-fit on the preform 60 in a single rotational orientation, although alternatives are possible.

Figure 27:
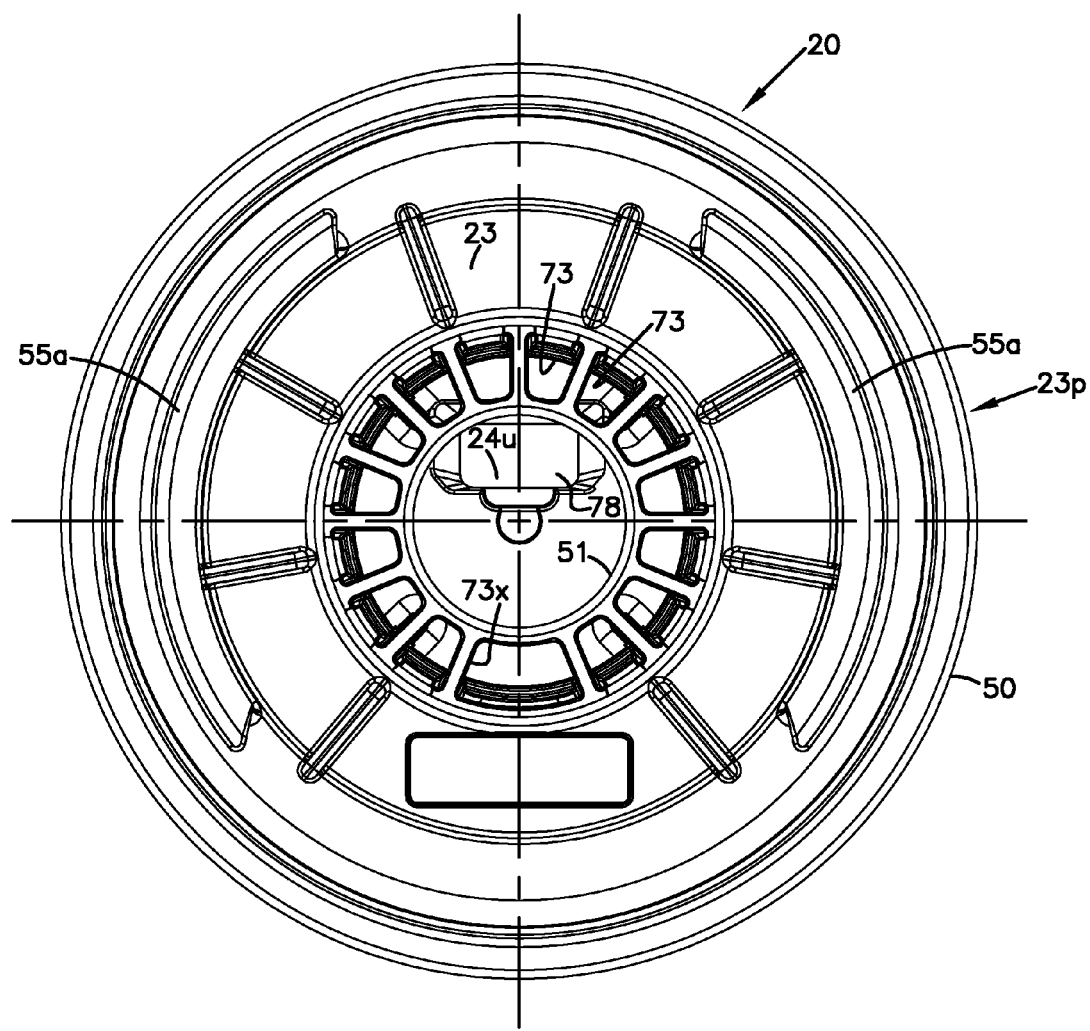
FIG. 27 is a schematic top plan view of a filter cartridge including the component depicted in FIG. 27.

In FIG. 27, a top plan view of the cartridge 20 is provided and viewable are features previously described such as: central aperture 51; apertures 73 including wide aperture 73x; and perimeter 23p including seal 50 thereon.

Figure 28:
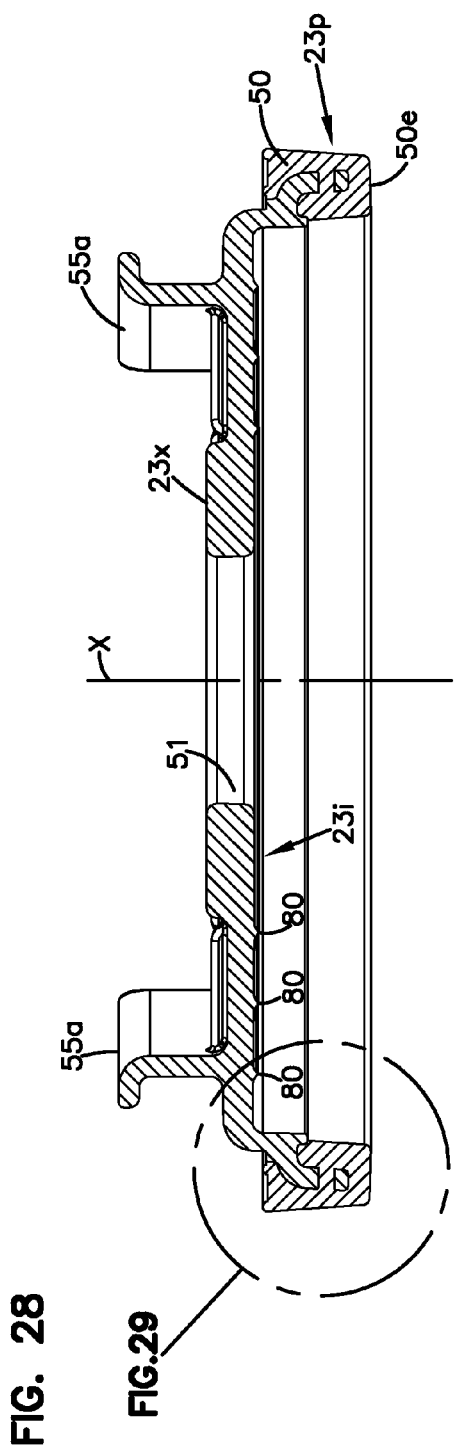
FIG. 28 is a schematic cross-sectional view of the component of FIG. 26, taken generally along 28-28, FIG. 6.

In FIG. 28, a cross-sectional view taken generally along line 28-28, FIG. 26, is provided. Viewable features previously discussed in perimeter 23p with seal 50; central aperture 51 and portions of projection members 55a.

Figure 29:
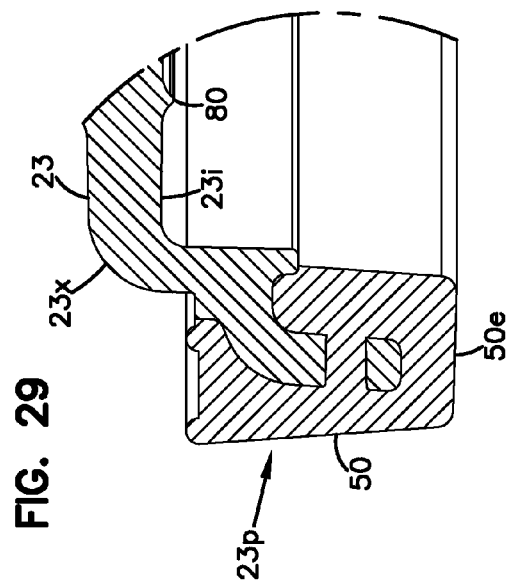
FIG. 29 is an enlarged fragmentary schematic view of an identified portion of FIG. 28.

In FIG. 29, an enlarged fragmentary cross-sectional view of an identified portion of FIG. 28 is indicated. Viewable is a rib 80 projecting downwardly from a center portion 23x of the piece 23, (on an inner or inner surface 23i) spaced radially inwardly from perimeter 23p. From a review of FIG. 28, it will be seen that cover 23 has a plurality of (in the example three) ribs 80. The ribs 80 will generally press into the media 21, when the piece 23 is snap-fit in place on the preform 60 with the media 21 in place. The ribs 80 will inhibit a gas flow path across the end piece 23 above the media 21. Thus, typically an adhesive or sealant is not needed at this location, and the ribs 80 will be adequate to inhibit gas flow bypassing the media 21, to the extent typically desired for a crankcase ventilation filter operation. Referring to FIGS. 27-29, for the particular assembly depicted the ribs 80 are concentric, and central with respect to central axis for the cartridge 20. While this is typical, alternatives are possible. (It is noted that such ribs, or rib arrangements, can be implemented in the embodiment of FIGS. 39-64, if desired).

In more general terms, end piece 23 includes a rib arrangement thereon, along an inner or lower surface thereof. The rib arrangement can comprise one or more ribs 80 typically continuous in extension around central axis X, typically concentric therewith and concentric with each other. The rib arrangement comprises one or more ribs 80 configured to push into media, when the end piece 23 is installed in the cartridge 20, to advantage.

Again, In FIG. 28, it can be seen that the particular end piece 23 depicted includes three ribs 80 radially spaced from one another, and each concentric with a central axis of the cartridge. Alternatives are possible.

Figure 30:
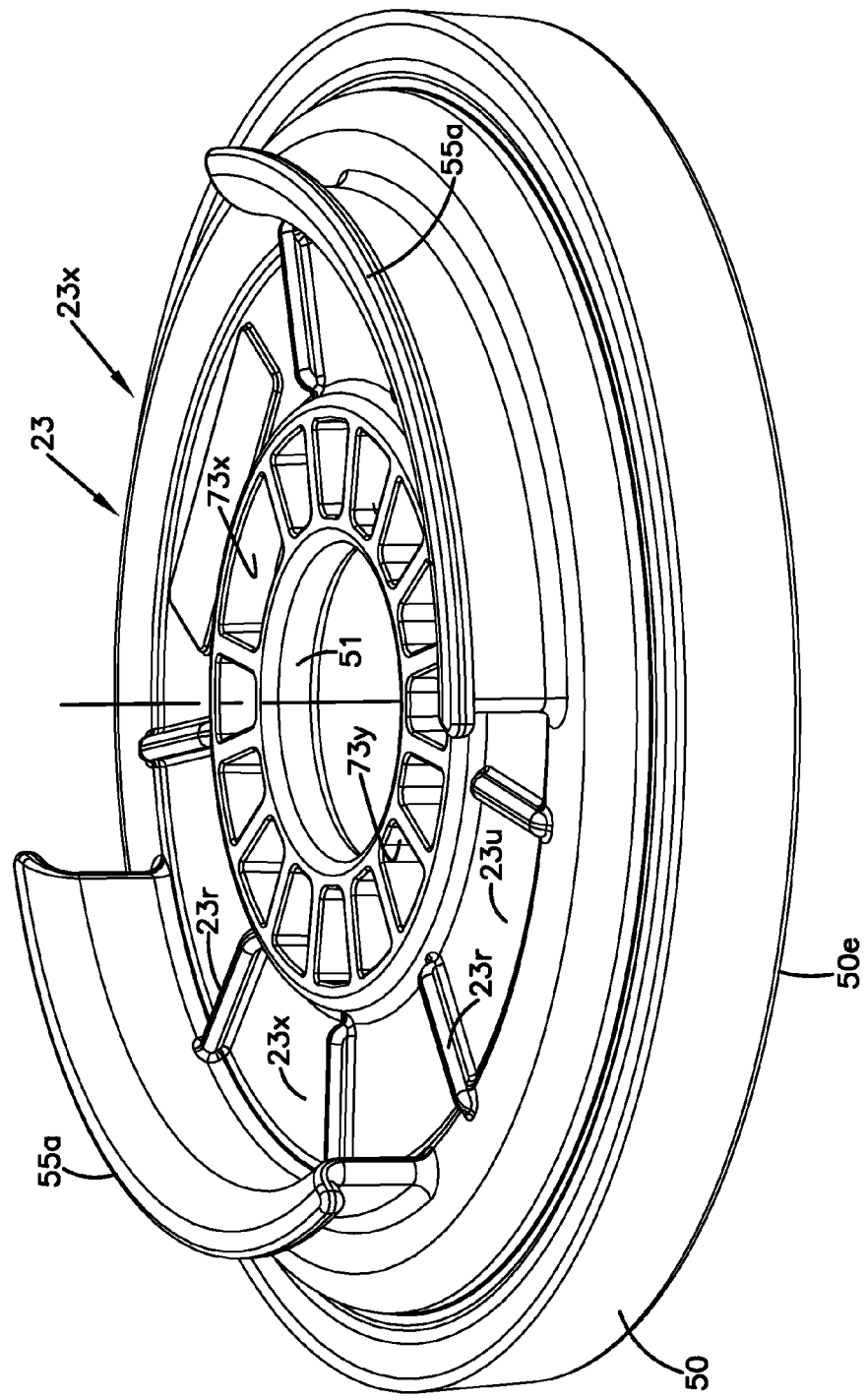
FIG. 30 is a schematic top perspective view of the top piece component of FIG. 26.

In FIG. 30, a perspective view of end piece 23 is viewable. Features previously described are shown.

III. Engagement Between Filter Cartridge 20 and the Housing 2 for Secure Rotational Interlock and Cartridge Orientation As previously described, the assembly 1 depicted includes arrangements helping to ensure that: the cartridge 20 is a proper one for the assembly 1 of concern, is properly oriented in the housing 2 when installed, and is secured in a proper orientation as the assembly 1 is used. In this section, features that relate to engagement between the filter cartridge 20 and the housing base component 16, that facilitate this, are described, along with the general interaction between the cartridge 20 and the base component 16 that result. Also provided are features for preferred interaction between the cartridge 20 and service cover 17.

A. The Base Component 16

Attention is again directed to FIGS. 14 and 15 with respect to the projection arrangement 44 in housing base component 16. In FIG. 14, a top plan view of the projection arrangement 44 is depicted. The view of FIG. 14, then, is generally a view of the inside 16z of bottom 16b of the housing base component 16. In the view of FIG. 14, the projection arrangement 44 is shown positioned adjacent and spaced from, central drain aperture 5o leading to drain 5.

In FIG. 15 referenced above, it can be seen that in housing base component 16, the projection arrangement 44 comprises a projection member 85. The off-set from drain aperture 50 allows drainage of liquid and bottom surface 16z to aperture 50. Interior 16z of surface 16b can be somewhat funnel shaped, to facilitate the draining.

B. The Cartridge Component

Referring now to features of the cartridge depicted in FIGS. 17 and 18 and discussed above, it will be understood that the receiver 24u (FIG. 21) in the bottom end piece 24 is positioned to project upwardly to define a projection or receiver pocket 78. The receiver pocket 78 is sized, shaped and oriented to receive the projection member 85 projecting therein, as the cartridge 20 is lowered into housing base component 16.

C. Projection/Receiver and Cartridge-to-Housing Base Rotational Alignment Arrangement Generally In general terms, the assembly 1 includes a projection/receiver arrangement comprising a projection 44 in the housing base, and a receiver 24u in the cartridge, which engages one another when the cartridge is inserted. Typically, the projection (defining the receiver pocket) 78 comprises a structure that extends toward a top 78t, FIG. 20, at least 5 mm into cartridge open interior 22, from the lower end 21b of the media 21, typically at least 10 mm, usually at least 15 mm, and often an amount within the range of 15-50 mm. The projection 44 in the housing base 16 also typically includes at least this amount of extension.

There is no specific requirement that the projection/receiver also be oriented to provide rotational orientation of the cartridge 20 relative to the housing base 16. However the particular projection/receiver arrangement depicted provides for this advantage, as follows.

In particular, the example assembly depicted then is configured, so that the cartridge 20 can only be oriented in a specifically identified rotational orientation relative to the housing 16, during installation. This rotational orientation for the example depicted, corresponds to rotational alignment when the projection arrangement 44 (fin 85) is properly aligned with respect to the receiver 24u (projection 78), so that the cartridge 20 can be fully lowered. This is, in part, due to optional eccentric positioning of receiver 24u (or projection 78) relative to central axis X.

It is noted that a variety of projection/receiver arrangements can be used to accomplish the intended result, and the specific configuration of the receiver 24u (projection 78) and projection arrangement 44 are merely examples. Further, the arrangement can be configured for a different number of specific orientations are possible, if desired.

It is also noted that the projection/receiver arrangement comprising the projection arrangement 44 and receiver 24u operates to help ensure that the cartridge 20 is the proper one of the assembly 1 involved; and, to help ensure that the cartridge 20 is securely retained and does not shift in orientation, as the equipment on which the assembly 1 is used vibrate or subjected to shock.

It is further noted that engagement between the projection 16k and the recess 70r at the lower end piece 24, also facilitate rotational orientation of the cartridge, FIG. 20. However, as the cartridge 20 is lowered into the housing base 16, initial engagement for rotational alignment will be as the receiver 24u (projection 78) begins to receive the projection 44.

IV. Further Regarding the Service Cover or Cover Assembly, FIGS. 10 and 31-37

Herein, in connection with FIG. 1, a service cover (access cover) or cover assembly 17 was identified, which is secured in place on housing base component 16 in use, to close the housing 2. In FIG. 10, a top perspective view of the access cover 17 is provided.

The access cover 17 for the arrangement depicted, comprises: outer perimeter mounting ring 90, central cover section 91; and, optional evacuation valve or vent valve arrangement 14.

Although alternatives are possible with application of some principles according to the present disclosure, for the particular cover assembly 17 depicted, the mounting ring 90 is rotatable relative to the cover section 91, so that the mounting ring 90 can be rotated for securing the cover assembly 17 onto the housing base 16, without rotating cover section 91. Advantages from this will be apparent from further discussion below.

Figure 34:
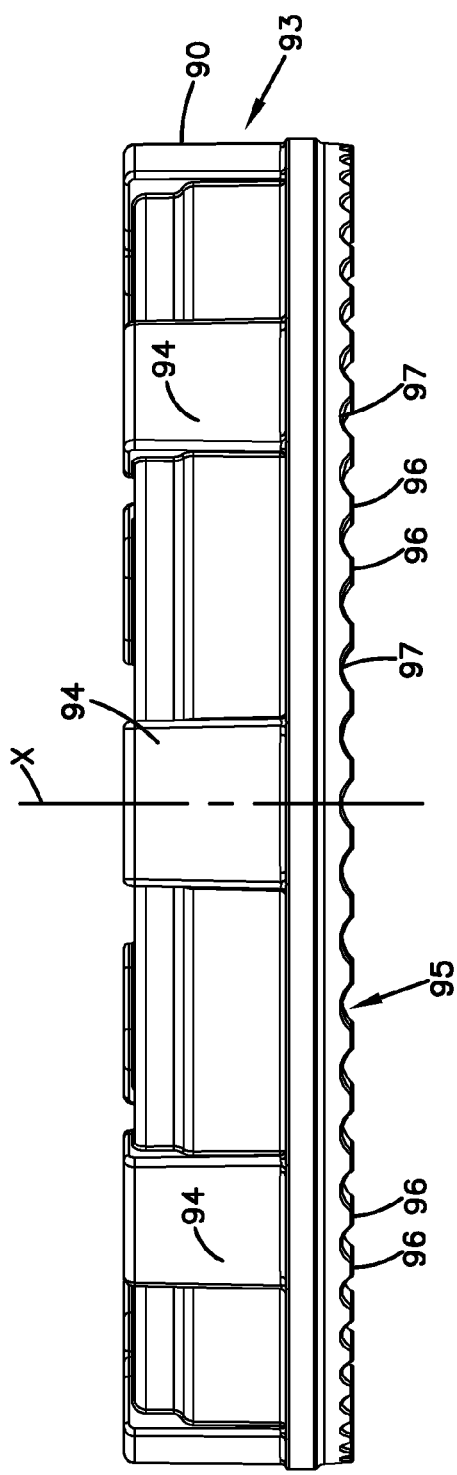
FIG. 34 is a schematic side elevational view of a mounting ring component of the cover assembly depicted in FIG. 10.
Figure 35:
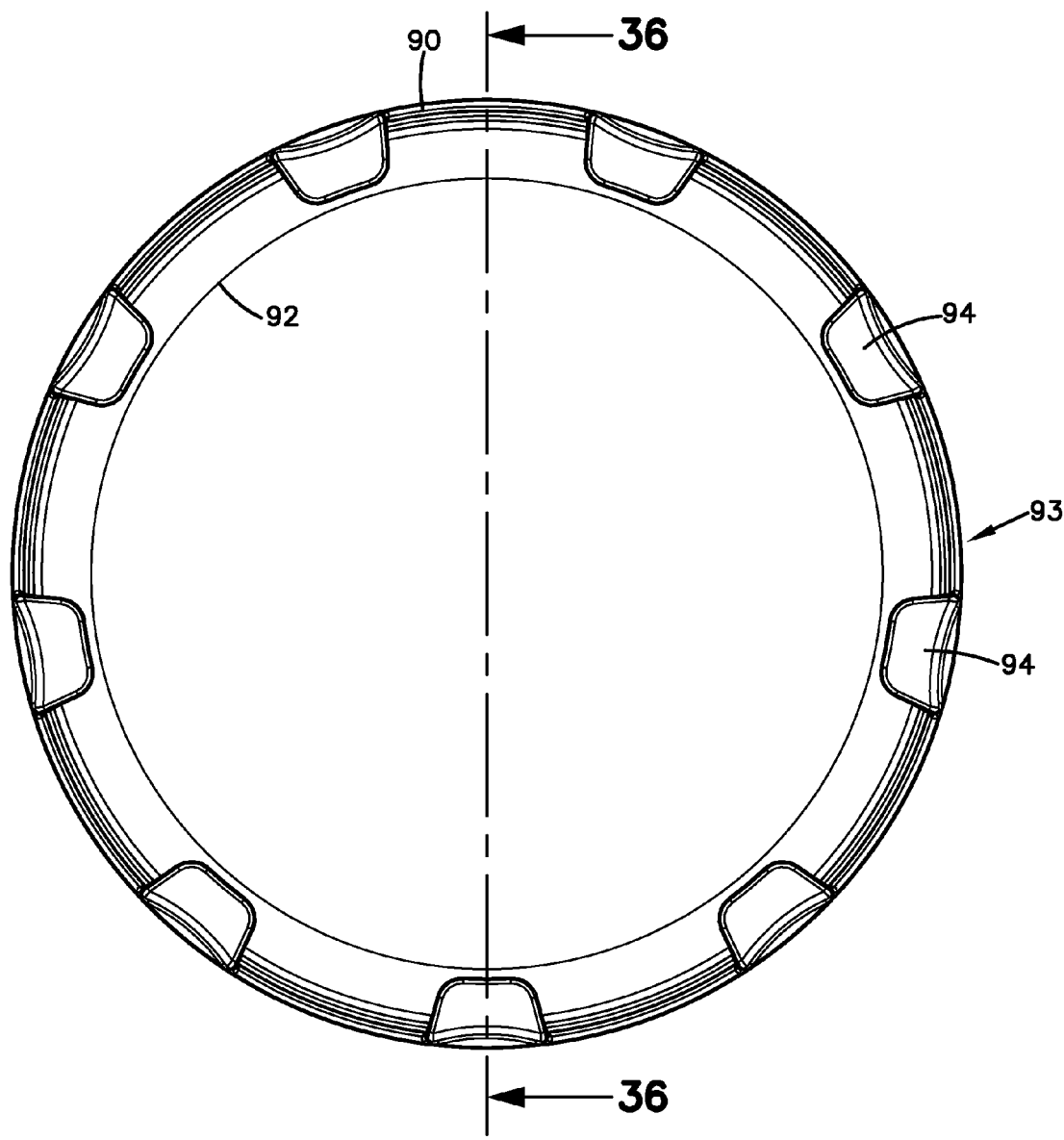
FIG. 35 is a top plan view of the mounting ring component depicted FIG. 38.

In FIG. 34, a side elevation view of perimeter mounting ring 90 is provided. In FIG. 35, top plan view of the perimeter mounting ring 90 is provided, and in FIG. 36, a cross-sectional view taken generally along line 36-36, FIG. 35 is provided.

Figure 36:
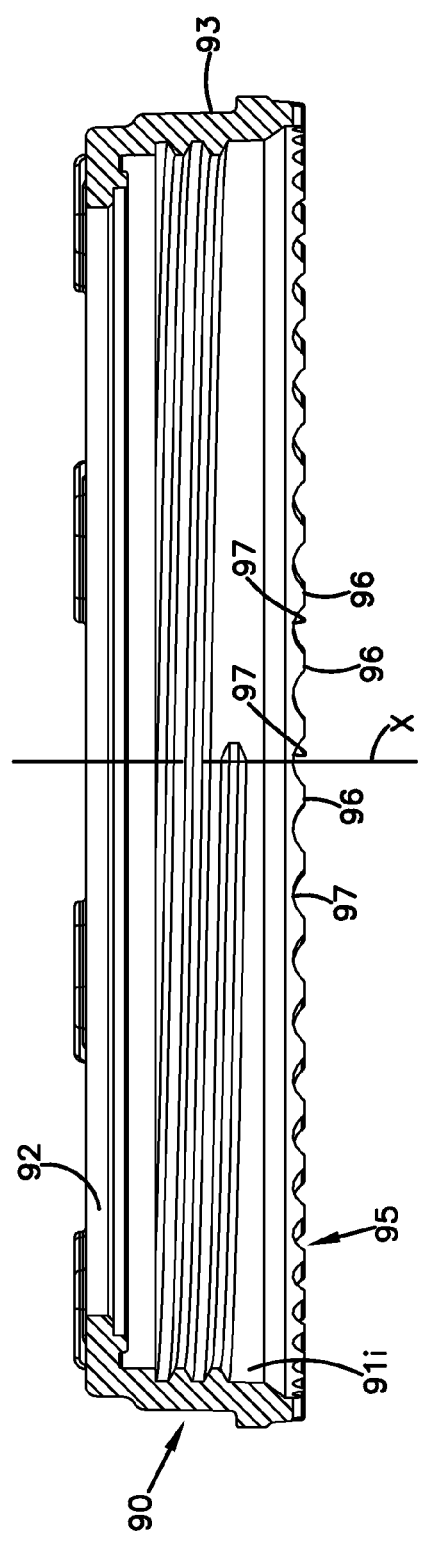
FIG. 36 is a schematic cross-sectional view of the ring component of FIGS. 34 and 35, taken generally along line 36-36, FIG. 35.

Referring to FIGS. 34-36, the mounting ring 90 is generally configured with a central aperture 92 therethrough, allowing the ring 90 to be positioned over, and slidably surrounding, ring 91, FIG. 10. An outer perimeter 93 of the perimeter ring 90 is provided with spaced grips 94 to facilitate gripping and rotating.

Referring to FIGS. 34 and 36, the depicted mounting ring 90 includes downwardly projecting uneven or toothed ring section 95, comprising individual downwardly projecting teeth 96. Gaps 97 between the teeth 96 facilitate locking engagement with a portion of the housing 2, to inhibit unlocking of the ring, once tightened, by vibration of the equipment on which the assembly 1 is used. This is discussed further below.

In FIG. 36, it can be seen that interior surface 91i of ring 91 is threaded, for engagement with threads 16t on housing base component 16, discussed previously. It is noted that an alternate rotational connection approach, not involving threads, for example involving a projection/receiver connection analogous to the embodiment of FIGS. 39-64 can be used here.

Attention is now directed to the side elevational view of FIG. 2 and the cross-sectional view of FIGS. 7 and 8. It can be seen that ring 90 is tightened on housing bead 16 (in the example on threads 16t) FIG. 2, sufficiently so that ring 90 is lowered until one of the gaps 97 engages upward projection 36 on locking projection arrangement 36. Thus, equipment vibration alone will not likely cause ring 91 to loosen on housing 16. Rather, sufficient force (provided by a person rotating ring 90) to overcome the rotational interlock between projection 36x and adjacent teeth 96 will be needed.

Attention is now directed to FIG. 37, in which the cover or cover assembly 17 is depicted in exploded view. In FIG. 37, mounting ring 90 is viewable, as well as cover section 91. The cover section 91 is configured with an outer perimeter 91p having an outwardly directed perimeter ring 100 projecting radially outwardly therefrom. In assembly, ring 90 is positioned over the top of cover 91, such that inwardly directed lip 90s on ring 90 rests on and above radial lip 100 of cover section 91.

Cover section 91, FIG. 37, can be provided with a radial interference portion as shown at 101, so that once ring 90 is pressed over cover 91, it tends not to separate by upper movement, unless forced. A small amount of interference can be used to affect this.

Referring again to FIG. 37, attention is directed to vent valve assembly 14. Vent valve assembly 14, FIG. 37 is shown in exploded view over vent valve aperture 105 through cover 91. A cross-sectional view of the vent valve assembly 14 is viewable in FIG. 8.

Referring to FIGS. 37 and 8, vent valve assembly 14 comprises valve member 107 seated, when the valve arrangement 14 is closed, access aperture 105. The valve member 107 is positioned on and supported by support disc 108. The support disc 108 is biased to maintain the valve member 107 in the closed position, (until overcome by internal pressure within assembly 1) by biasing arrangement 109, in the example depicted comprising spring 109s. Cover 110 is positioned over the valve assembly, the cover 110 having an outer perimeter 112, FIG. 37, with vent flow gaps 113 therein. The cover 110 is secured in place by a snap-fit over projections 114.

Figure 31:
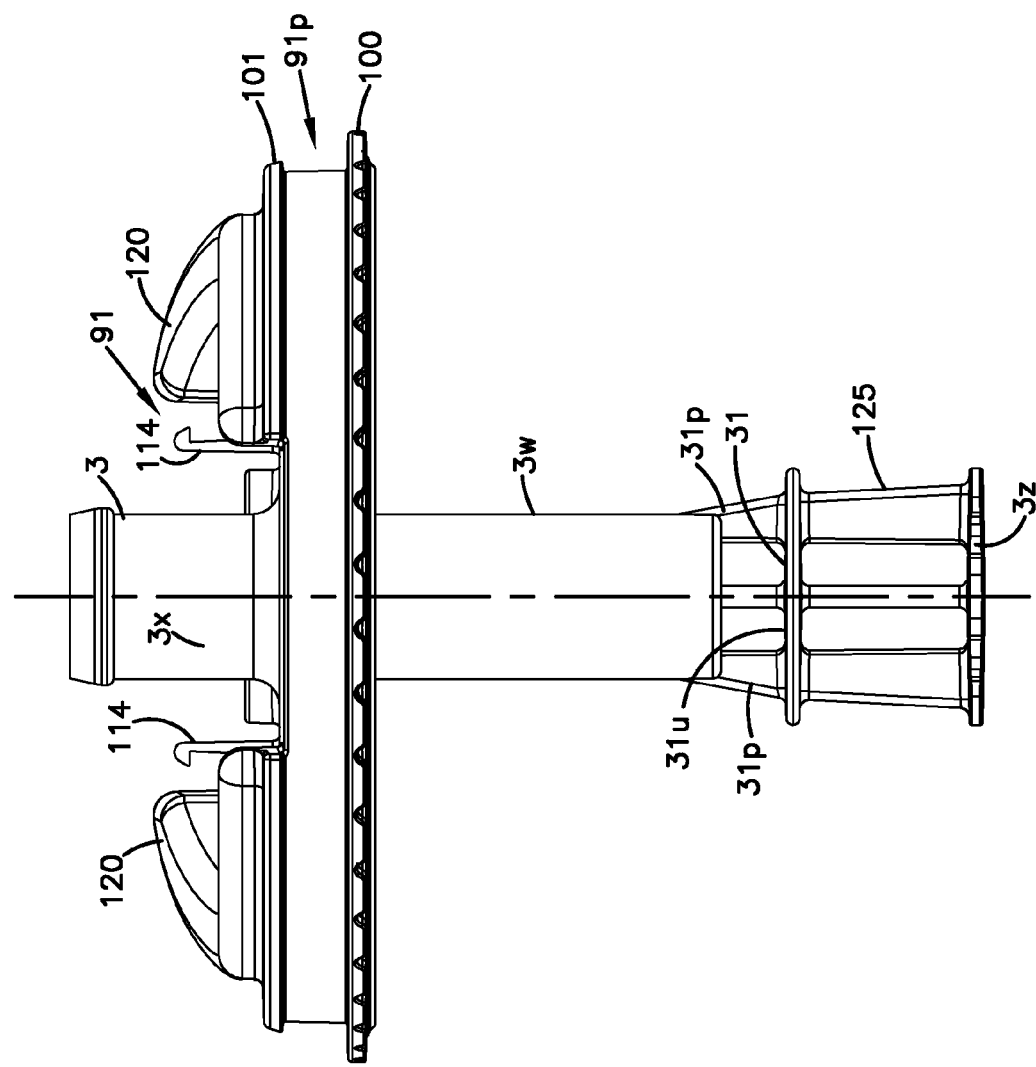
FIG. 31 is a schematic side elevational view of a top cover component of the cover assembly depicted in FIG. 10.
Figure 32:
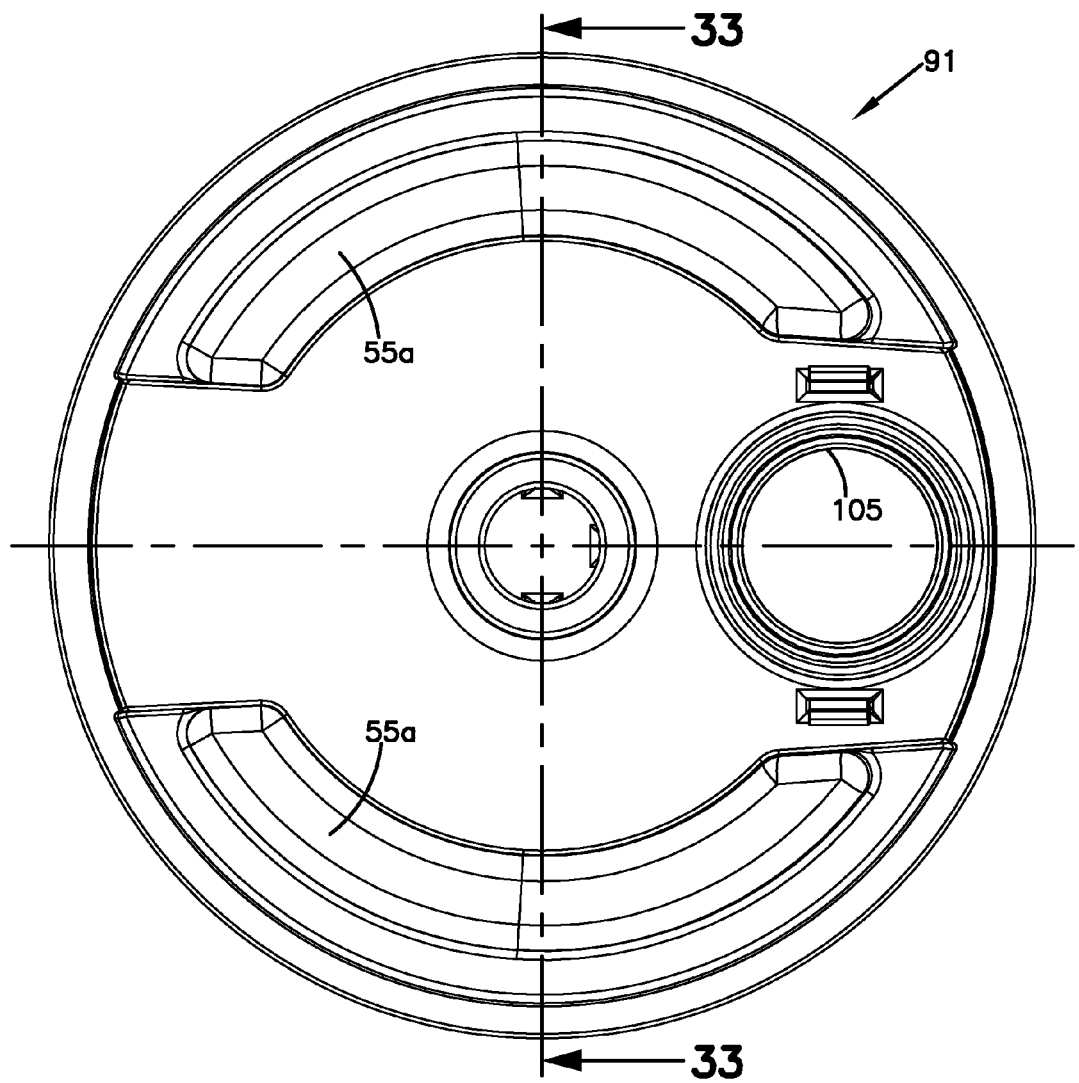
FIG. 32 is a schematic top plan view of the component depicted in FIG. 35.
Figure 33:
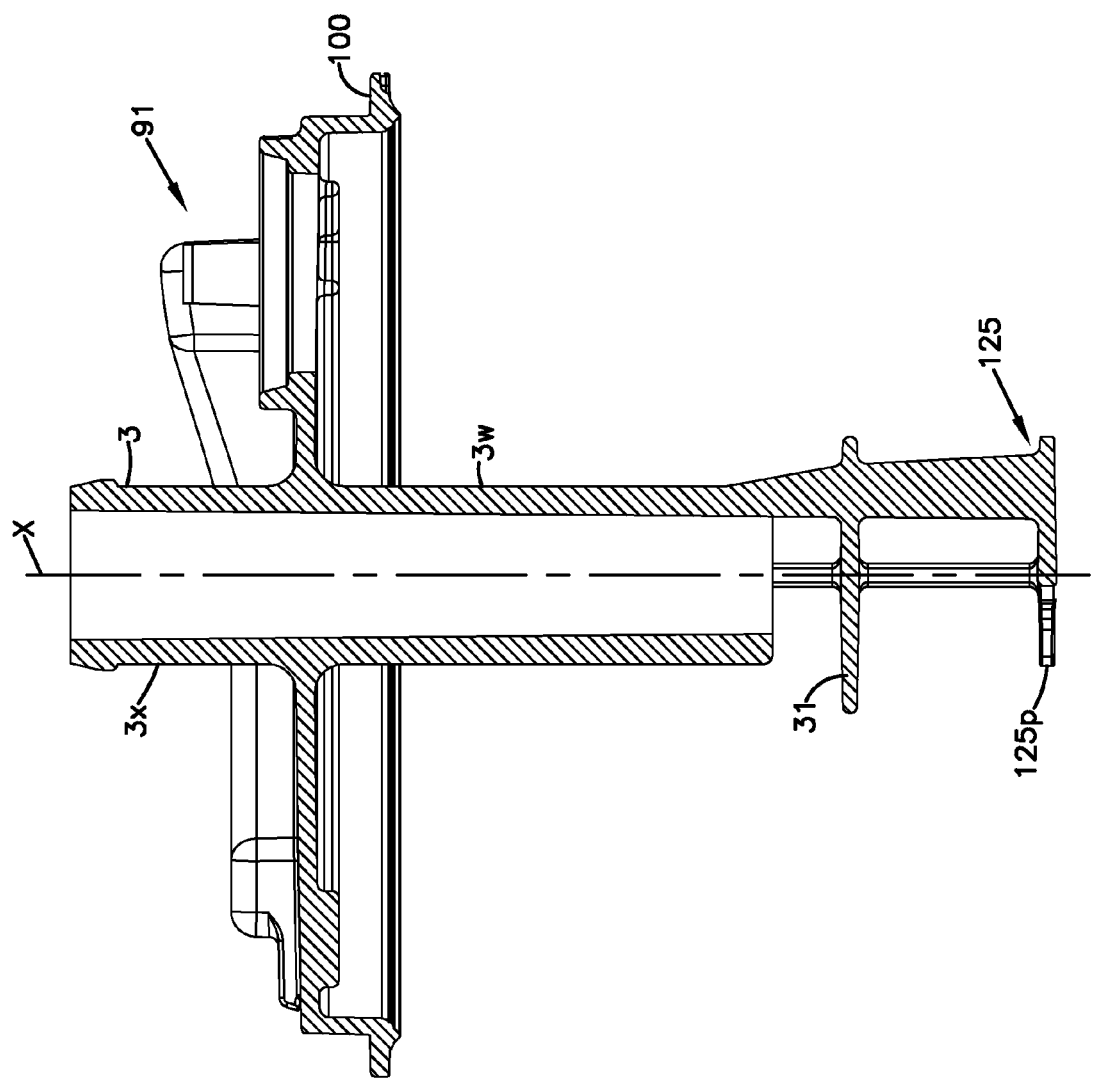
FIG. 33 is a schematic cross-sectional view of the component depicted in FIG. 35, taken generally along line 33-33, FIG. 32.

In FIGS. 31-33, the central cover section 91 is depicted. Referring to FIG. 31, the cover section 91 can be viewed as comprising flow arrangement 3 comprising tube 3x; outer perimeter 91p with perimeter lip 100 thereon; and, interference projection 101. Also viewable is a portion 3w of tube 3x projecting underneath cover 91, with inertial impaction arrangement 31 thereon, comprising shelf 31u supported by spaced projections 31p, defining lateral gas flow exits 31x therebetween. It can be seen that as gas enters tube 3x, it will project downwardly toward inertial impaction arrangement 31 and surface 31u, liquid may collect on surface 31u, to drop downwardly, when the assembly 1.

In FIG. 31 at 120 receivers are positioned in centerpiece 91. Receivers 120 are open underneath and are sized to receive projecting therein, projection members 55a on the cartridge 20. Preferably the size and shape of the projection members 55a is configured to mate with the receivers 120 in only one rotational orientation (or in one of a selected identified specific, spaced, rotational orientation) of the cartridge 20 and access cover 17 (i.e. cover 91, around central axis X). This facilitates a rotational indexing.

Still referring to FIG. 31, it is noted that receivers 120 are depicted with a slant or downward taper thereto. The handle arrangement can be configured analogously if desired.

Also referring to FIG. 31, it is noted that at 125, an end portion of tube 3w is depicted in the example indicated beneath inertial impaction arrangement 31. It is noted that in general lower end 3z of tube 3 extends downwardly into housing base 16, when cover assembly 17 is installed, to a location lower than an uppermost top 78t of projection 78 in the cartridge 20. Typically, the extension is to a location at least 3 mm lower than top 78t, and usually at least 5 mm. Indeed, the extension will typically be to a location at least within the range of 5-50 mm below top 78t, although alternatives are possible. This level of extension can be understood for example, by reference to the cross-sectional view of FIGS. 7 and 8.

Referring to FIG. 37, end 125 includes a perimeter 125p with a recess 125r therein, sized to fit around a portion projection 78 in an interior of the cartridge 20, as the service cover 17 is lowered. The receiver 125r and the particular example shown is sized so that the access cover 17, and in particular portion 91, must be rotationally aligned so that the receiver 125r can receive the projection 78 projecting therethrough. Preferably receiver 125r and end 125 are configured such that only one rotational orientation relative to projection 78 is possible.

In FIG. 32, a top plan view of cover section 91 is viewable. In FIG. 33, a cross-sectional view taken generally along line 33-33, FIG. 32 is viewable.

V. Selected Identified Features, Operation and Advantages

A. Rotational Indexing Between the Cartridge 20 and Housing Base 16

As described above, projection arrangement 44 in the housing base 10 and the receiver 78 in the cartridge 20 comprise a projection/receiver arrangement with respect to the cartridge 20 housing base 16. This arrangement also helps secure the cartridge against movement, once installed. This projection/receiver arrangement, can, optionally, serve as a rotational (alignment) indexing arrangement by which it can be ensured that the cartridge 20 is a proper one for the assembly 1 depicted, and is properly oriented therein for use.

In particular, the receiver 78 of the cartridge can be shaped and oriented, along with the projection 44 and the housing base 16 so that the cartridge 20 can only be lowered into the housing base in a single (or one of a certain selected set) of rotational orientations. This is exemplified by the arrangement depicted.

It is noted that also as discussed above, receivers 70r and projection 16 can further relate to maintaining the cartridge 20 in a selected rotational orientation relative to the housing base 16.

B. Rotational Indexing Between the Cartridge 20 and the Service Cover 17

Referring to FIG. 7, it is noted that the access cover includes, in portion 91 thereof, arcuate upwardly directed receivers 120. Receivers 120 are sized and configured so that the access cover 17 can only be positioned over the cartridge 20, when installed, when the receivers 120 are rotationally oriented to align with projection members 55a. Thus, the access cover 17 is rotationally aligned relative to the cartridge 20 and the housing base 16.

Also, as discussed above, optionally receiver 125r is sized, shaped and located so that it can only continue to recess into the cartridge 20, if it is oriented to receive the receiver 78 projecting therethrough. This too, helps orient the access cover 17 rotationally relative to the cartridge 20 and housing base 16.

An advantage from the rotational indexing, will be understood by comparison to FIGS. 7 and 5. In particular, the vent valve arrangement 14 is asymmetrically positioned on the cover assembly 17. A rotational alignment of the access cover 17 as described, will specifically, rotationally, position the vent valve arrangement 14 relative to the central axis X. In particular, the receivers 120 are preferably positioned so that the vent valve arrangement 14 will be oriented in a half of the access cover 17, FIG. 5, away from the mounting arrangement 18x. Preferably, the receivers 120 are oriented so that the vent valve arrangement 14 is positioned (about) 180° rotated around central axis X from mounting pad arrangement 18x, i.e. as remote from mounting pad arrangement 18x if possible.

When the mounting pad arrangement 18x is configured so that the assembly 1 is mounted directly to an engine or near an engine, the remote positioning in the vent valve arrangement 14 can be advantageous. A reason for this is that when the vent valve 14 opens, it will discharge some oil in addition to gases. It is preferred that those oils not be sprayed onto the engine, if possible. Remote positioning of the vent valve arrangement 14 relative to the mounting pad 18x is advantageous for this reason. This can be accomplished by an indexing arrangement between the access cover 17 and the cartridge/housing base combination as described. Of course, in the example depicted the cartridge 20 is already rotationally indexed in the housing base 16 as described above in a single selected rotational orientation. Thus, the only manner in which the access cover 17 can be pushed sufficiently over housing base 16 for the threaded engagement to occur, is when the projection arrangement 55 is pushed into the receivers 120. (An analogous advantageous location of the vent valve on the access cover is also shown in the embodiment of FIGS. 39-64.

In more general terms, a receiver arrangement in the cover 17 is configured to receive projecting therein a projection arrangement on the cartridge 20, in only one (or one of a selected number of) rotational orientation(s) relative to one another. This can be used to help ensure that the vent valve arrangement 14 is oriented where desired. An example arrangement is depicted which accomplishes this. Variations in the number of projections and receivers, and in the shape and location of the projection/receivers, and in the shape and location of the projection/receivers, can be used.

C. Operation of the Optional Inertial Impaction Arrangement

In general operation, as the assembly 1 is operated with gas flow through the media 31 of cartridge 20, a liquid head will begin to build-up in cartridge 20 along a bottom thereof. Typically, a steady state condition will eventually be reached, in which the liquid neither rises nor lowers substantially during continued operation, but rather the liquid will drain out of the media 21 at about the same rate liquid is replaced. This drainage, of course, in part occurs by flow directly downwardly through recesses 70r, but can also occur by liquid flow into an outer perimeter 21p of the media 21 and then downwardly along housing bottom 16b to aperture 5o.

The optional inertial impaction plate 31u will serve, in part, as a collection point for some of the liquid in the inlet gas flow stream. This liquid will tend to coalesce into droplets that can drop along interior 22, of the cartridge 20. This liquid will drop, for example, downwardly onto an upper side of receiver 24r. Referring to the cross-section of FIGS. 7 and 8, the configuration of this region 24t of receiver 24r is such that the liquid that impinges receiver 24r from above will tend to drain downwardly and into lower portion 21b of the media 21 and thus into the liquid head described above, for eventual drainage into outlet 5o.

Still referring to the cross-sections of FIGS. 7 and 8, it is noted that drainage into outlet 5o and tube 5, of coalesced liquid, is in part facilitated by the cartridge 20 being positioned on spaced ribs 40, as this creates open flow channels underneath the cartridge 20 for liquid flow.

D. Features Relating to Preferred Application in "Vertically Challenged" Spaces or by which a Vertical Space is Efficiently Used As indicated previously herein, various features of the assembly characterized herein are configured to take advantage of vertical space available for the assembly 1 to be installed in use, in an efficient manner. In some instances, the application is one which is "vertically challenged" i.e. in which the space available for the assembly 1 is fairly short in vertical dimension, and effective use the space is needed in order to ensure adequate media is present to accomplish the desired filtering and coalescing effects and service lifetime. However, in general, the issues relate to improvement in an assembly configuration, to accommodate effective of space.

In this section, some of the features of the assembly which facilitate this are described. Of course, the challenges can be at least in part met with variations from the features described, or with only selected ones implemented for a given application.

1. Selected Housing Exterior Features

The positioning of one of the gas flow port arrangements 3 on the housing 2 through the top cover 91, in part, facilitates efficient use of vertical space. For the particular assembly 1 depicted, flow arrangement 3 is an inlet flow arrangement, however, in some instances, the assembly could be configured for the tube 3 to be an outlet flow arrangement. In either case, by introducing the flow tube 3x through the top cover 91, as opposed as through a side of the housing 2 (whether on the bottom section 16 or the service cover 17) an extra vertical sidewall challenge is avoided. This is because a side entry would generally require vertical height to accommodate its positioning, while ensuring that the inlet 3 and outlet 4 are on opposite flow sides of the cartridge 20, and are isolated by housing seal components. It is, noted, that for the particular assembly 1 depicted, with a rotatable mounting ring 90 as shown, particular advantage is provided since the mounting ring 90 must be able to rotate relative to the cover section 91 and housing base 16, for proper closure of the housing 2. If the inlet 3 were to be in a side of the top cover 17, then the service cover 91 would have a greater vertical height to accommodate the side entry. This could be disadvantageous.

Other advantageous configurations exterior to the housing 2, which provide for management of vertical issues, relate to the size, orientation and location of the valves 10 and 14. Referring to FIG. 1, the bypass or vent valve assembly 14, positioned on an upper portion of central cover 91, is provided with a relatively low vertical profile, no more than 30 mm, and typically no more than 20 mm, from adjacent portions of cover section 91. Also, the regulator valve assembly 10 is positioned on a side 16s of the housing 16, and thus does not add vertical height to the assembly 1.

It is noted that the exterior features described in this section can be implemented with the embodiment of FIGS. 39-64, if desired.

2. Selected Internal Features that Facilitate Management of Limited Vertical Issues or Effective Use of Vertical Dimension or Space Attention is now directed to FIGS. 7 and 8 with respect to selected internal features that facilitate management of internal space. First, attention is directed to the positioning of the seal 50 at a location surrounding the media 21, as opposed to a location above the media 21. Advantage from this relates to the fact that the housing 2 does not need to be provided with adequate vertical dimension, for a housing seal above the media 21. In this instance, the housing 16 would need to be taller, for the seal 50 to seal thereagainst, if the media were to have the same vertical dimension but with the seal not located at a position surrounding media 21.

Of course, positioning the seal member 50 at a location surrounding the media 21 is facilitated by cartridge features that allow the first end piece 23 to be put (for example by snap-fit) into position, after the media 21 is positioned on the central support 61, for example, by being wound in place. Thus, a challenge to potential manufacture of the cartridge 20, to manage positioning of the seal 50 at the desired location, is addressed in the cartridge 20 described, positioning the end piece 23 after the media 21 is in place, for example by snap-fit or other connection (as an example by sonic weld, heat weld or adhesive). The manufacture of an efficient and effective cartridge 20 in this manner is further facilitated, by the projection ribs 80 on the underside of the end piece 21, as described above in connection with FIGS. 27-29.

E. Other Additional Advantageous Features

It is noted that for the particular arrangement depicted, the bracket or mounting pad 18x is incorporated into the molded housing base 16, along with the outlet port 4. This makes for convenient manufacture and installation, and ensures that the outlet port 4 is always oriented with respect to the equipment on which the assembly 1 is mounted, in a selected desirable orientation and location.

The location of the pressure relief valve 14 on the top cover, allows it to remain clean during servicing of the filter assembly 1, since it is moved out of the way along with a cover assembly 17 during servicing.

Having the filter cartridge 20 constructed by positioning at least one of the end pieces on a center core in a manner for later connection to a remainder (for example by snap-fit) allows for a variety of arrangements in which the media can be preformed or alternatively be wound in place. For example, a preformed cylinder of media can be positioned in place on the preform 60 with end piece 31 then put in place (for example by snap-fit).

It is noted that the apertures 75 on the first end piece 23 which receive hook members on the central cartridge support projecting therein, are oversized relative to the hook members and are in direct flow communication with the open central interior 22 of the cartridge 20 and media 21. These apertures, in part, allow gas flow communication with the vent valve arrangement 14 to facilitate vent valve operation.

Typically, the media pack 21 will be made slightly higher (wider) than the distance between the end pieces 23/24 in the cartridge 20. In this manner, when the end piece 23 is pushed against the media during the snap-fit in place, inhibition to gas flow bypass between the media 21 and the end piece 23 occurs. This is assisted by ribs 80.

F. Potential Application with "Out-to-in" Flow

It is noted that the assembly depicted is specifically configured for use for filtering gas flow through the filter cartridge 20 being from "in-to-out" flow. Many of the principles described herein can be applied when the filtering flow through the cartridge is from "out-to-in" during filtering. When this is the case, typically the lower end piece 24 is provided with an opening therein, for drainage flow of liquid from the cartridge interior. The seals are appropriately positioned to ensure that the upstream and downstream locations are isolated from one another. Lower media axial overlap drain aperture arrangements are generally located toward the inner perimeter of the media rather than the outer perimeter. Various other features are modified to accommodate the intended flow, such as structure for proper interaction or fit. However, many of the features described can be implemented in either of the embodiments described herein, or be modified for implementation in such arrangements.

G. Possible Multiple Rotational Orientations

It is noted that the rotational (alignment) indexing arrangements depicted between the cartridge and housing base, and the service cover and cartridge, are shown in a manner that allows only a single rotational orientation. The various principles described can be applied in which each is capable of more than one rotational orientation, for example, selected ones of defined, spaced, rotational orientations. Variations which would accommodate this would involve providing multiple projection/receiver arrangements appropriately spaced, or some variation thereof, to allow for multiple rotation. This could be particularly advantageous, when the inner projection 3w of the access cover 17 is not centrally positioned, but rather is eccentrically positioned relative to the central axis X. When this is the case, a service cover can only be positioned in a single rotational orientation relative to the cartridge, if the aperture 51 and the cartridge is also eccentrically positioned. Thus, if the cartridge is rotated to different orientations, the inlet tube 3 would also have rotated around central axis X to the similar location. (This could similarly be implemented with the embodiment of FIGS. 39-64).

VI. Example Materials, Dimensions and Assembly Approaches

A. Example Dimensions

In selected ones of the drawings presented, various dimensions are indicated. These are indicative of an example assembly, using principles according the present disclosure. A variety of alternate dimensions and relative dimensions can be used. For the particular example assembly depicted, the dimensions indicated are as follows: AA=118.3 mm; AB=59.1 mm; AD=77 mm; AE=71.8 mm; AF=145.7 mm; AG=58.8 mm; AH=132.8 mm; AI=118.3 mm diameter; AJ=141 mm; AK=47.2 mm; AL=61 mm; AM=145.7 mm; AN=19 mm; AO=13.8 mm; AP=24.6 mm; AQ=121.2 mm; AR=63 mm; AS=12.5 mm; AT=25.1 mm; AU=7.3 mm; AV=13.8 mm; AW=94.8 mm; AX=102.8 mm diameter; AY=91.1 mm; BB=36 mm; BC=88 mm. Analogous dimensions could be used in the embodiment of FIGS. 39-64.

B. Example Materials

As indicated previously, the media 21 can generally be a media selected as a matter of choice for the application involved. However, it will be typical the media 21 be selected as a material wound onto the central support 61 as a layered coil, when installed. Typical media of this type, efficient and effective for use in a coalescing filter, is described above identified references.

A variety of materials can be used for the plastic components described. Typically, a glass-filled nylon such as 33% glass-filled nylon 6, 6 can be used for such components as: cartridge support 60; mounting ring 90; housing base component 16; cover section 91; and, end piece 23. In addition, such materials can be used for hard plastic componentry in the various valve assemblies 10, 14.

For the housing seal member 50 hydrogenated nitrile rubber (for example 50-70 durometer Shore A) can be used, with a durometer of about 60 being typical and preferred. The seal member 50 can be molded-in-place or be preformed.

For the diaphragm valve 40 also a hydrogenated nitrile rubber can be used, typically with a durometer, Shore A, of about 40-50, for example 45. A hydrogenated nitrile rubber Shore A 60 dorumeter material can be used for valve member 107.

Stainless steel springs can be used for the biasing members in valves.

Similar materials can be used for the embodiment of FIGS. 39-64, if desired, although alternatives are possible.

VII. A Typical System for Use

Figure 38:
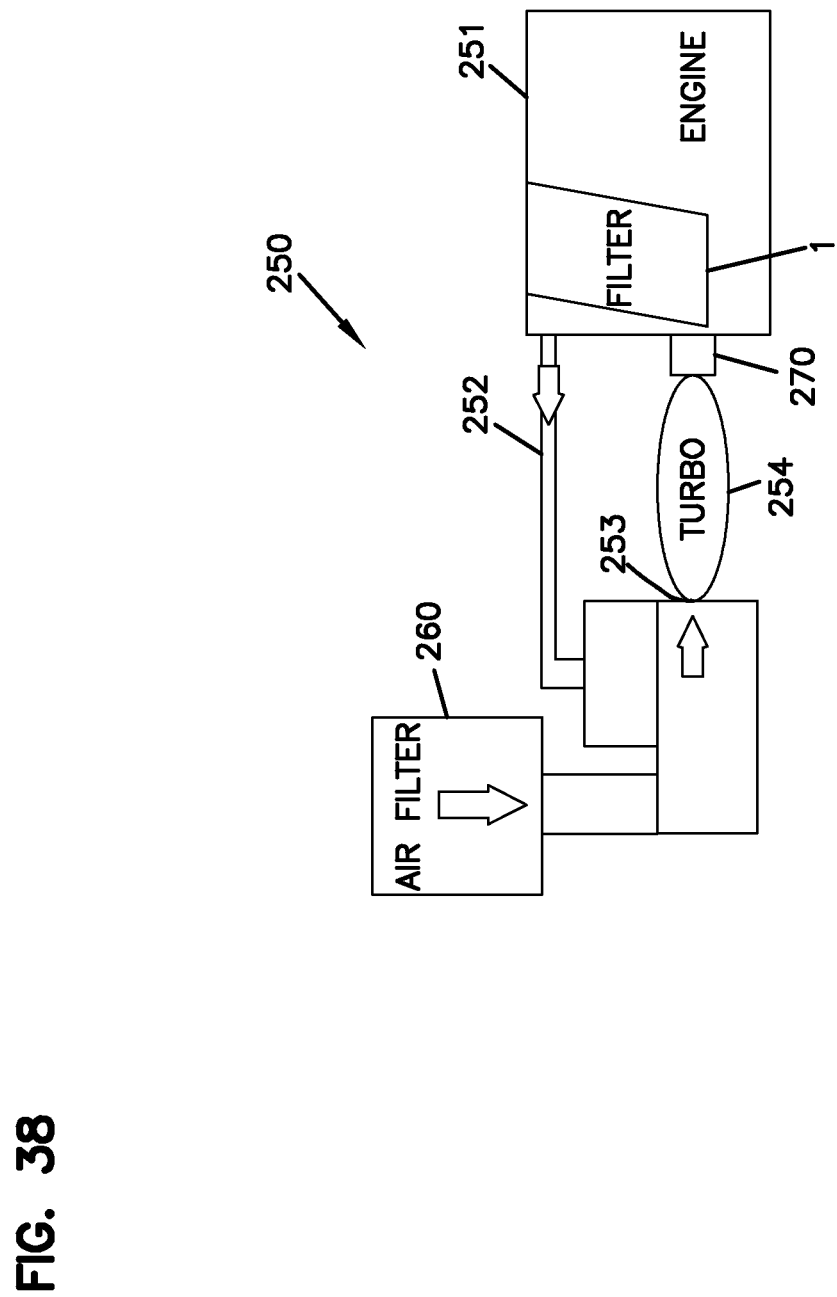
FIG. 38 is a schematic view of an engine and air induction system using a crankcase ventilation filter assembly in accord with the present disclosure.

Attention is now directed to FIG. 38, wherein at 250 a typical equipment system is depicted, in which an assembly according to assembly 1 is used. The arrangement system 250 may be, for example, equipment powered by diesel engine, such as an over-the-highway truck.

Referring to FIG. 38 filter assembly 1, in accord with descriptions herein, is depicted for filtering crankcase ventilation filter gases from engine 251. Filtered outlet flow from the filter assembly 1 is shown at line 252 directed to an air induction system 253. From here the gases are directed through turbo 254 to engine air intake 270 for the engine 251. Thus, in the system 25o depicted, filter assembly 1 is part of a closed crankcase ventilation filter assembly in which the filtered gases that leave the assembly 1 are directed back into the engine air intake 270. At 260, an air cleaner assembly or air filter system for the combustion air is depicted, also, directing filtered air to induction arrangement 253. Of course, filtered gas flow 252 can be directed to the air filter 260 or upstream, if desired. Also, gas flow at 252 can be directed to the atmosphere. (The embodiment of FIGS. 39-64 can be similarly used).

VIII. A Second Embodiment, FIGS. 39-64

In FIG. 39-64, a second embodiment using principles according to the present disclosure as described. It is noted to the extent compatible, the various descriptions, feature and materials discussed above can be implemented in embodiments in accord with FIGS. 39-64, as will be apparent from the following descriptions. It is also noted that the embodiment of FIG. 39-64 includes some enhancements. One of those enhancements is the use of a vertical spacer arrangement generally in accord with U.S. provisional 61/503,063 and U.S. provisional 61/664,340 each of which is incorporated herein by reference in its entirety. It is also noted that one of the enhancements relates to the use of a non-circular seal at a particular location. This is a variation of principles described in U.S. Ser. No. 12/157,650, published as US 2009/0071111, each of which is incorporated herein by reference.

Figure 39:
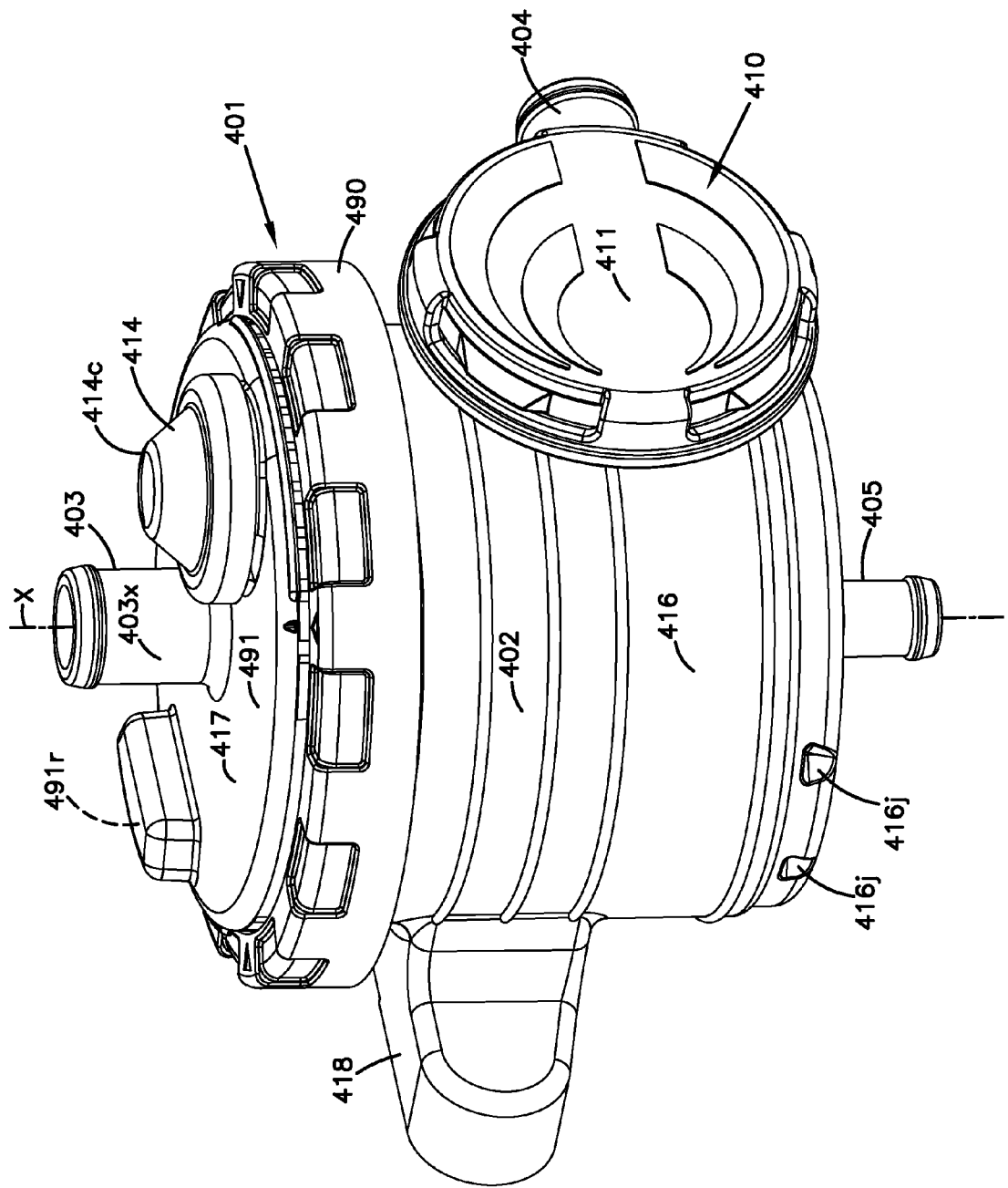
FIG. 39 is a schematic top perspective view of a second embodiment of a crankcase ventilation filter assembly according to the present disclosure.

The reference 401, FIG. 39, generally depicts a crankcase ventilation filter arrangement or assembly including features according to this aspect of the disclosure. The assembly 401 can be generally characterized as a comprising housing 402 having: a gas flow inlet arrangement 403, a filtered gas flow outlet arrangement 404 and, a liquid drain outlet arrangement 405.

As with the previously described embodiment, in typical operation, gases carrying liquid particulate therein (and other contaminant), typically crankcase ventilation gases, are directed into the assembly 401 through the gas flow inlet arrangement 403. Within the assembly 401, the gas flow is directed through a filter cartridge component 420, (not viewable in FIG. 39) discussed below. Within the filter cartridge component 420, the liquid component is coalesced and drained, and other contaminant (such as solid particulate) tends to become trapped within media of the filter. The coalesced liquid component can drain downwardly, for example under gravity influence, through drain outlet arrangement 405, and outwardly from the housing 402. The filtered gases leave the assembly 401 through filter gas flow outlet arrangement 404. The filtered gases can be vented to the atmosphere or in some instances they can be directed to the other componentry, such as to an engine air intake or induction system.

As with the previously depicted arrangement described above, for the particular assembly 401 depicted, the gas flow inlet arrangement 403, the gas flow outlet arrangement 404 and the liquid drain arrangement 405 are each depicted as single apertures and single flow tubes. While this is typical, alternate assemblies are possible.

The typical assembly 401, includes a housing 402 configured so that when installed and equipped for use, liquid drain outlet 405 is directed downwardly. The liquid, typically oil or similar material that drains through outlet 405, can be directed to a sump or back into equipment as desired. Valving arrangements can be used to manage liquid flow from the liquid drain outlet 405 to the equipment as desired.

Still referring to FIG. 39, and analogously to assembly 1, the particular assembly 401 depicted includes two, optional, gas valve assemblies thereon. The first, optional, valve assembly, indicated generally at 410, is a regulator valve assembly, which, in the example depicted, regulates gas flow to the gas flow outlet arrangement 404. At 411, a cover for the regular valve assembly 410 is depicted, in the example having a source indicating design thereon.

At 414, is depicted an optional pressure release valve assembly or vent valve assembly. The assembly 414 is generally configured to rapidly open and thus to allow venting of gases from interior housing 402, to protect against an over pressure condition within housing 402. Specific features of the depicted, optional, of vent valve assembly 414 are discussed further herein below. It may be analogous to vent valve assembly 14, described above.

Still referring to FIG. 39, as with previously described embodiment, the example housing 402 depicted can be characterized as generally comprising two components: a housing bottom, base or base component 416; and, a service cover (cover assembly access cover or component) 417. In general, during use, housing 402 is mounted on equipment with which the assembly 401 is to be used, for example a vehicle or other equipment. Typically assembly 401 is mounted by having the housing base component 416 secured in place on the equipment. The particular housing 402 depicted is shown with mounting flange arrangement 418 positioned on the housing base component 416, to provide for this mounting, although alternate mounting approaches are possible.

It is noted that the housing bottom, base or base component 416, can be configured as a single piece or as multiple pieces, as convenient. The same would be true for housing bottom or base component 16, discussed above.

The service cover 417 is generally removably mounted on the housing base 416, to allow service access to an interior of the housing 402. This service access provides for installation and/or a removal of an interiorly positioned filter cartridge arrangement 420 (not shown in FIG. 39) as discussed below.

Still referring to FIG. 39, the particular housing 402 depicted as provided with a top, downwardly directed, (inlet) gas flow tube arrangement 403x as the gas flow (inlet) arrangement 403. The inlet tube arrangement 403x for the example depicted, comprises a portion of cover component 491 of the access cover 417, as discussed below, although alternatives are possible.

In FIG. 39, housing 402 is configured with a gas flow outlet arrangement 404 and a liquid drain outlet arrangement 405 positioned on the housing base 416. Since the housing base 416 is generally the bottom of the assembly 401, the drain outlet 405 will typically be positioned on this component. Positioning the gas flow outlet arrangement 404 on the housing base 416 is advantageous, as discussed above for the assembly 1.

Although the general location for the inlet flow arrangement 403, outlet arrangement 404 and liquid drain outlet 405 will be typically as shown; as with the arrangement 1 discussed above, alternate locations are possible with some of the principles described herein.

Also, as with the assembly 1 discussed above: for the particular assembly 401 depicted, the gas flow inlet direction, through inlet 403; and, the gas flow outlet direction, through outlet 404, are generally perpendicular (orthogonal) to one another. This will be typical, although alternatives are possible.

Figure 40:
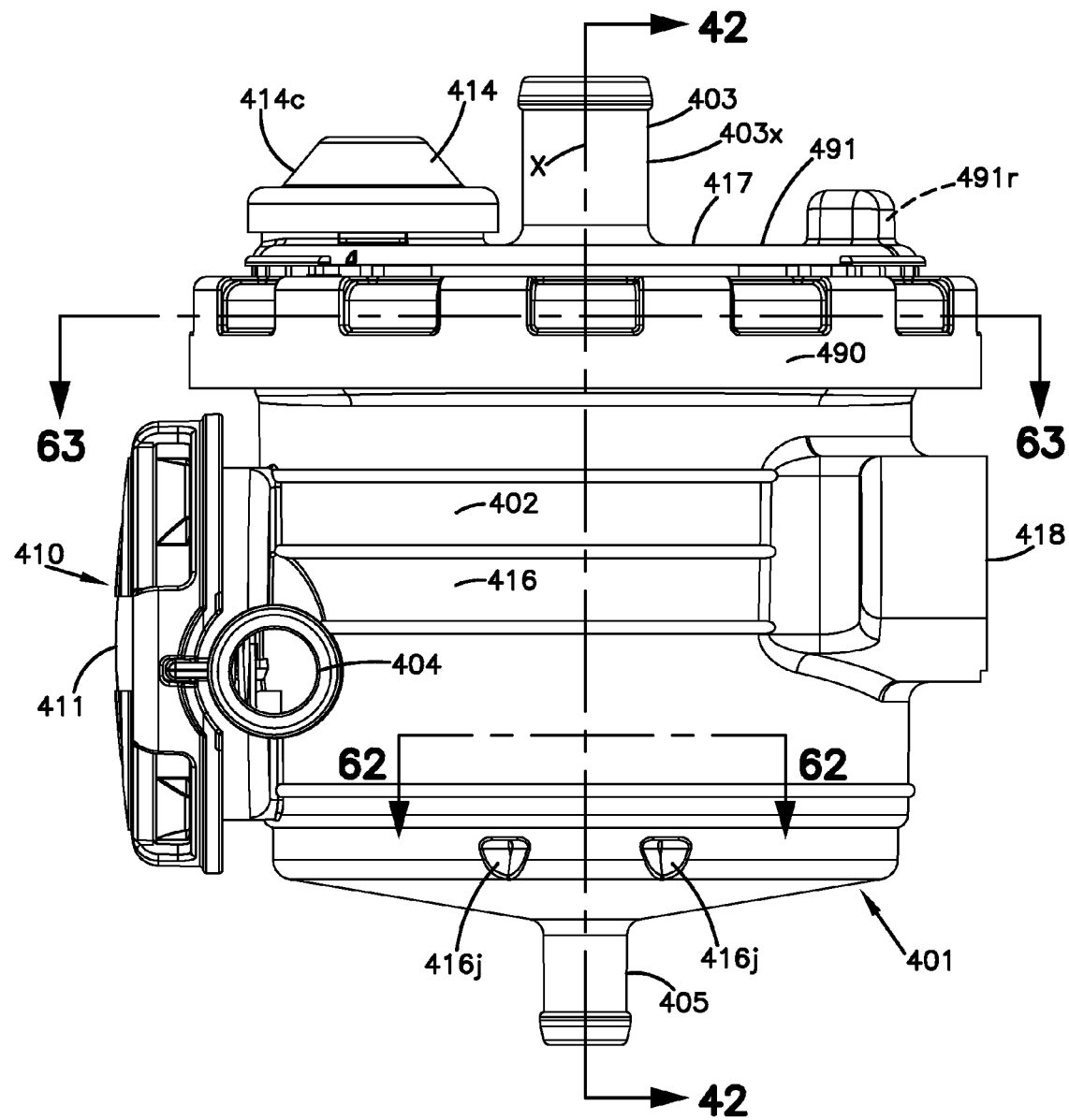
FIG. 40 is a schematic first side elevational view of the assembly depicted in FIG. 38.

In FIG. 40, a first side elevational view of the crankcase ventilation filter assembly 401 is provided. Of course the mounting flange 418 can be configured for a variety of specific arrangements, as discussed above with respect to the assembly 1.

In some alternate applications, the housing base 416 can be provided without a mounting pad arrangement 418, with securement to the equipment alternately provided (for example through an attached mounting band or similar structure).

As discussed for the previous embodiment, and referring to FIGS. 39 and 40, the assembly 401, in particular housing 402, and an internally received cartridge 420 (not viewable in FIGS. 39 and 40) can be characterized as having a central assembly, housing, cartridge or component axis X. The axis X is referenced throughout the embodiment of FIGS. 38-64. The axis X is generally oriented vertically, in typical use.

Figure 41:
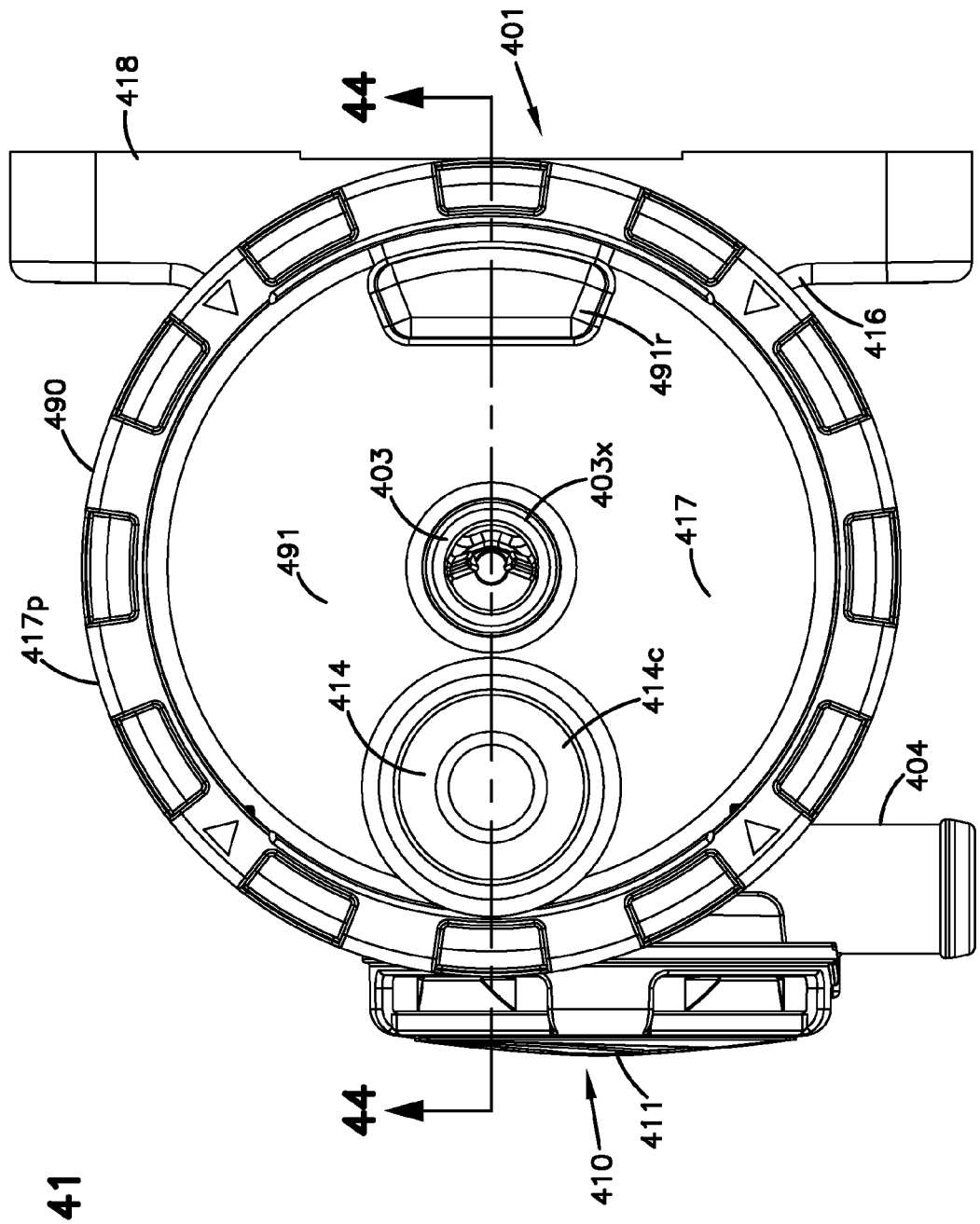
FIG. 41 is a schematic top plan view of the assembly depicted in FIGS. 39 and 40.

In FIG. 41, the top plan view of the assembly 401 is depicted. Selected features previously indicated are identified by like reference numerals.

Referring to FIG. 41, it can be seen that the top cover or service cover 417 has an outer perimeter 417 p. It can also be seen that the inlet tube 403x is generally centrally positioned relative to the outer perimeter 417p of the service cover 417. By "centrally positioned" in its context, as discussed previously, it is meant that the vertical inlet tube 403x is positioned centered on the central (vertical) axis X (FIGS. 39 and 40), as analogously discussed above for the assembly 1. As with the assembly of FIG. 1, many of the principles of the present application can be applied in an arrangement in which the inlet tube 403x is not positioned centrally, i.e. when it is positioned "eccentrically" in accord with the discussion above for the assembly 1.

The particular tube 403x depicted, has an interior definition which is circular in cross-section. This will be typical, but (as with the assembly 1) it is not specifically required in all applications to the principles described herein.

Also, typically the liquid outlet drain 405, FIG. 40, is centrally positioned, although alternatives are possible. Also typically it has a generally circular interior definition and cross-section, although alternatives are possible.

Figure 42:
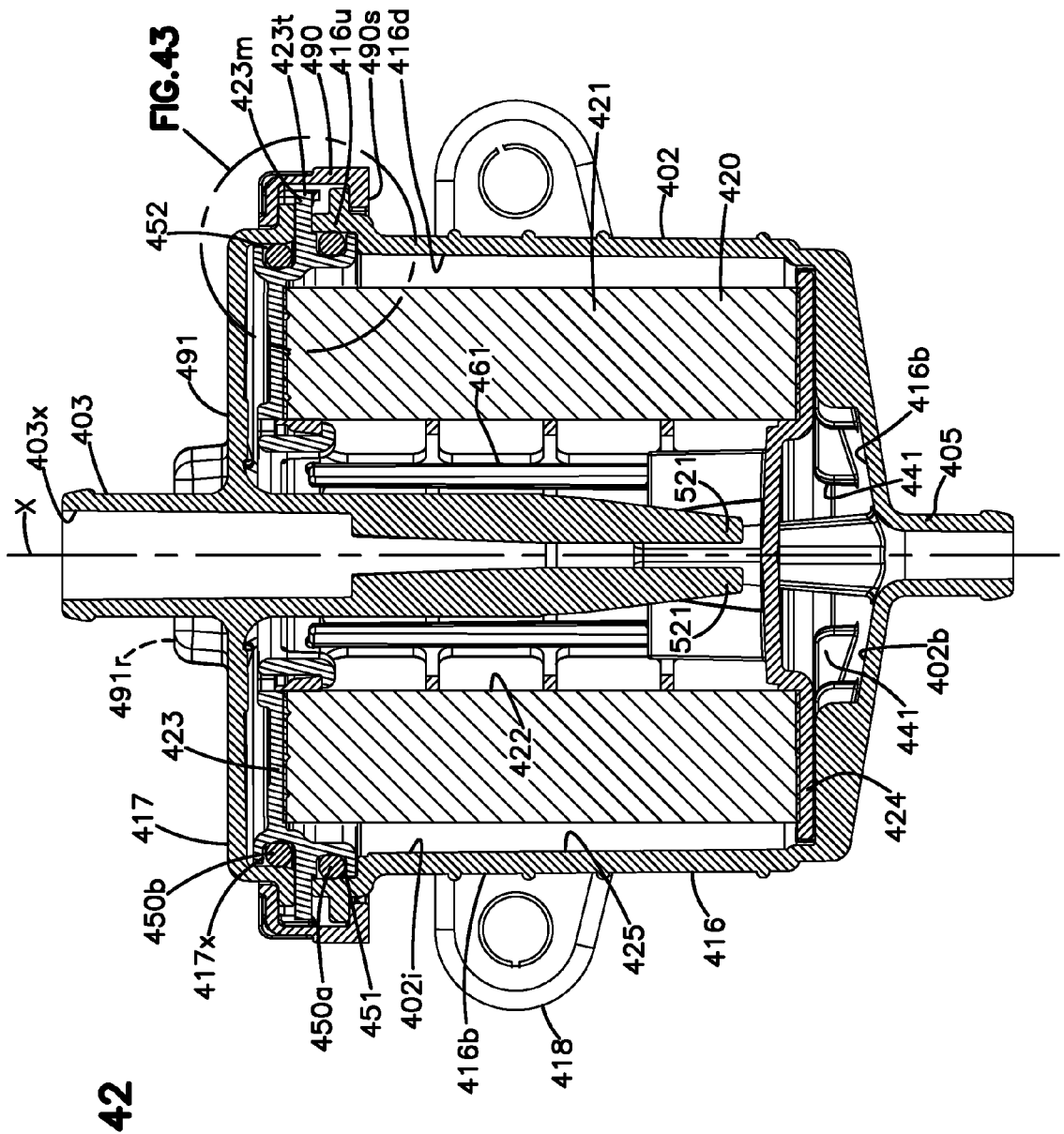
FIG. 42 is a schematic cross-sectional view taken generally along line 42-42, FIG. 40.

Attention is now directed to FIG. 42, a cross-sectional view taken generally along line 42-42, FIG. 39. Referring to FIG. 42, housing 402 can be understood to define a housing interior 402i. Within the housing interior 402i is positioned a serviceable filter cartridge 420. Filter cartridge 420 generally comprises filter media 421 positioned surrounding an open filter interior 422. The filter media 421 is positioned between, and typically extends between, opposite cartridge end pieces 423, 424, while surrounding and defining central cartridge axis X, in the example also corresponding to the central axis X for the housing 402 and assembly 401.

As with the previously described embodiment, filter cartridge 420 is a service component, i.e. it is serviceable.

Referring to FIG. 42, inlet gas flow and liquid drain operation can be understood. As gas enters through (downwardly) directed inlet tube 403x, it is directed into cartridge interior 422. Then it is directed through the media 421 into filtered gas annulus 425. Annulus 425 is a clean or filtered gas flow annulus in flow communication with outlet arrangement 404, FIG. 38.

Liquid coalesced within the media 420 generally drains downwardly to housing bottom 402b (which, for the housing 402 depicted, comprises bottom 416b of housing base arrangement 416) and outwardly through drain arrangement 405.

The filtered gases from annulus 415 are eventually directed to outlet 404 referenced above.

As with the assembly 1, 401 is configured for "in-to-out" flow during filtering. Many of the principles described herein, can be applied with an arrangement configured for "out-to-in" flow during filtering.

Figure 56:
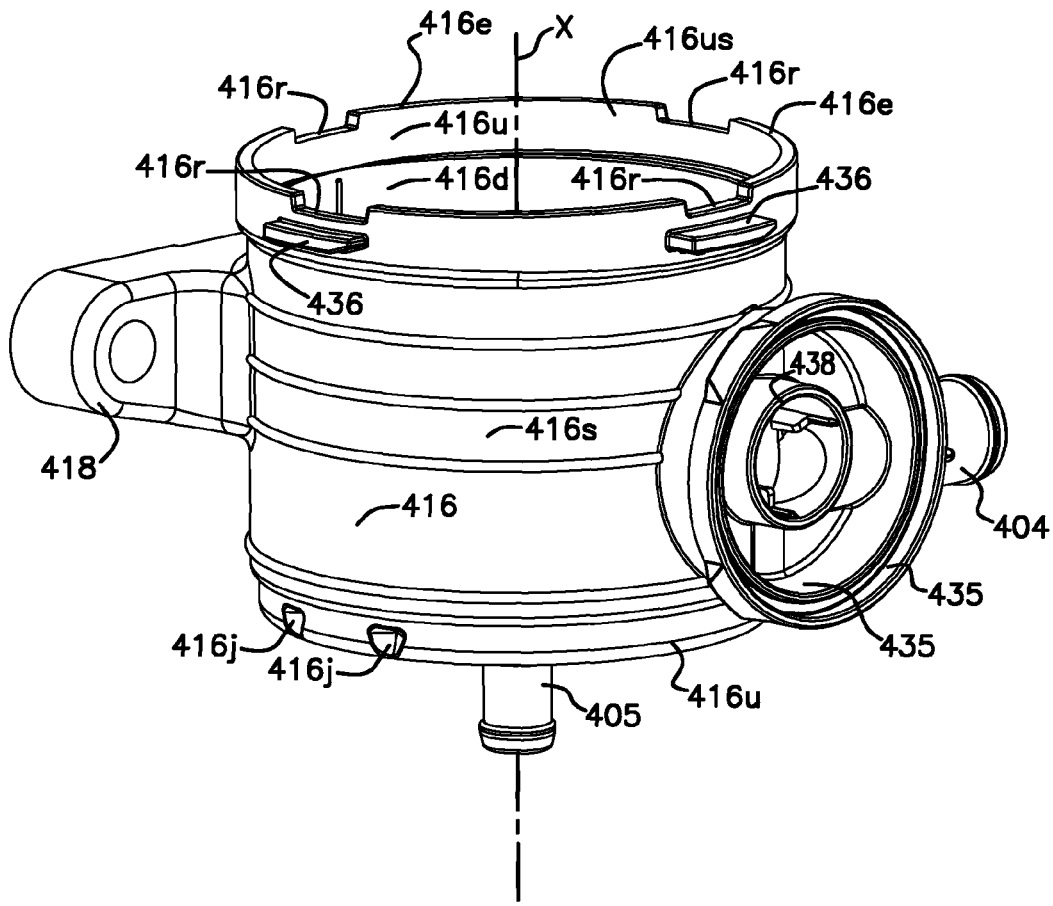
FIG. 56 is a schematic top perspective view of a housing base component of the assembly of FIGS. 39 and 40.

In FIG. 56, housing bottom or base component 416 is depicted, without selected portions of a regulator valve assembly thereon. Typically, annulus 425, FIG. 41, is in flow communication with port 435, FIG. 56, in a sidewall 416s of base 416. Port 435 (not viewable in FIG. 41) is configured with outlet 404 and the regulator valve assembly 410 (FIG. 39) thereon, as discussed below.

Figure 44:
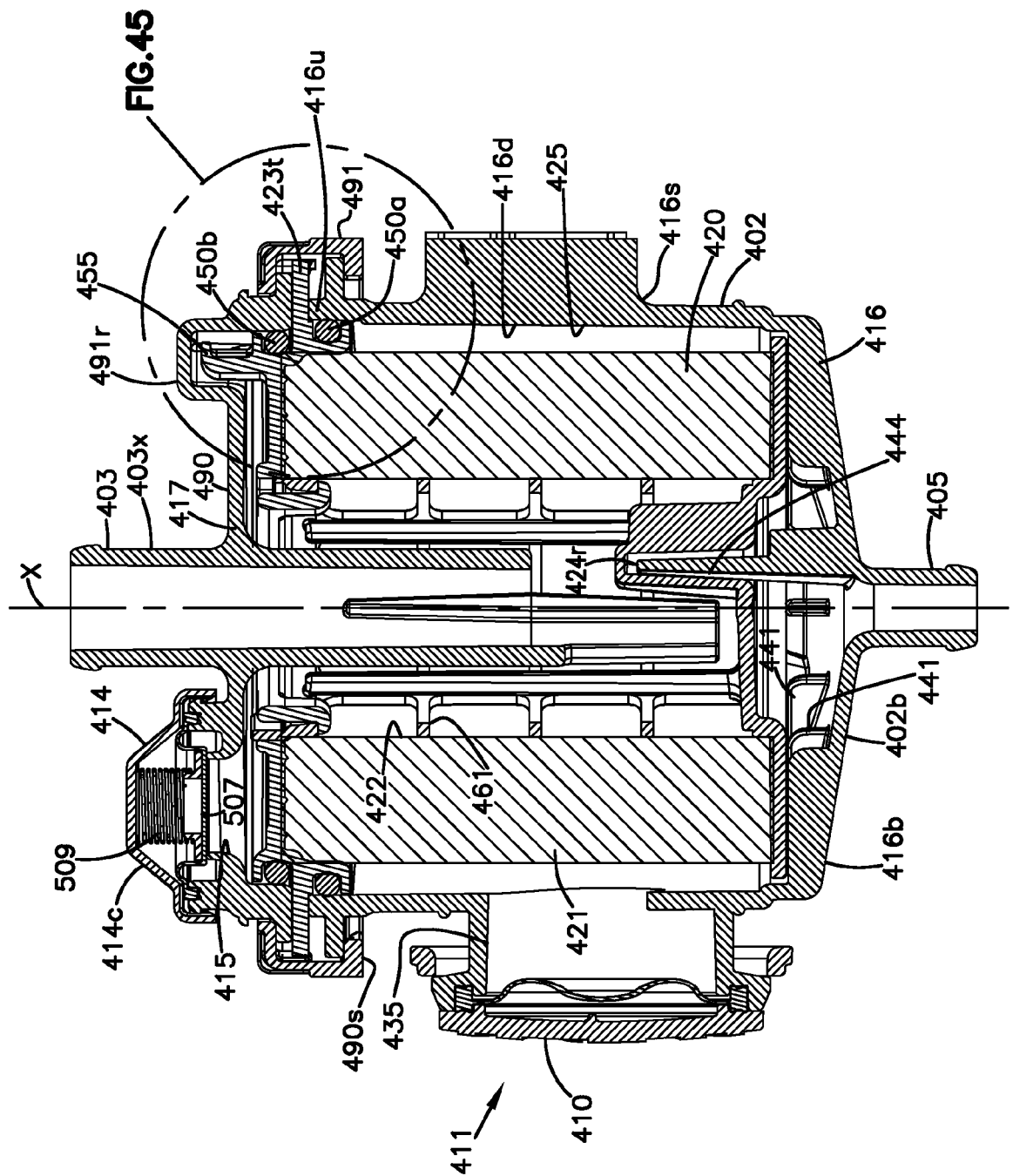
FIG. 44 is a schematic cross-sectional view taken generally along line 44-44, FIG. 41; the view of FIG. 44 generally being a right angle to the view of FIG. 42.
Figure 45:
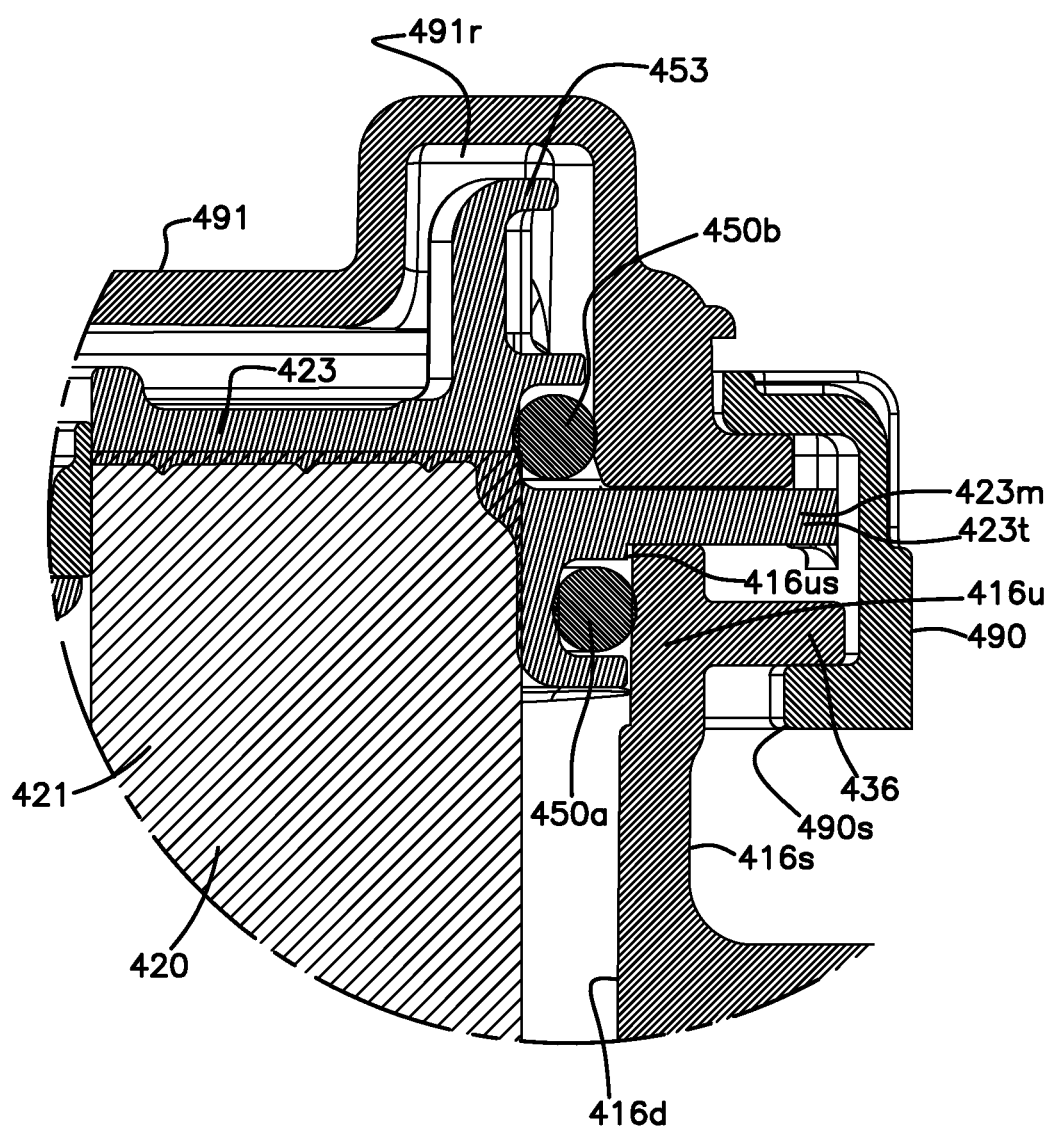
FIG. 45 is an enlarged, schematic, fragmentary view of an identified portion of FIG. 43.

In FIG. 44, second cross-sectional view of assembly 401, taken generally along line 43-43, FIG. 40, is depicted. In FIG. 44, cover 411 of regulator valve assembly 410 can be seen in position on port 435.

Figure 57:
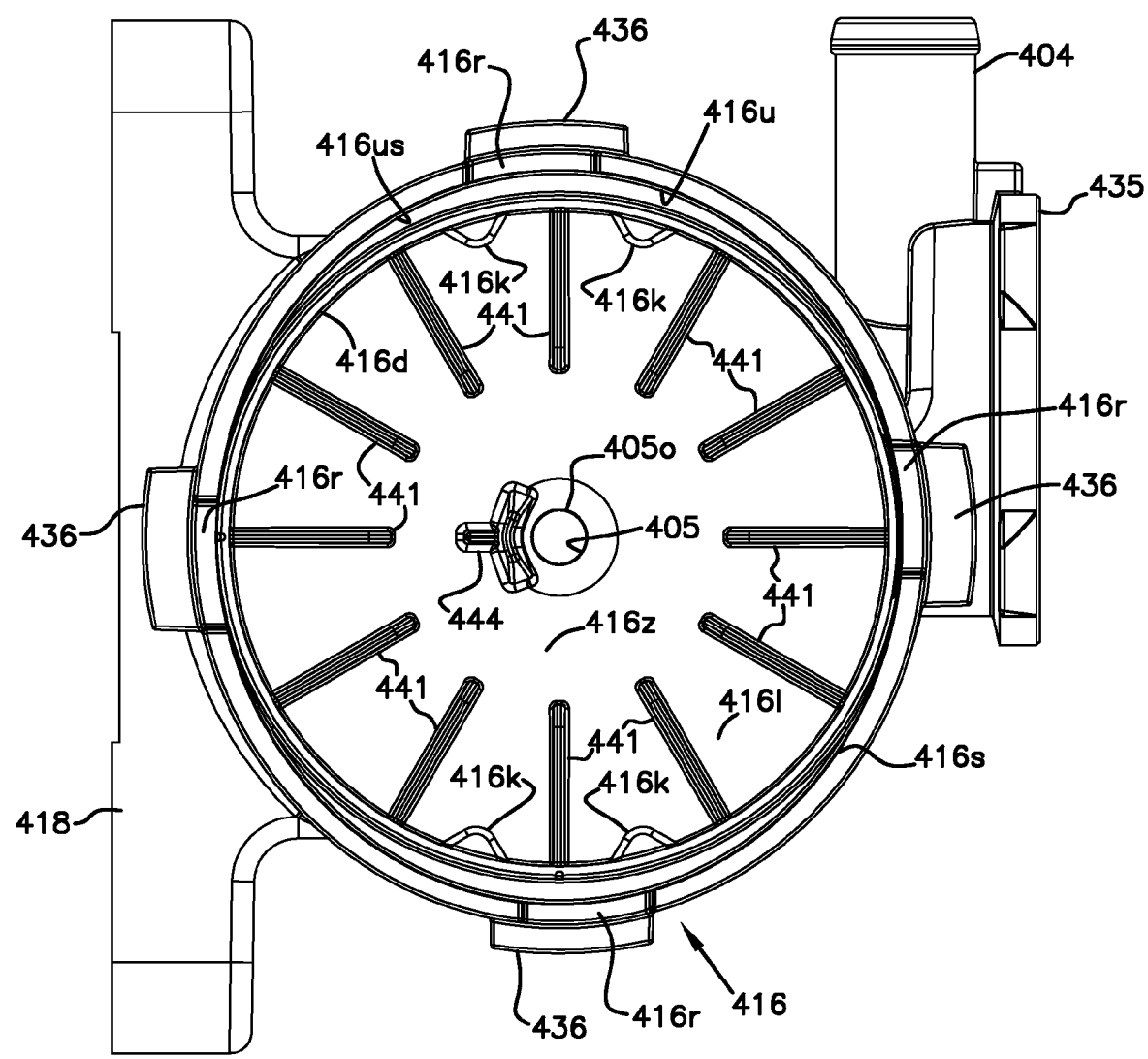
FIG. 57 is a schematic top plan view of the housing base component of FIG. 55.

In FIG. 57, top perspective view of housing base component 416 is depicted. It is noted that the housing base component 416 is depicted in FIG. 57 without selected portions of regulator valve assembly 410 positioned thereon. The particular portion of housing base component 416 depicted in FIG. 57, generally will comprise a unit that can (if desired) be molded as a single, unitary, construction from plastic. This will be typical, although alternatives are possible.

As with base component 16 discussed above, the regulator valve assembly 410 is an optional component. If the housing base component 416 were part of an assembly which does not include such a regulator valve assembly, or which includes a regulator valve assembly alternately mounted, the housing base component 416 could be formed without those selected features thereon, to advantage.

Figure 60:
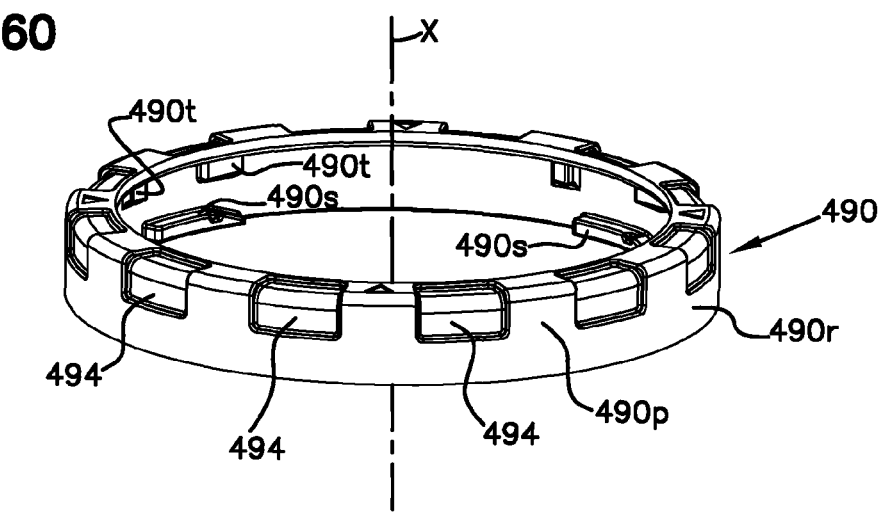
FIG. 60 is a schematic top perspective view of a second, perimeter ring, component of an access cover usable in the assembly of FIG. 39.
Figure 59:
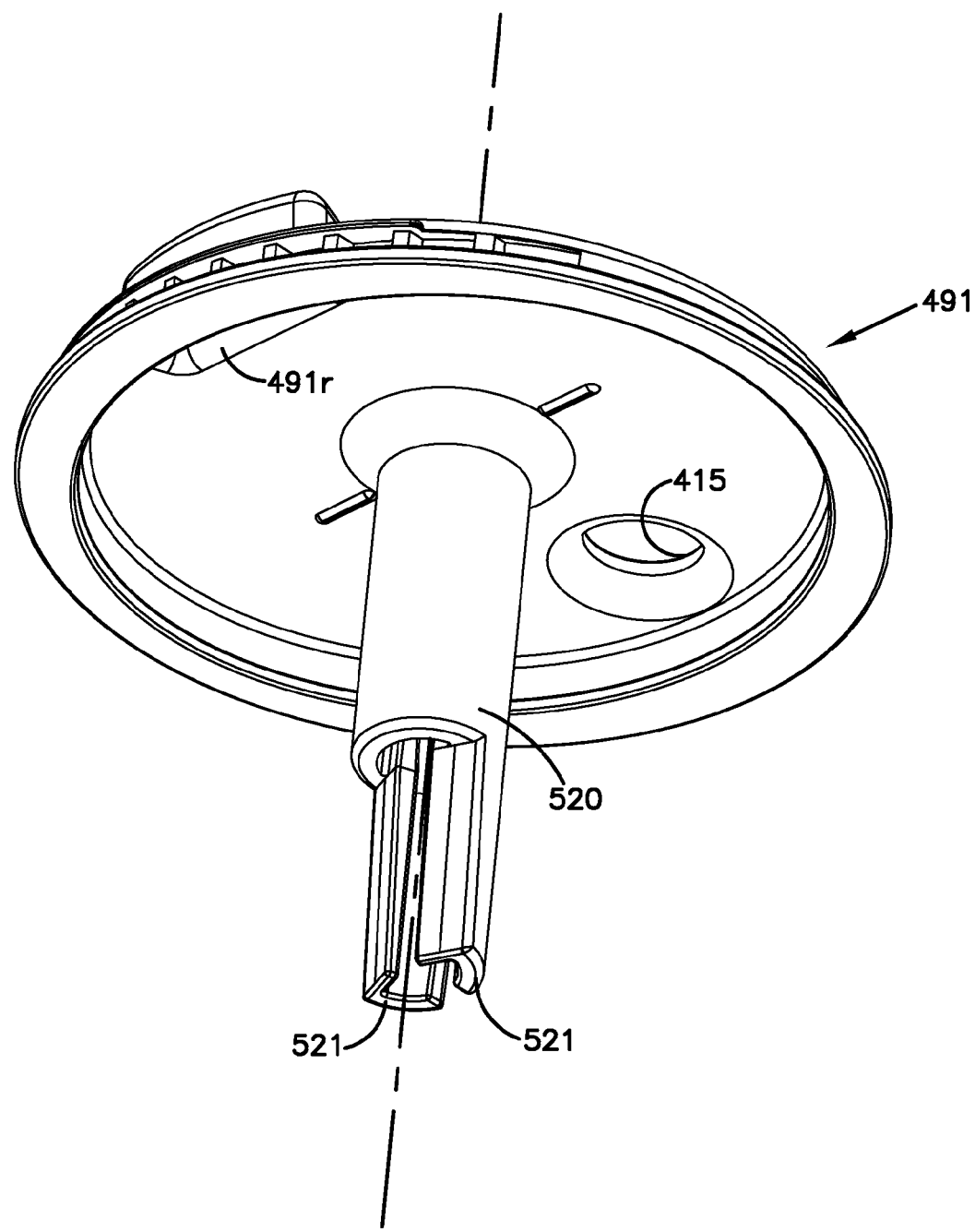
FIG. 59 is a schematic bottom perspective view of a first, center, component of an access cover usable in the assembly of FIG. 39.

Referring now to FIG. 42, the service cover or service cover assembly arrangement 417, for the example depicted, is a two component arrangement comprising: a central cover 491 viewable in FIG. 59; and, a peripheral mounting ring 490, viewable in FIG. 60. These components are discussed below. Typically they would be snap-fit together, with the ring 490 rotatable relative to the central cover 491, and operated together as service cover 417.

Figure 49:
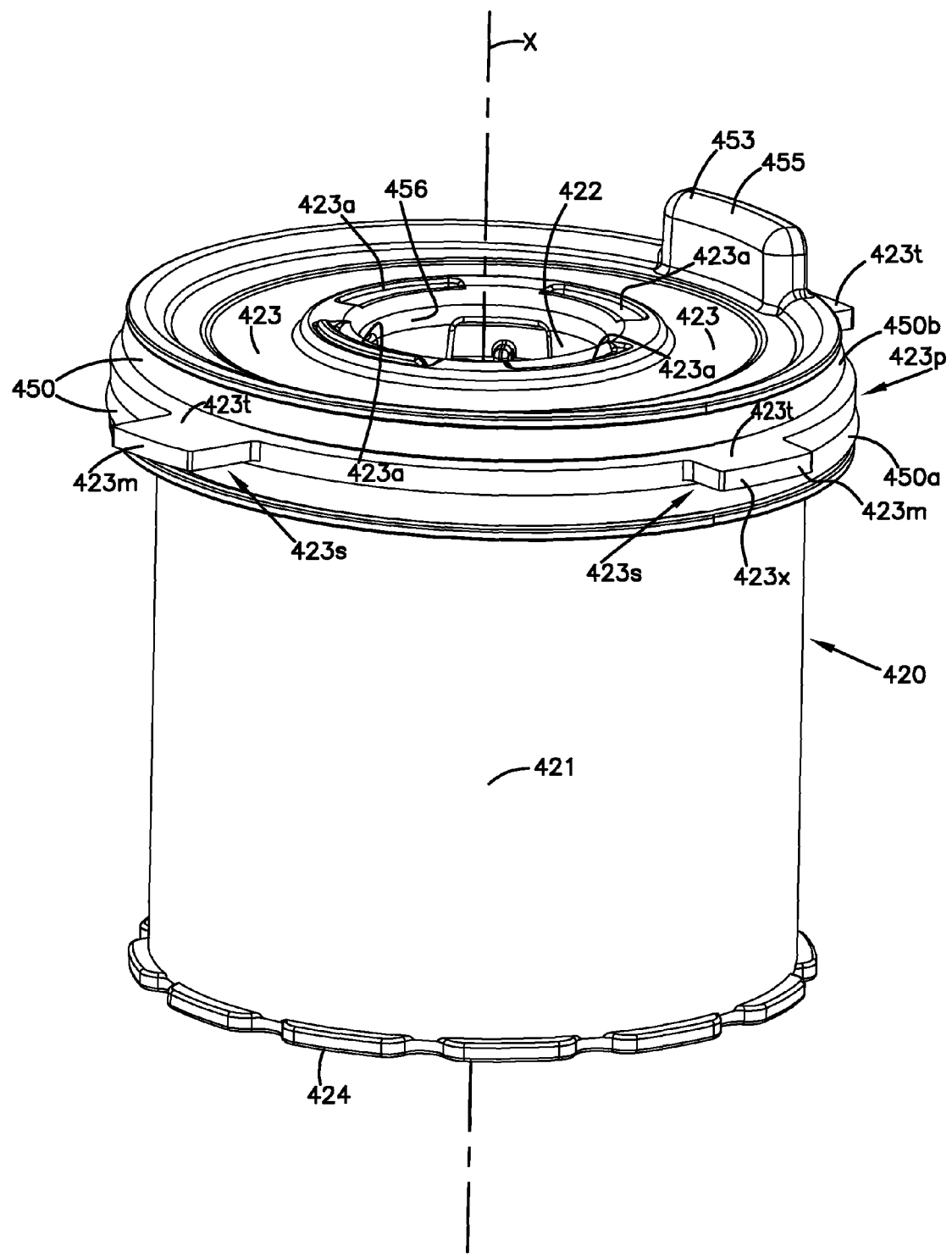
FIG. 49 is an enlarged, schematic, top perspective view of a filter cartridge component usable in the assembly of FIG. 39-48.
Figure 50:
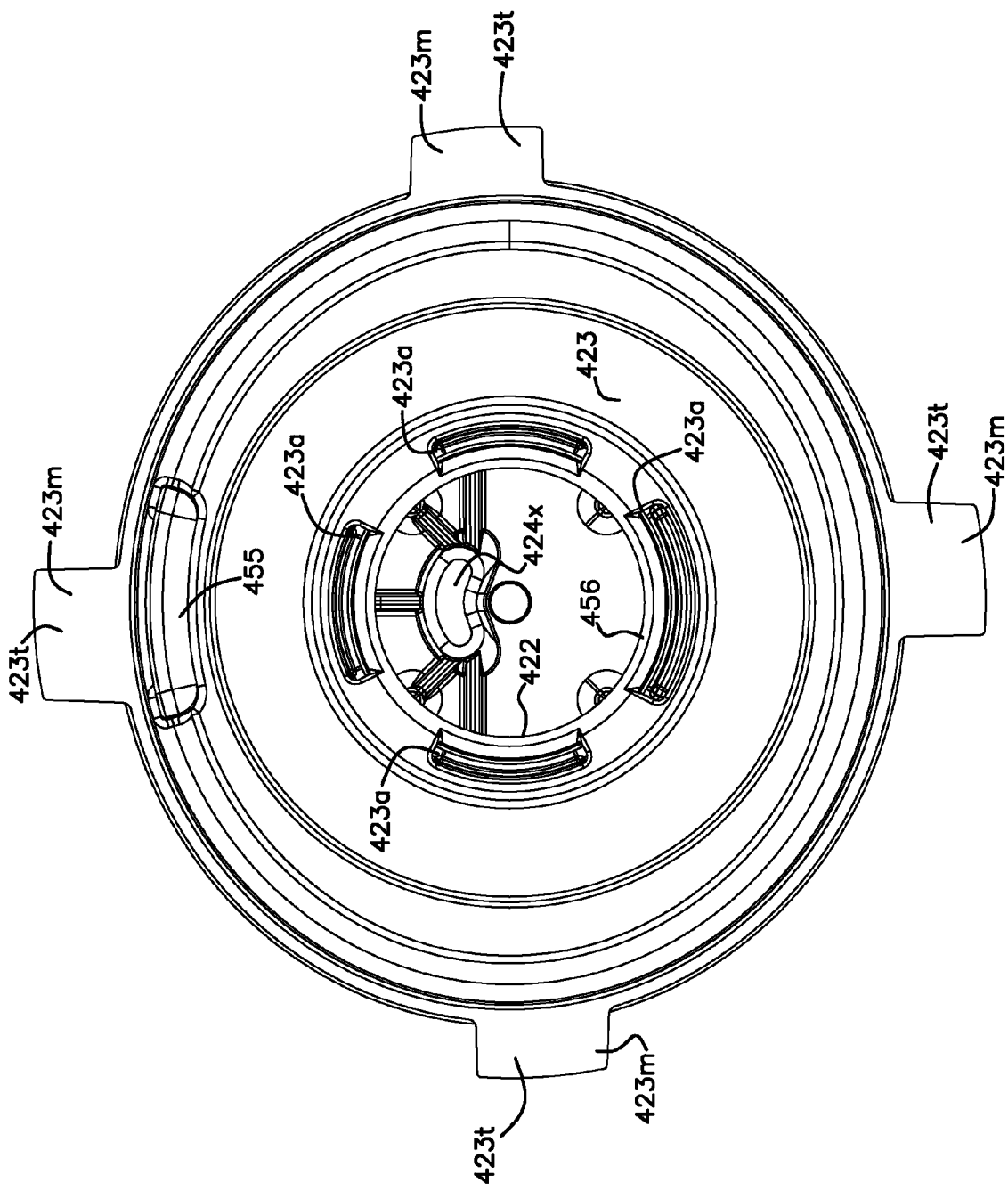
FIG. 50 is a schematic top plan view of the filter cartridge depicted in FIG. 49.

In FIG. 49, the filter cartridge 420 is depicted in perspective view. It is also viewable in FIGS. 50-54, discussed below.

Assembly 401 can be assembled for use by installing cartridge 420 (FIG. 49) into housing base component 416 (FIG. 57), but with regulator valve assembly thereon; and positioning service cover 417 in place over top end 416e (FIG. 56) of housing base component 416.

From detailed descriptions below, and by analogous to the previously described embodiment, it will be understood that many of the features described herein not only relate to configuration for good utilization of space and efficient and effective filter operation, but also to helping ensure that the cartridge which is positioned within an assembly according to present disclosure is a proper cartridge for that assembly and is properly positioned for appropriate use. Many of these features are variations of those discussed previously in connection with the arrangement of FIG. 1.

The inlet arrangement 403, outlet arrangement 404 (FIG. 39) and drain arrangement 405 can be attached to appropriate conduits for gas flow and liquid flow as appropriate. As with the assembly 1, during typical servicing operation, for an installed complete assembly 401, there is no specific need to disattach (detach) hosing or tubing, depending on the nature of tubing attached. Indeed, typically the housing base component 416 remains in place and does not move; and, if tubing attached to inlet arrangement 403 is sufficiently flexible, the access cover 417 can be removed from the housing base 416 without disconnecting the tubing from the inlet 403.

Figure 55:
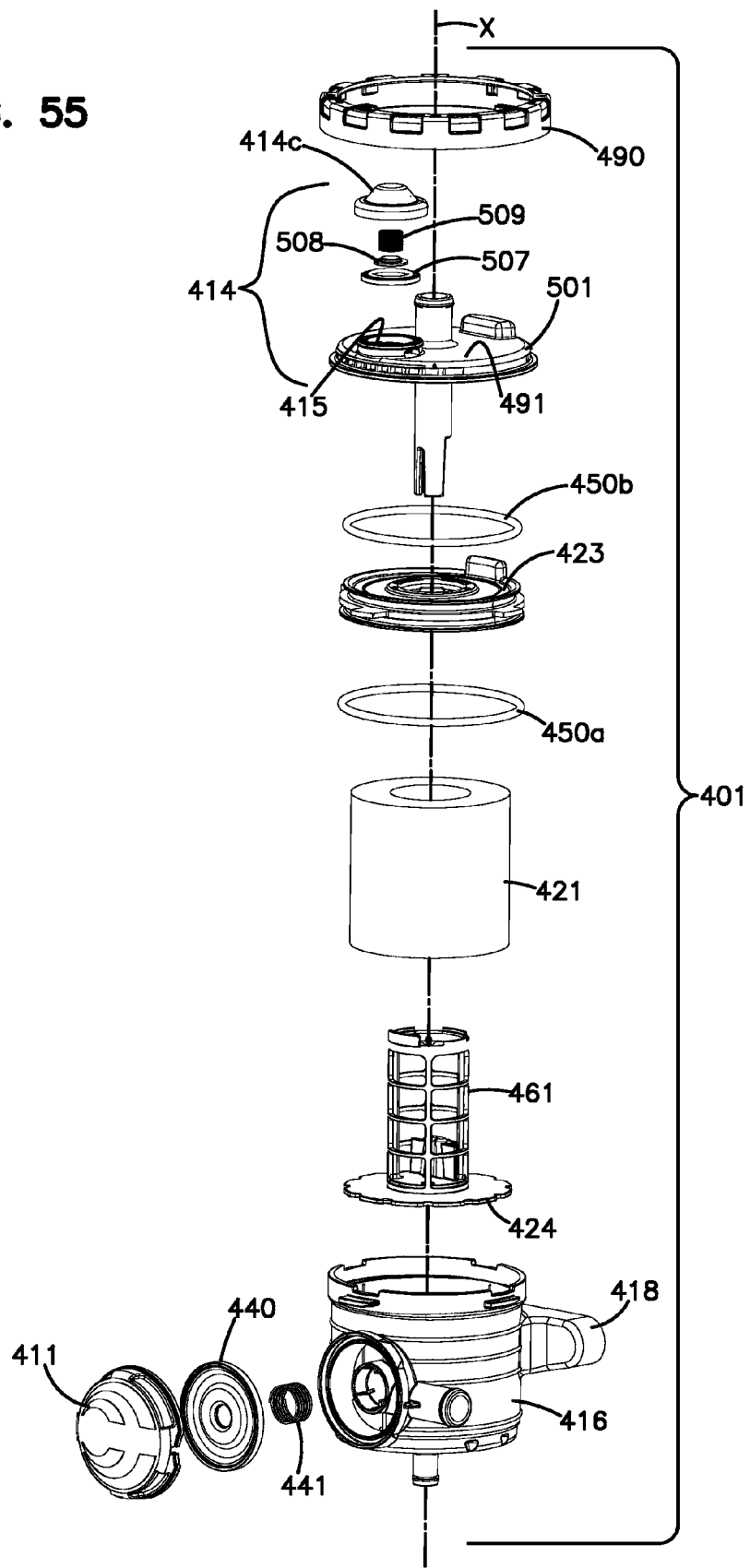
FIG. 55 is a schematic exploded view of the assembly of FIG. 39.
Figure 55A:
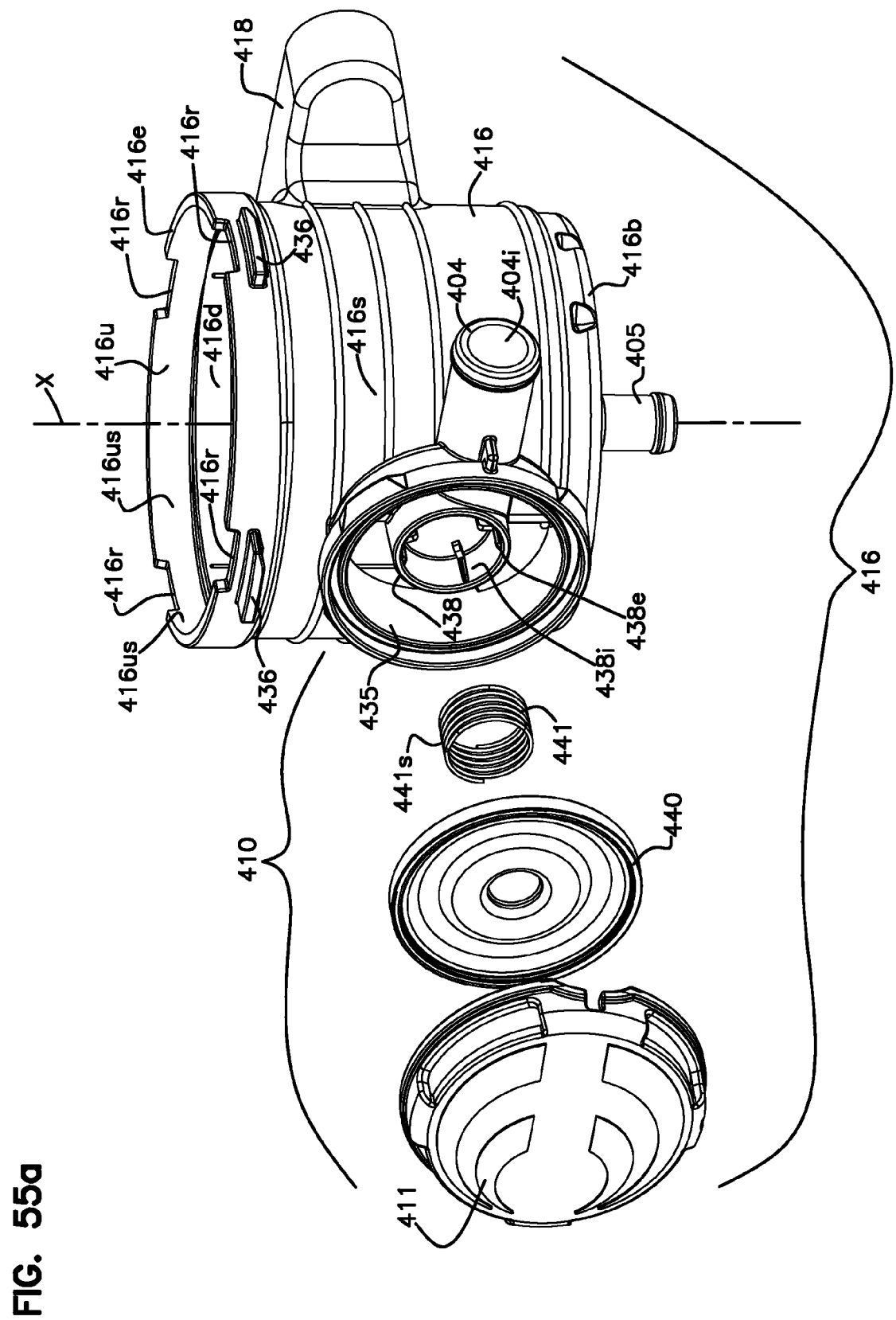
FIG. 55a is an enlarged, schematic, exploded view of a housing base component portion of FIG. 55.

In FIG. 55, an exploded perspective view of the assembly 401 is depicted. In FIG. 55a, an enlarged view of selected portions of FIG. 55 are shown. In FIG. 55a, the portions shown relate to the housing base component 416 and the regulator valve assembly 410.

In FIG. 55a, the housing base component 416 is depicted in perspective view, as comprising sidewall 416s, bottom 416b with drain arrangement 405 therein, open top end 416e and mounting pad arrangement 418.

Also viewable in FIG. 55a, is lock projection arrangement 436 on an outer surface of sidewall 416s adjacent, and spaced from, top edge 416e. Further, spaced around upper portion of sidewall 416x, are positioned recesses 416r. As will be understood from discussion below, the particular assembly 401 is configured so that the service cover 417 is mounted on the housing base 416 by a rotatable ring, using a non-threaded, rotatable lock, arrangement. Alternate methods of connection are possible, but the non-threaded rotational connection is convenient. As will be understood from further discussion below, lock projection arrangement 436 is positioned to be engaged by a portion of the service cover 417 in a manner inhibiting undesirable unlocking during use, for example due to equipment vibration.

Still referring to FIG. 55a, at 404 the gas flow outlet arrangement is depicted, in communication with the port 435. Port 435 is mounted on, and typically molded integral with, sidewall 416s. Positioned interiorly of port 435 is provided conduit ring 438, also typically molded integrally with housing base 416. An interior 438i of ring 38 is in direct flow communication with interior 404i of gas flow arrangement 404. Thus, for assembly 401 depicted, for gases to reach outlet 404 they must pass into and through interior 438i of ring 438. Alternate constructions, however, are possible.

In FIG. 55a, at 440, a diaphragm valve member is depicted. At 441 a biasing arrangement is depicted, in the example shown configured as a coiled spring 441s. When assembled, cover 411 is positioned over, and secures, diaphragm 440 over port 435, closing the port 435. Diaphragm 440 is supported spaced from end 438e of inner ring 438 by biasing member 441.

Operation of the regulator valve arrangement 410 can be analogous to regulator valve arrangement 10 previously described. The general issue, is that for gases to reach tube 404 they must pass over edge 438e and into an interior 438i of tube 438. It is that flow which is regulated by valve arrangement 410 including the diaphragm valve 440, sometimes characterized as a rolling hinge valve. It is noted that a snap-fit can be used to secure cover 411.

Referring to FIG. 57, a top plan view of housing base 416, it can be seen for the example arrangement depicted, housing base component 416 includes a sidewall 416s having a lower section 416d having a general circular interior, and an upper section 416u having a non-circular interior (but which could be circular in some applications). The upper section 416u includes a radially inwardly directed seal surface 416us against which a cartridge seal engages, to form a seal when the cartridge is installed. This is discussed further below. The surface 416us can be circular but in the example is non-circular. The non-circular seal surface 416us, for the example depicted, is elliptical, having a center that corresponds to central axis X, as does circular section 416d.

It is also noted that in some applications of the techniques described herein, the upper seal surface 416us can be configured circular and indeed can be of the same size as the lower section 416d. However, the particular arrangement depicted and discussed, is advantageous for reasons discussed below.

In FIG. 57, an interior surface 416z of bottom 416b can be seen. The interior surface 416z of bottom 416b includes a plurality of radial ribs 441 thereon, which, in part, provide strength to the bottom surface 416z.

Figure 47:
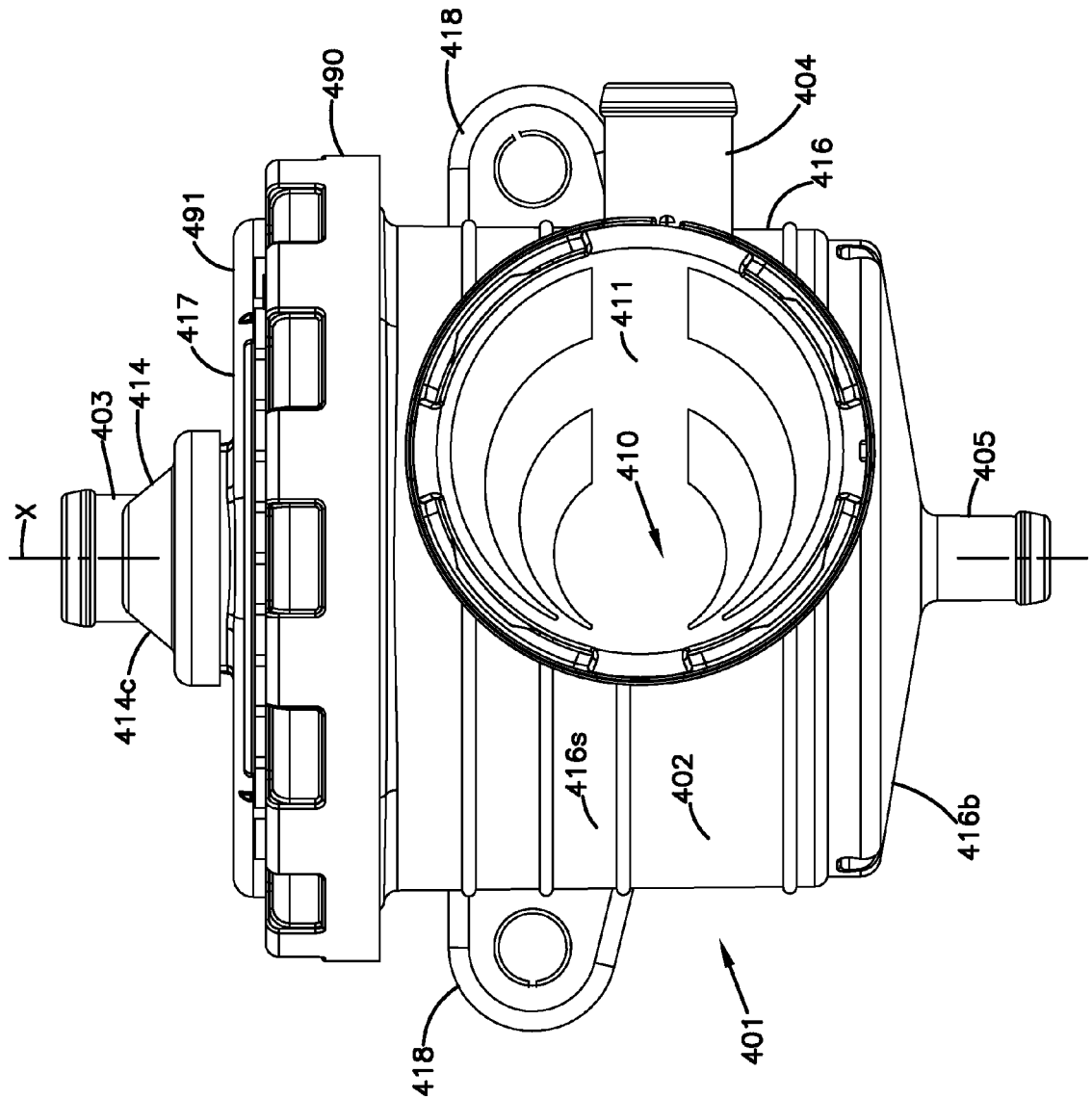
FIG. 47 is a second schematic side elevational view of the assembly of FIGS. 39 and 40.
Figure 48:
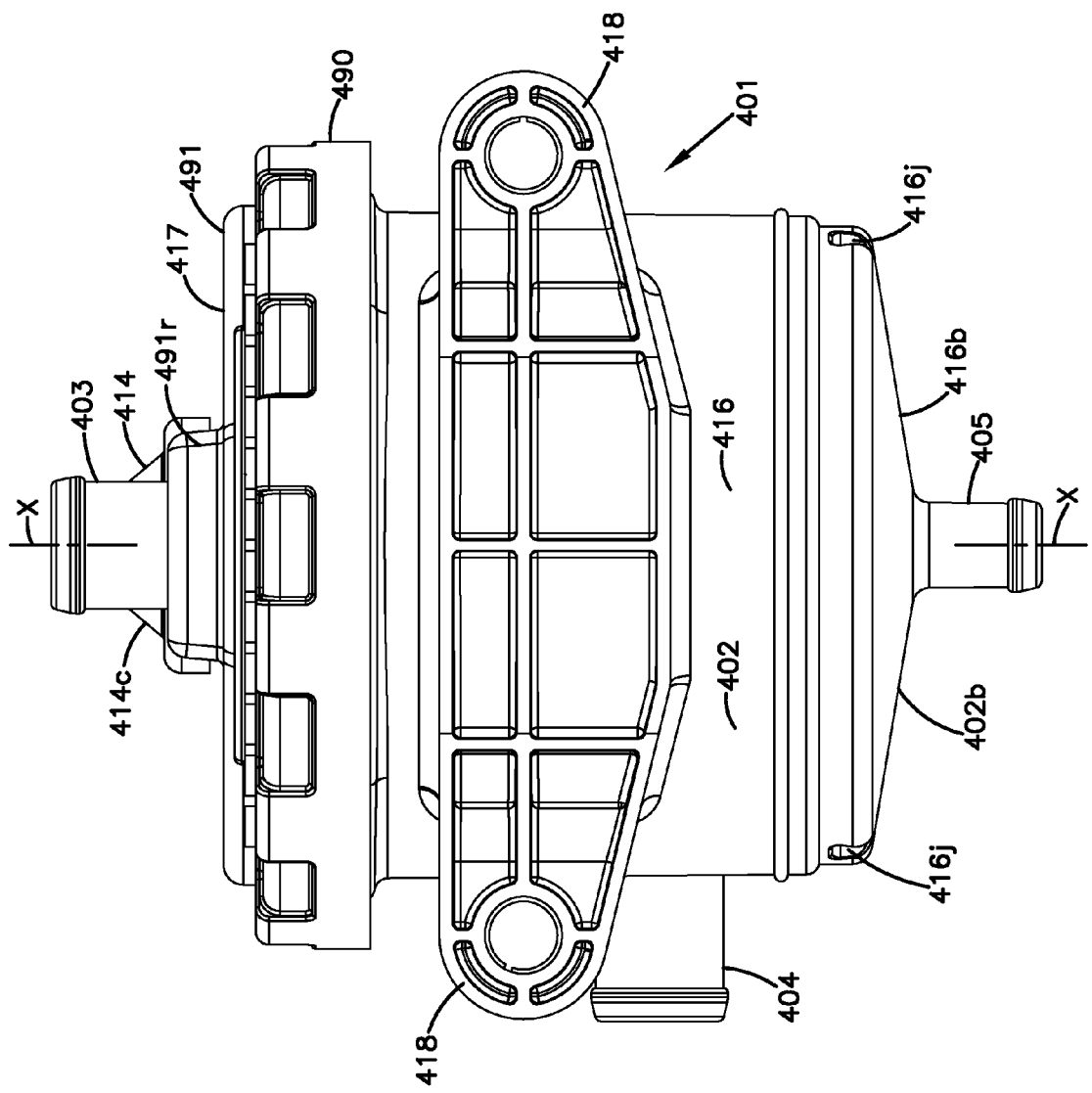
FIG. 48 is a third, schematic, side elevational view of the assembly depicted in FIGS. 39 and 40.

In FIG. 57, at 405o, an opening at a bottom drain arrangement 405, is shown. Positioned adjacent opening 405o for the drain 405, FIG. 47, is provided projection arrangement 444. The projection arrangement 444 generally projects from a portion of bottom surface 416z in a direction away from drain 405 and generally toward upper end 416e of base 416; i.e., toward service cover 417, FIG. 44. Projection arrangement 444 is configured to interact with serviceable filter cartridge 420 in manners discussed below and analogously to projection 44 and cartridge 20 discussed above. For the particular arrangement depicted, the projection arrangement 444 is a (first) member of a (first) projection/receiver arrangement, of which another (second) member is positioned on the cartridge 420. For the particular assembly 401 depicted, projection arrangement 444 is (optionally) also part of a cartridge-to-housing (base) component rotational orientation indexing arrangement, which ensures that the cartridge 420 is installed in a selected rotational orientation relative to the housing base component 416. This helps ensure that the cartridge 420 is a proper cartridge for the assembly and is appropriately oriented.

Referring again to in FIG. 57, radially inwardly projecting tabs 416k, formed by recesses 416j, FIG. 40, are viewable. The tabs 416k are analogous to tabs 16k, and are oriented adjacent bottom 416z, where they can (optionally) mate with selected portions of a cartridge 420 as discussed below.

Attention is now directed to FIG. 49, in which filter cartridge 420 is depicted in top perspective view. The filter cartridge 420, generally comprises media 421 positioned in extension around an open interior 422. The media 421 is positioned at a location between opposite first and second end pieces 423, 424. The media 421, as with media 21, is generally configured to receive gases directed therethrough, and to allow for coalescing of liquid within the media 421 while trapping certain contaminant. The media 421 can be chosen from a variety of media and can be in accord with media 21 discussed above. The particular cartridge 420 depicted analogously to cartridge 20 is configured to be vertically oriented when installed. That orientation is typically with first end piece 423 oriented as an upper end piece and the second end piece 424 oriented to the lower or bottom end piece.

Referring to FIG. 49, attention is directed to first (upper) end piece 423. The first end piece 423 includes an outer perimeter region 423p, which the example depicted, includes positioned thereon, a housing seal member or arrangement 450. In this instance, the housing seal member or arrangement 450 comprises first and second seal members 450a, 450b, although alternatives are possible. The housing seal arrangement 450 is configured such that when the cartridge 420 is installed in the housing 402, the housing seal arrangement 450 is positioned and configured to form a seal with a portion of the housing 402. In the example, a portion of the housing seal arrangement 450, in particular seal member 450a, is configured to form a seal with a portion of a housing base 416; and, a portion 450b of the housing seal arrangement 450 is located in position to form a seal with a portion of the access cover 417. The housing seal arrangement 450, analogously to housing seal member 50, is a "releasable" seal arrangement.

The particular housing seal member 450 depicted is a position on the first end piece 423 oriented as first and second perimeter housing seal members 450a, 450b. Thus, housing seal member 450 comprises at least one, perimeter, housing seal member, in this instance, two "perimeter" housing seal members 450a, 450b. By "perimeter" in this context, it is meant that the referenced seal member surrounds a portion of the outer perimeter of the end piece 423, on which it is positioned. In this instance, it is noted that a portion of the end piece 423, indicated generally at 423x, FIG. 49, projects radially outwardly from between the housing perimeter housing seal members 450a, 450b. This operates as a "vertical spacer arrangement" discussed in detail below.

With respect to the housing seal arrangement 450, attention is now directed to perimeter seal portion or member 450a. This portion is located to seal to the housing base 416. In particular, attention is directed to FIG. 55a, in which the housing base 416 is depicted. It is noted that housing base 416 in FIG. 55a, is depicted with the regulator valve assembly arrangement 410 in exploded view.

Referring to FIG. 55a, at 416us, the seal surface for engagement by perimeter seal 450a is depicted. This will form the releasable seal, indicated in the cross-sectional view of FIG. 42 at 451.

The seal 451 will generally be referred to as "radially directed" seal, since the force of the seal is generally directed toward or away from central axis X. The particular perimeter seal 451 formed by seal member 450a is a radially "outwardly" directed perimeter seal, since the seal member 450a seals to a surrounding portion of a housing with faces in a direction away from an axis X.

The seal member 450a can be configured in a variety of specific shapes. For example, it can be defined in a plane, orthogonal to axis X, as depicted. In can, however, be oriented in a place extending at an acute angle to a plane perpendicular to axis X if desired. The plane in which the seal 450a rests (if seal 450a is planar) is referred to herein as a "seal plane." The term "seal plane" is intended to reference the central plane of the seal member 450a in which the seal rests to form the outwardly directed radial seal.

The seal member 450a can define a seal in a circle around the central axis X, if desired. This would be a "circular perimeter" to the seal member 450a. The particular seal member 450a depicted, however, defines a "non-circular perimeter pattern." That is, its outer perimeter, in the example depicted, does not define a circle around central axis X. The particular "non-circular outer perimeter" defined by seal member 450a is oval or elliptical. Alternatives are possible.

Referring to FIG. 55a, then, surface 416us is not circular, but rather (for mating with seal member 450a) is defined in an "elliptical" pattern. This will provide some advantage in: ensuring that the cartridge 420 is the proper cartridge for the system 401 of concern; ensuring that the cartridge 420 is securely positioned once installed; and, ensuring that the cartridge 420 is properly oriented when installed.

Referring again to cartridge 420, FIG. 49, seal member 450b is also defined as a perimeter housing seal. In this instance, it is configured to from a seal 452 by sealing against seal surface 417x of the access cover 417, FIG. 42. The particular seal member 450b depicted is also in a seal plane orthogonal to central axis X, but alternatives are possible. Further, the seal member 450b can define either a circular or non-circular outer perimeter. However, in the particular example depicted, seal member 450b defines a circular outer perimeter.

Referring again to FIG. 49, for the depicted cartridge, 420 the seal members 450a, 450b are positioned in the same end piece 423, and are positioned vertically (or axially) spaced from one another, i.e. spaced from one another in the direction of longitudinal extension of central axis X. The spacing is with the surfaces that form the seals typically spaced vertically at least 0.5 mm apart, typically at least 1 mm apart, although alternatives are possible. Principles relating to the spacing of such seal members are described for example in U.S. Ser. No. 61/503,063 and U.S. Ser. No. 61/664,340, incorporated herein by reference.

Still referring to FIG. 49, first end piece 423 of cartridge 420 includes an axial locator projection member 453 thereon. The axial projection member 453 is part of projection/receiver arrangement that ensures rotational orientation with an access cover assembly 417, discussed below.

Further, the end piece 423 includes a spacer arrangement 423s including at least one spacer member 423m oriented between the first and second seal members 450a, 450b, and in the example depicted projecting radially outwardly from central axis X to a location further radially outwardly from an extension of radial projection of either of members 450a, 450b. This comprises a vertical spacer arrangement discussed below, in accord with the general principles of U.S. Ser. No. 61/503,063 and U.S. Ser. No. 61/664,340 incorporated herein by reference. In the example depicted, the spacer members 423m comprise a plurality of tabs 423t spaced around end piece 423. The tabs 423t not only operate for spacing, but are locator tabs for engagement with housing base 416. Referring to the top plan view of FIG. 50, the particular arrangement 423m comprises four spaced tabs 423t although alternative numbers (typically 3-6, inclusive) are possible.

Figure 46:
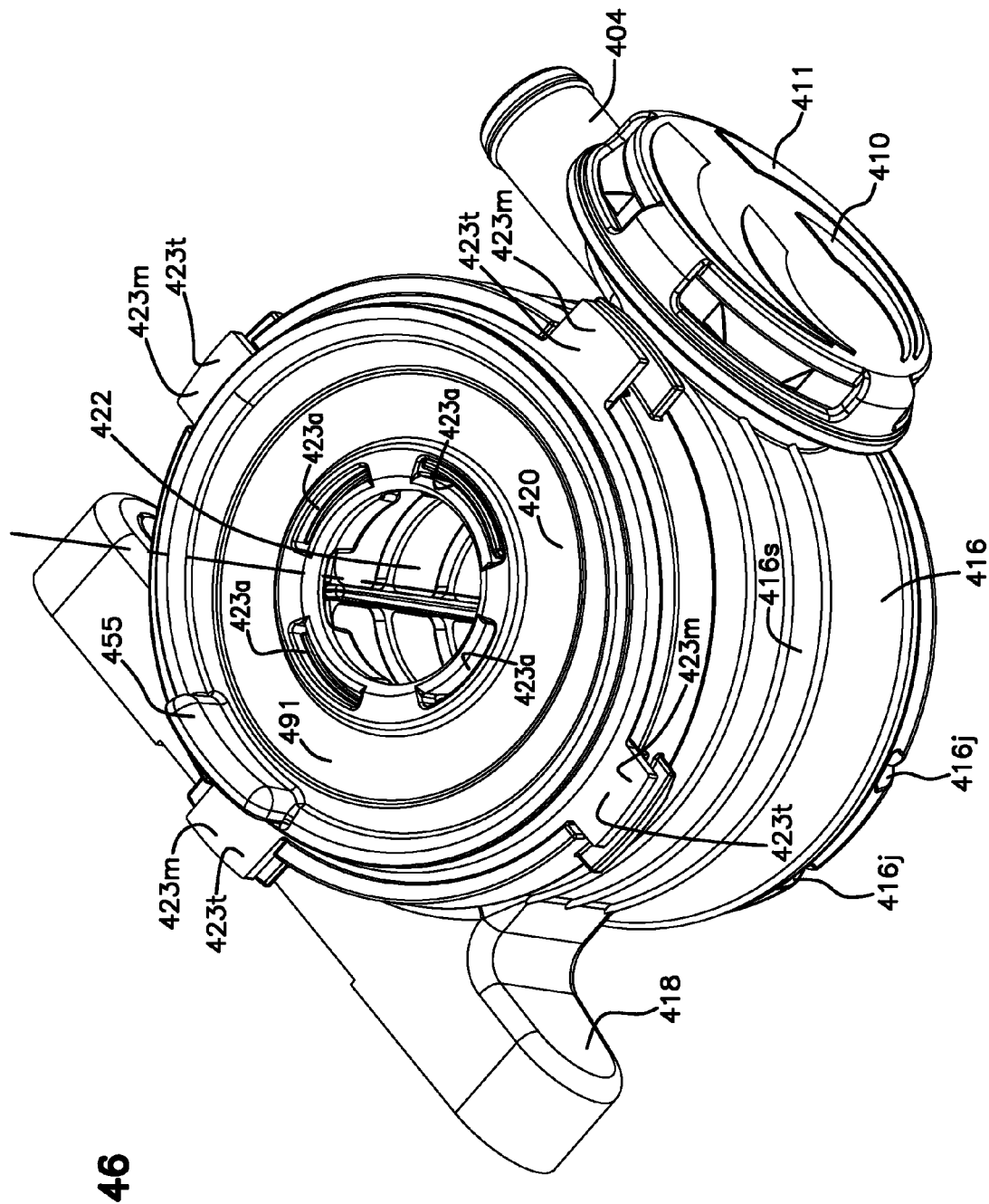
FIG. 46 is a schematic top perspective view of the assembly of FIGS. 39 and 40, with an access covered removed.
Figure 58:
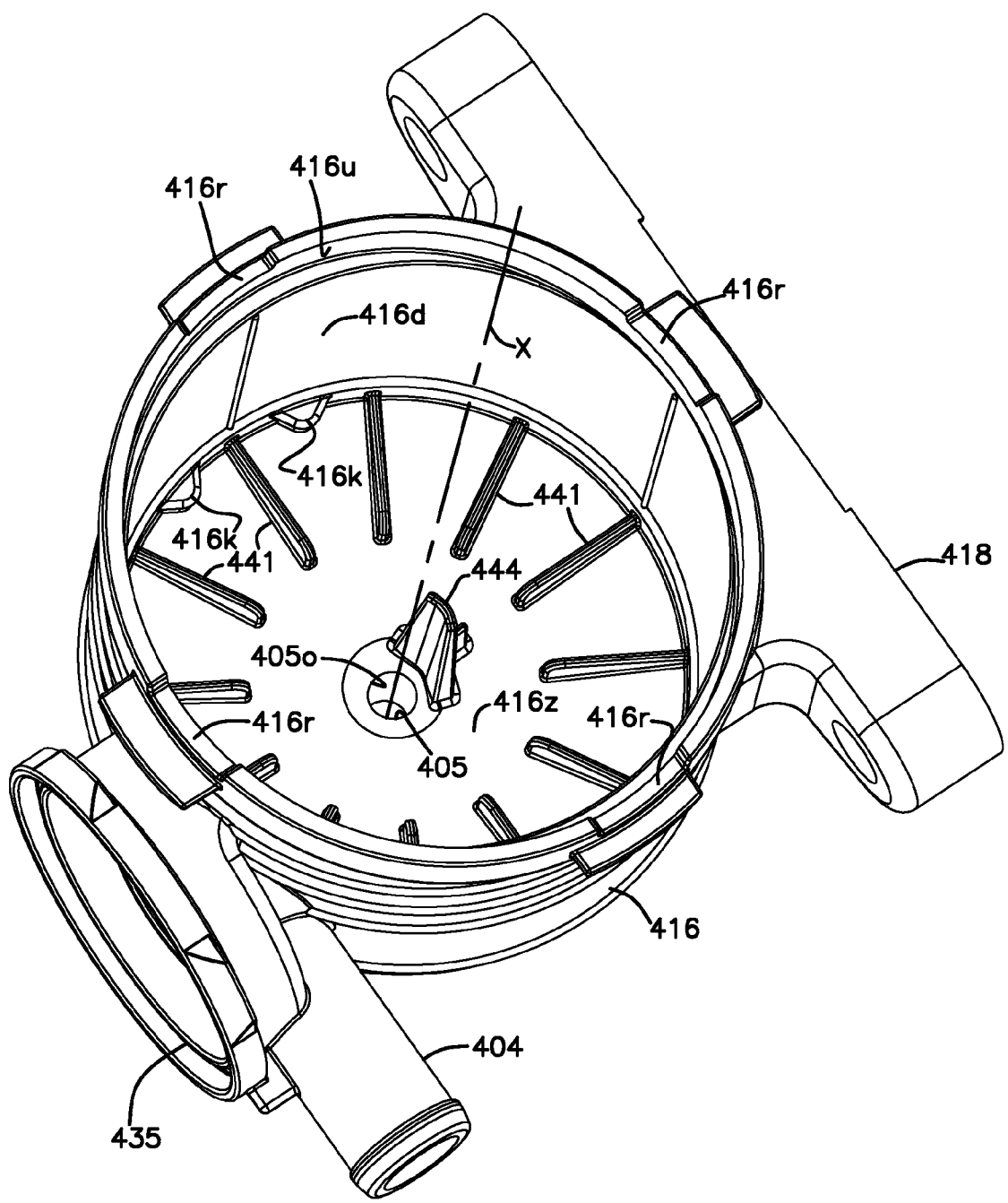
FIG. 58 is a second schematic top perspective view of the housing base component of FIG. 56.

Referring to the housing base 416, FIG. 58, it is noted that recesses 416r are located to receive the tabs 423t therein, as the cartridge 420 is lowered into the housing base 416. The tabs 423t will project through the receivers 416r as discussed below and as depicted in FIG. 46, in which the access cover is not depicted.

Referring again to FIG. 49, upper end piece 423 is depicted as having gas flow aperture 456 extending therethrough, in communication with the open filter interior 422. Aperture 456 for a "in-to-out flow" system is depicted, is an aperture that allows for gas flow entry, with gases to be filtered, into interior 422. For the particular assembly depicted, the upper aperture 456 receives, projecting therethrough, a portion of inlet tube 403x, as discussed further and analogously to cartridge 420 discussed previously. The aperture 456 can be sized and configured analogously to aperture 51 if desired. However, alternatives are possible.

Figure 54:
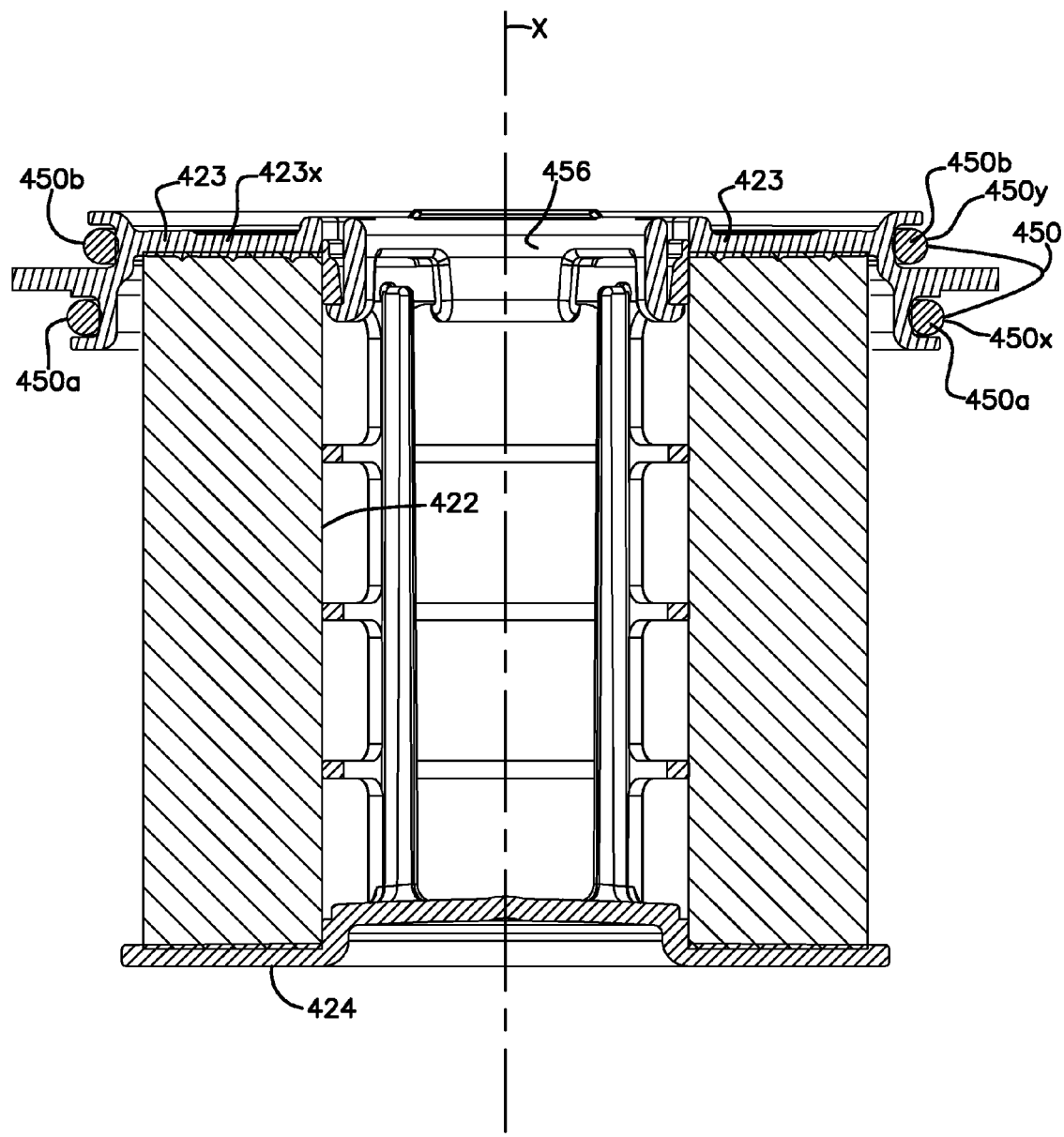
FIG. 54 is a schematic cross-sectional view taken generally along line 54-54, FIG. 53.

Attention is now directed to FIG. 54, a cross-sectional view of cartridge 420. Attention is directed to the first end piece 423. In the example depicted, the first end piece 423 is a multi-piece construction comprising: a preformed, typically rigid, frame portion 423x and a seal arrangement 450, in this example comprising seal members 450a, 450b, secured to the frame portion 423x. In the example depicted the seal members 450a, 450b each independently comprise an o-ring 450x, 450y respectively, although alternatives are possible. In FIG. 54, the cross-sectional view taken through the largest perimeter dimension of each of the seal members 450a, 450b. This means that with respect to seal 450a, the cross-section is through the long axis or major axis of the elliptical perimeter. Since seal member 450b in the example depicted is circular, the dimension thereacross in FIG. 54 is merely a diameter.

Herein, the largest radial extension of a seal member will be referred to as its "largest cross-sectional dimension." For an elliptical seal, this would be the length of the major axis as measured across an outer perimeter of seal member 450a. For a circular seal, this would be an outer diameter as measured across an outer perimeter of seal 450b. Referring to FIG. 54, it can be seen that the largest perimeter dimension of the first seal member 450a is larger than a largest perimeter dimension of the second seal member 450b. This will be typical for an embodiment as depicted in FIG. 54, but it is not critical to obtain some advantage to arrangements according to the present disclosure. Typically, the largest perimeter dimension D1 of a first seal member 450a is at least 0.25 mm greater than a largest perimeter dimension of the second seal member 450b, often at least 0.5 mm (usually at least 1 mm) larger and in some embodiments substantially more. With respect to this, attention is directed to the principles described in U.S. Ser. No. 61/503,063 and U.S. Ser. No. 61/664,340 incorporated herein by reference.

Figure 51:
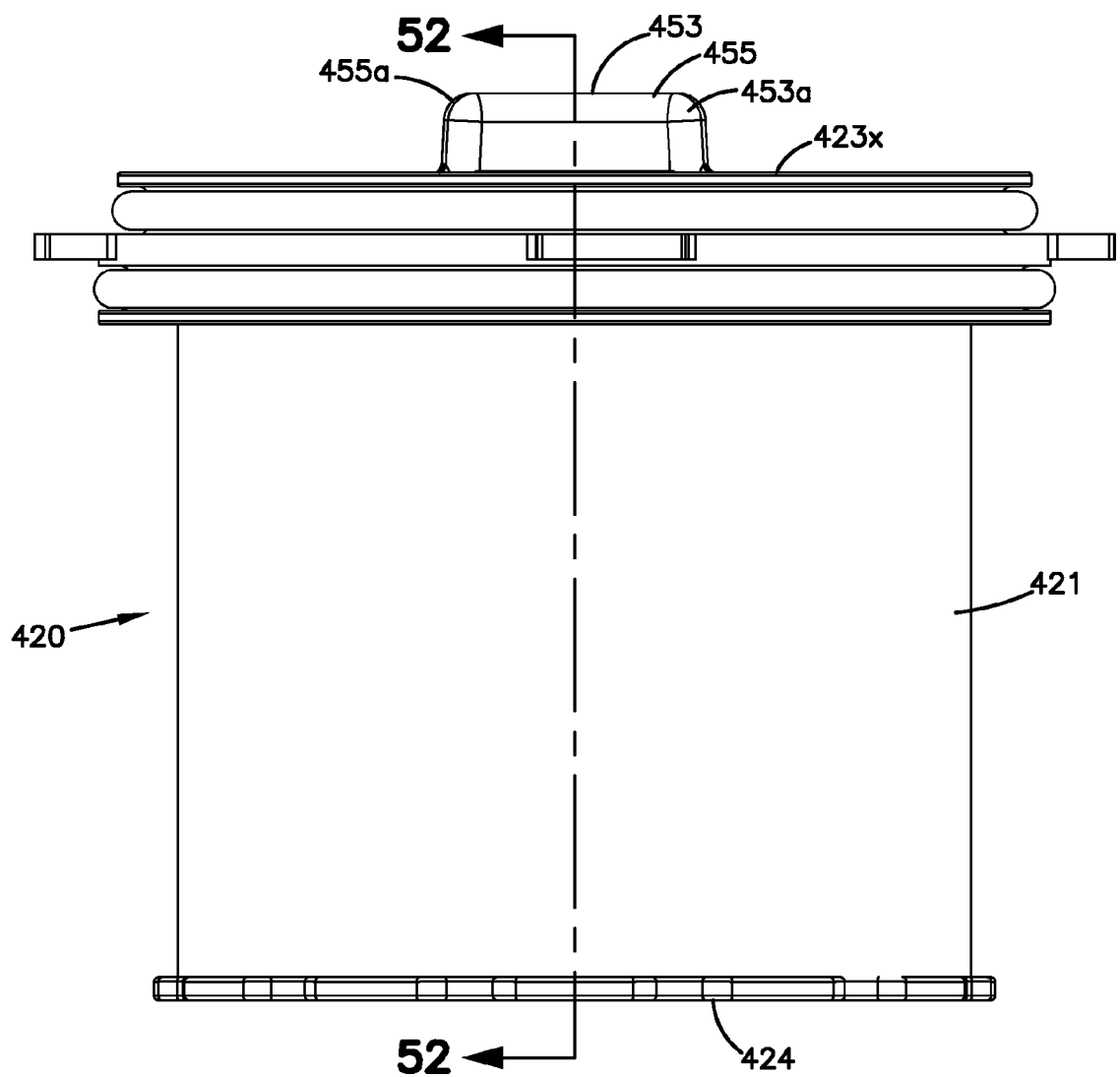
FIG. 51 is a first schematic side elevational view of the filter cartridge component depicted in FIG. 50.
Figure 52:
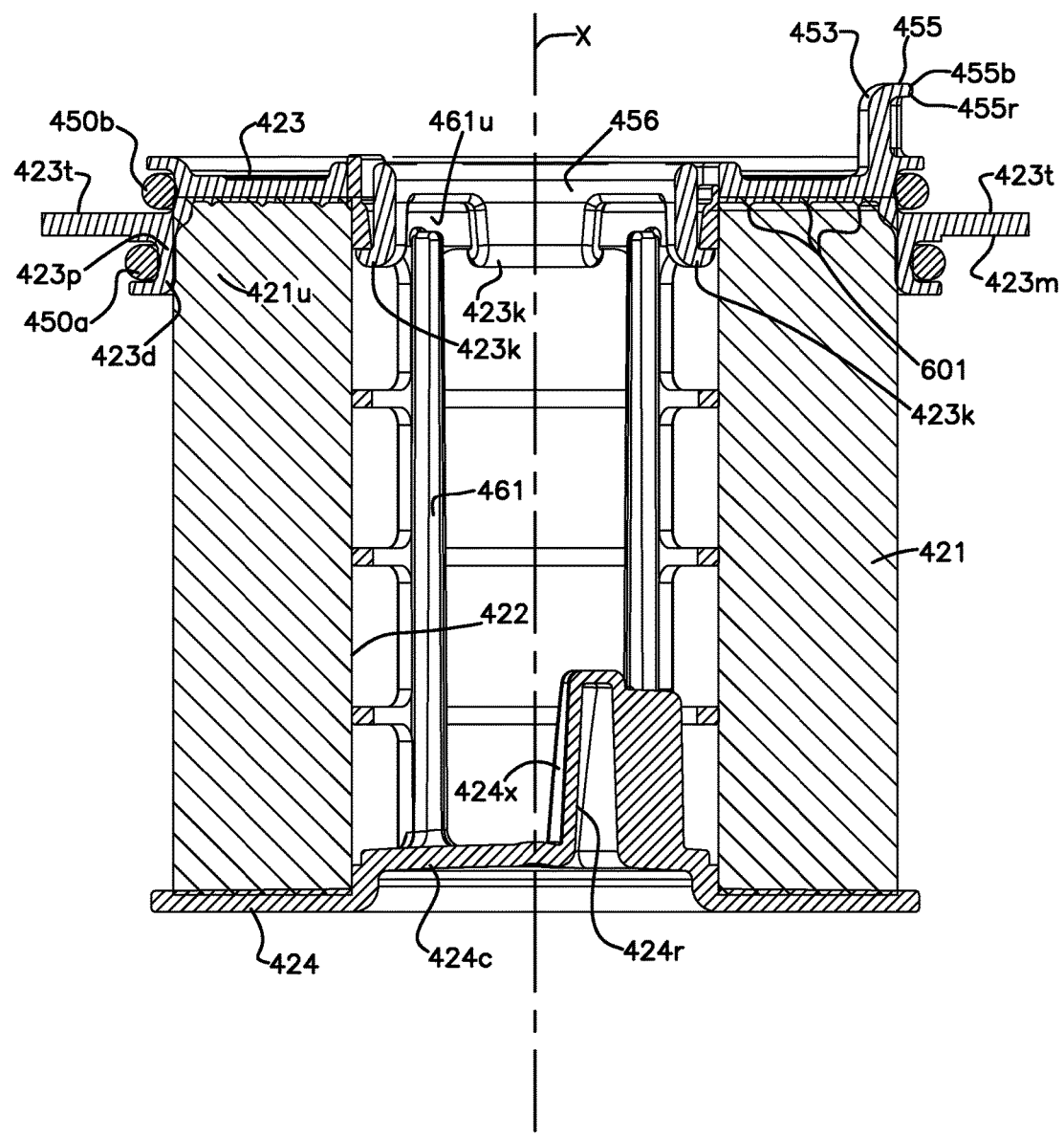
FIG. 52 is a schematic cross-sectional view taken generally along line 52-52, FIG. 51.
Figure 53:
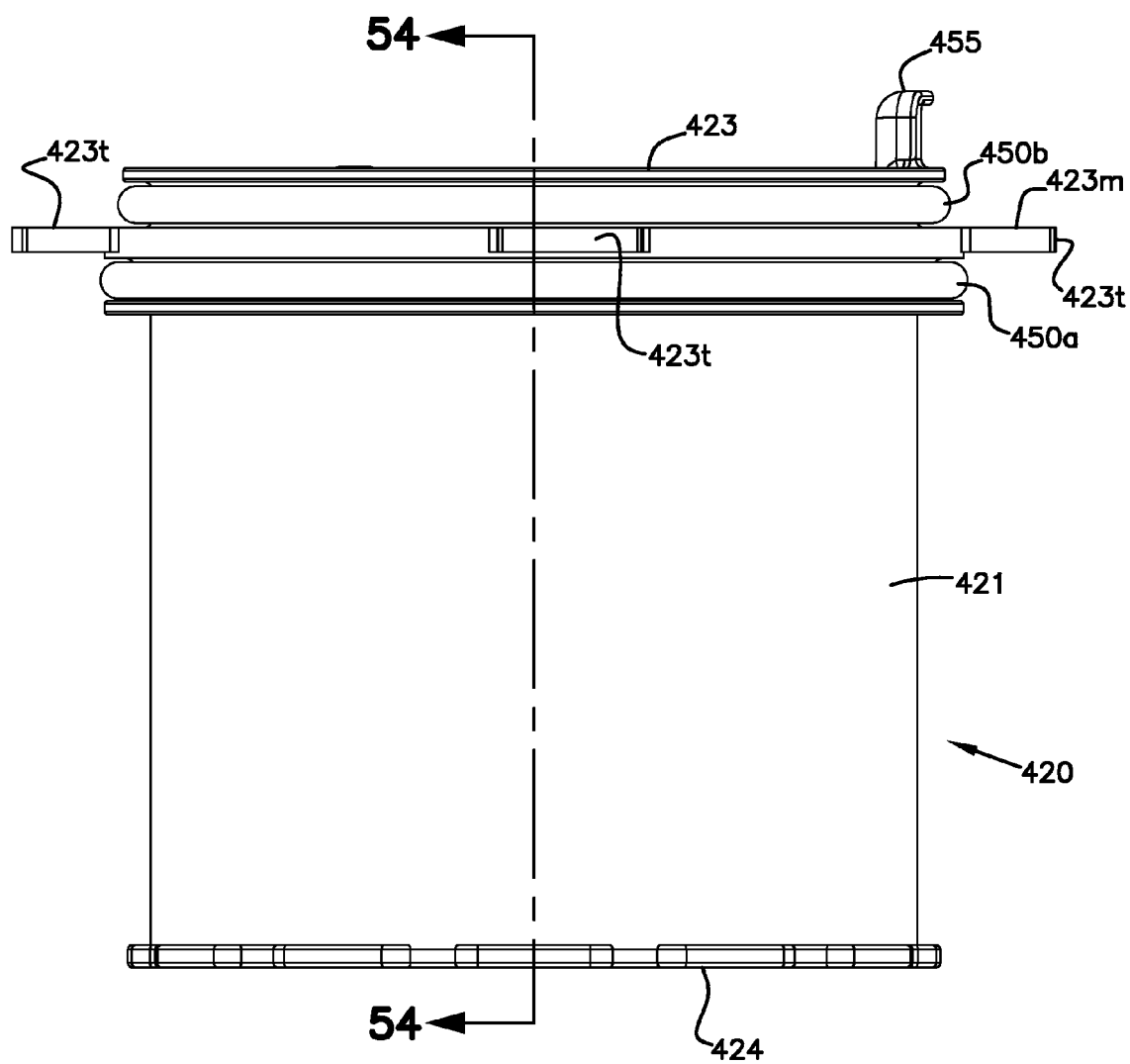
FIG. 53 is a second, schematic, side elevational view of the filter cartridge component of FIG. 49; the view of FIG. 53 being taken generally a right angle to the view of FIG. 51.

Attention is now directed to FIG. 51, a side elevational view of the cartridge 420, and to the cross-sectional view of FIG. 52. The particular cartridge 420 depicted includes a projection arrangement 453, referenced previously, projecting upwardly from central frame portion 423x of framepiece 423 in a general direction away from end piece 424 and media 421. The projection arrangement 453 comprises at least one projection 453a, and can comprise more. Typically, the projection 453a, analogously to projection 55a, extends away from the media 421 a distance of at least 5 mm, usually at least 10 mm and often at least 15 mm in total height, from an adjacent portion of central frame portion 423x. Again, such a projection arrangement 453 can be used to facilitate radial orientation of the access cover 417 relative to the cartridge 420, in housing base 416, as discussed below.

Referring to FIG. 52, for the particular cartridge 420 depicted, the projection arrangement 453 also comprises a handle arrangement 455. The handle arrangement 455 facilitates grasping of the cartridge 420 for installation in a housing base 416 and removing it therefrom. The particular handle arrangement 455 comprises at least one handle member 455b, in this instance having an upper rail 455r under which a portion of a person's hand can fit, to facilitate grasping. In the example, the handle member 455 does not include any apertures therethrough, although alternatives are possible.

Still referring to FIG. 52, for the particular cartridge 420 depicted, a portion 423d of perimeter 423p and seal member 450 is positioned surrounding an end, in the example upper end 421u of media 421. This is analogous to the previously described embodiment. Thus, the seal member 450a and a portion of perimeter 423p, indicated generally at 423d, extend axially toward end piece 424 from upper end 421u of the media 421. Typically, the amount of extension is at least 1 mm, usually at least 3 mm and often at least 5 mm and in some instances at least 7 mm, for example within the range of 1-20 mm, often 3-20 mm and in some instances 5-20 mm and in some instances 7-20 mm. This can provide advantages analogous to the arrangement of FIGS. 1-37 discussed above.

Thus, and in more general terms, the first end piece 423 includes a perimeter rim 423p having a portion 423d projecting at least 1 mm, typically at least 3 mm toward second end piece 424 while also completing surrounding the media 421. This portion 423d may project at least 5 mm and often at least 7 mm, for example, an amount within the range of 7-20 mm, inclusive, or more.

As with the embodiments previously described, and to accommodate manufacture of cartridge 420, the cartridge 420 comprises multiple components are fit together to form rigid structural framework thereof. These components can be viewed in FIG. 52, as comprising: upper end piece 423; and, cartridge central support 461. In the example depicted, the cartridge central support 461 and bottom end piece 424 can (optionally) be formed as a single integral unit, for example molded from plastic. The end piece 423 is then secured to the support 461. The typical approach is a snap-fit approach as depicted, and discussed below. However, alternatives such as sonic weld, heat weld, and/or adhesive are possible.

As with the embodiment previously described, alternate constructions can be made. For example, first end piece 423, second end piece 424 and central support 461 can be separately made and may even be put together, for example with snap-fit or other connection. However, the particular example described, involves having the support 461 and second end piece 424 integral, with the first end piece 423 separately made and secured thereto.

Also, the upper end piece 423 can (optionally) be provided with a rib arrangement to engage media, analogously to end piece 23 previously discussed. Such a rib arrangement is viewable in FIG. 52, at 601.

Figure 61:
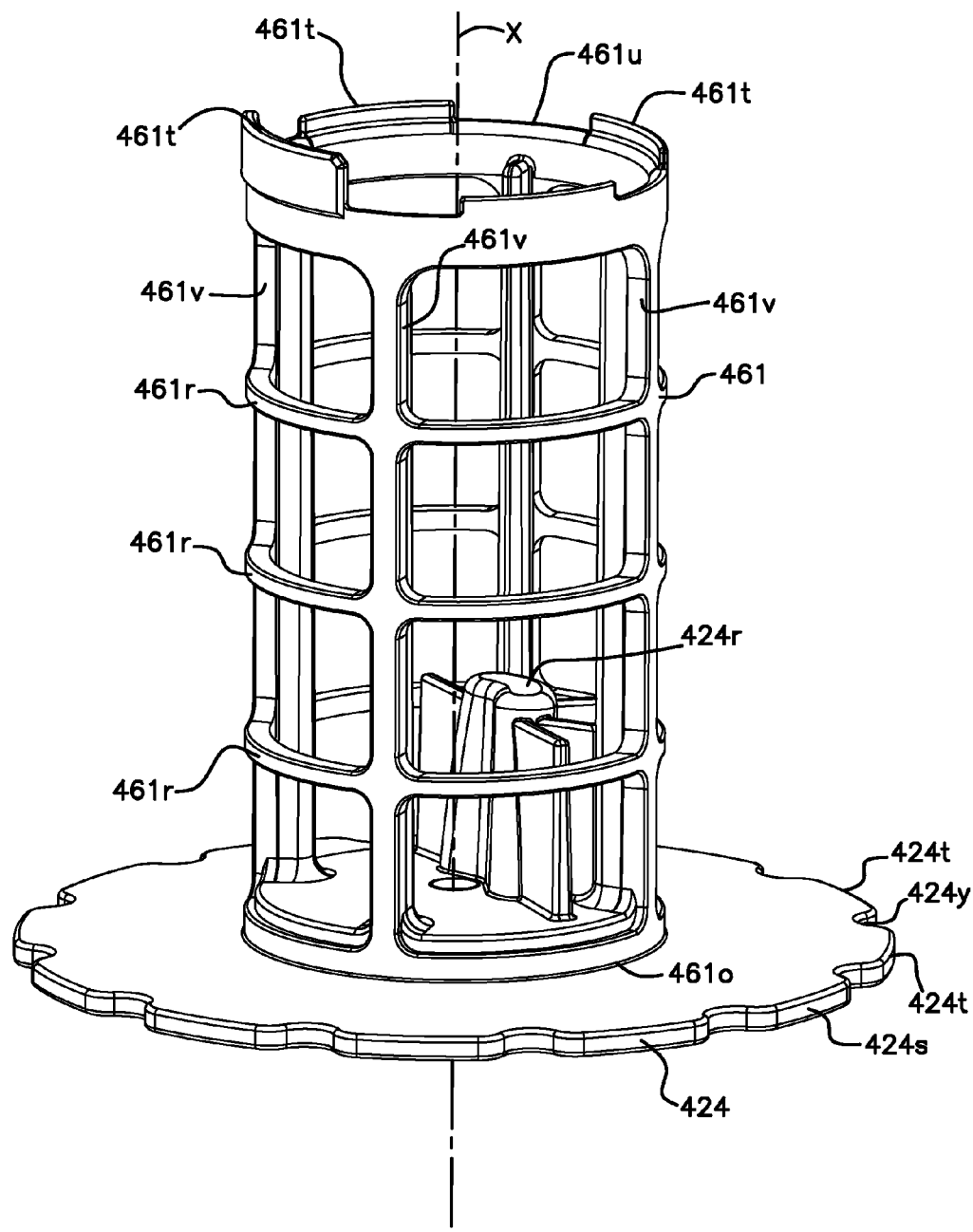
FIG. 61 is a schematic top perspective view of a support component of a filter cartridge usable in the filter cartridge of FIG. 49.

Attention is now directed to FIG. 61, in which support 461 (with end piece 424 secured thereto) is depicted in top perspective view. The support 461 comprises a plurality of vertical ribs 461v having a plurality of inter-connecting ribs 461r thereon. This forms a porous structure, for flow of gas and liquid therethrough. The support 461 has a first end 461u which, in use, is an upper end; and, a second opposite end 461o which, in use, is a lower end. The end piece 424 is secured to the lower end 461o, typically by being formed integral therewith.

Referring to FIG. 52, the end piece 423 is configured with projections 423k thereon, configured as hook projections so that when the end piece 423 is pushed against upper end 461u of support 461, hooks 423k will deflect inwardly until they can engage underneath mating portions of the end 461u. This will provide a snap-fit connection between end piece 423 and support 461. This will facilitate assembly, analogously to the assembly of cartridge 420, in that the media 421 can be wound around support 461, before the end piece 423 is put in place. To facilitate mounting between end piece 423 and support 461, the support 461, FIG. 61 is provided with tabs 461t oriented to fit apertures 423a (FIG. 49) in end piece 423.

Attention is directed back to FIG. 52 and to the bottom end piece 424. For the example depicted, the bottom end piece includes a projection 424x extending into the cartridge interior 422 and toward end piece 423. The projection 424x defines a receiver 424r that receives a projection in the housing base 416 extending therein. Receiver 424r is preferably "eccentric" i.e. positioned and/or shaped so that it can only receive the projection 444, in the housing base 416, in a single identified rotational orientation between the cartridge 420 and the housing base 416. This will be similar to the arrangement of the first embodiment discussed above.

Typically projection 424x, and also receiver 424r, extend at least 5 mm usually at least 10 mm and often more toward end piece 423 when measured from end 421b of the media 421. Similar dimensions (and relative dimensions) the previously described embodiment can be used.

Still referring to FIG. 52, the particular end piece 424 has a closed central portion 424c in extension across open interior 422. By this it is meant that there is no aperture through the end piece 424r in the region surrounded by the media 421. Alternatives are possible.

It is noted that the cartridge 420 can (optionally) be provided with a bottom drain arrangement of the type generally discussed in US publication 2010/0031940 (U.S. Ser. No. 12/084,164) incorporated herein by reference, and as discussed above in connection with cartridge 20. Referring to FIG. 61, bottom end piece 424 is provided with an outer perimeter 424s, comprising a plurality of spaced perimeter petals or perimeter projections 424t with perimeter recesses 424y therebetween. Some or all of the recesses 424y (i.e. selected recesses) can be configured sufficiently large to project underneath the media 421, FIG. 54. When this is the case, liquid can drain directly downwardly from the media 421 through the recesses 424y, analogously to US 2010/0031940. If desired, an aperture arrangement can be placed in extension through end piece 424 (underneath the media 421) to facilitate the drainage.

Attention is now directed back to FIG. 39, an in particular to the service cover or access cover 417. The access cover 417 can include many features analogous to access cover 17, previously discussed. Thus, the access cover 417 comprises: outer perimeter mounting ring 490; central cover section 491; and (optionally) evacuator valve or vent valve arrangement 414.

Although alternatives are possible, for the particular cover assembly 417 depicted, the mounting ring 490 is rotatable relative to the cover section 491 so that the mounting ring 490 can be rotated for securing the cover assembly 417 onto the housing base 416, without rotating cover section 491.

In FIG. 60, a top perspective view of the mounting ring 490 is depicted. It can be seen that the mounting ring 490 includes a perimeter ring 490r having a plurality of radially inwardly directed lugs, projections or stops 490s. These are sized and located so that they can be rotated to a location underneath projections 436, FIG. 55a, on the housing base 416 to secure the access cover 417 in position. This engagement is shown in the cross-sections of FIGS. 42-45.

Figure 43:
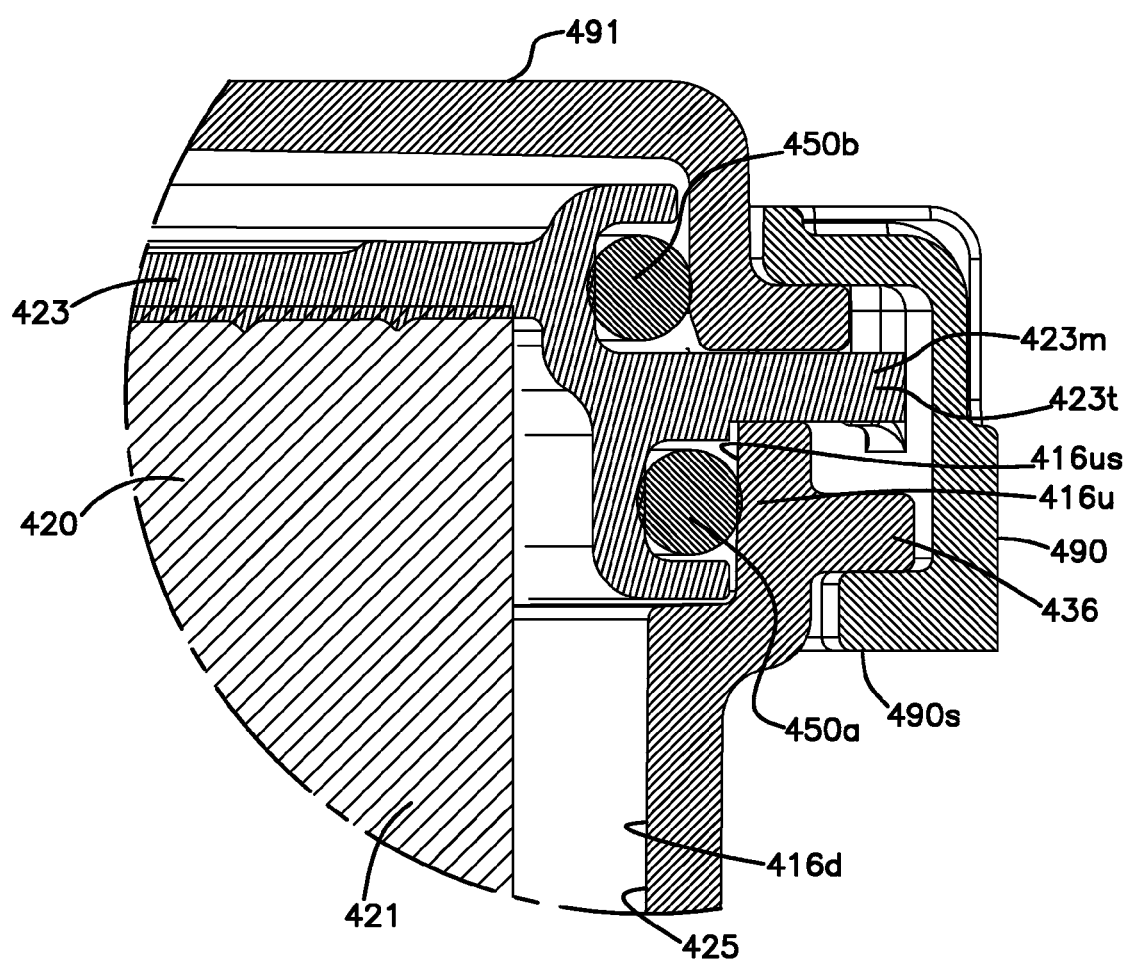
FIG. 43 is a schematic enlarged fragmentary view of an identified portion of FIG. 41.

Still referring to FIG. 60, the mounting ring 490 is generally configured with a central aperture 492 therethrough, allowing the ring 490 to be positioned over, and slidably surrounding, central section 491, FIGS. 42 and 43.

Referring again to FIG. 60, the outer perimeter 493 of the perimeter ring 490, FIG. 60 is provided with spaced grips 494 to facilitate gripping and rotating.

Figures 63, 64:
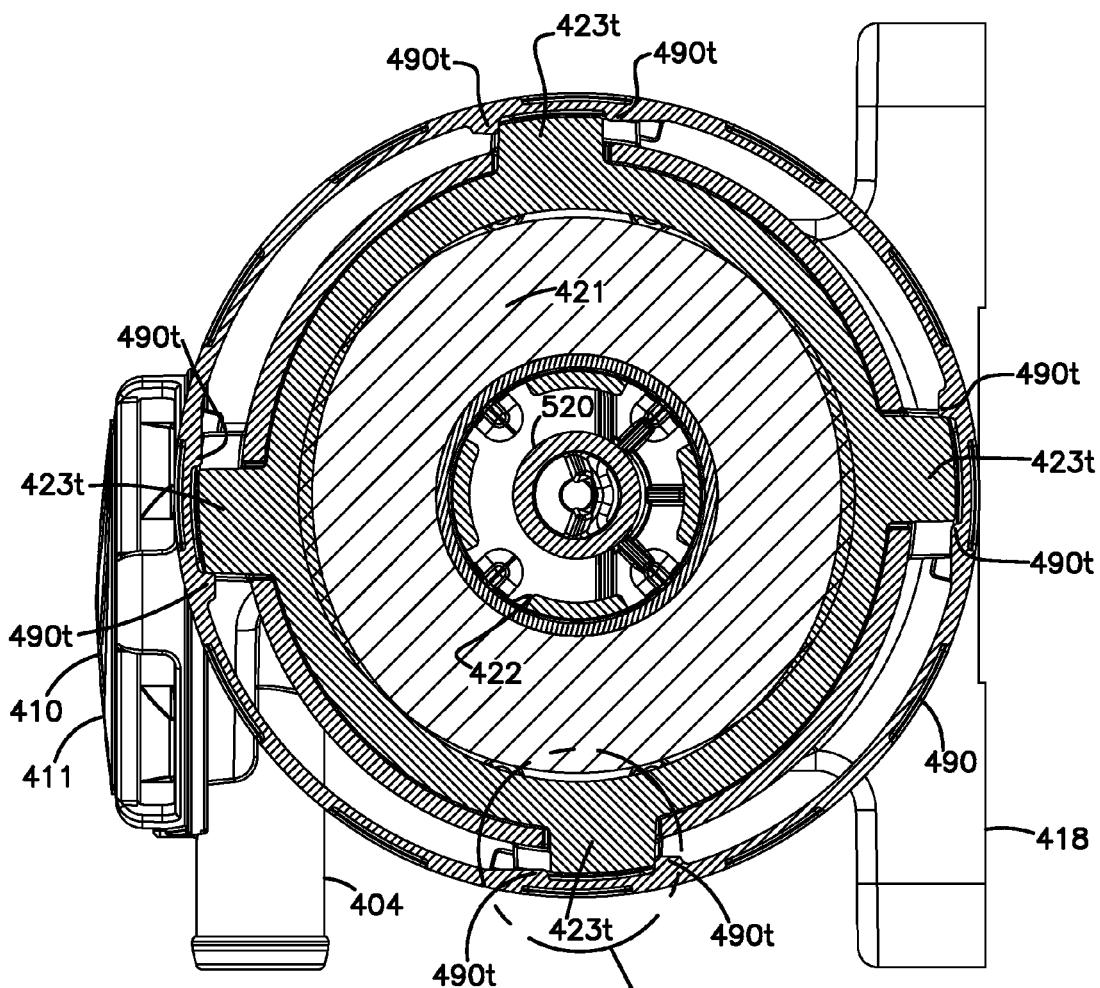
FIG. 63 is a schematic cross-sectional view taken generally along line 63-63, FIG. 40.
FIG. 64 is a schematic, enlarged, fragmentary view of an identified portion of FIG. 63.
Figure 64:
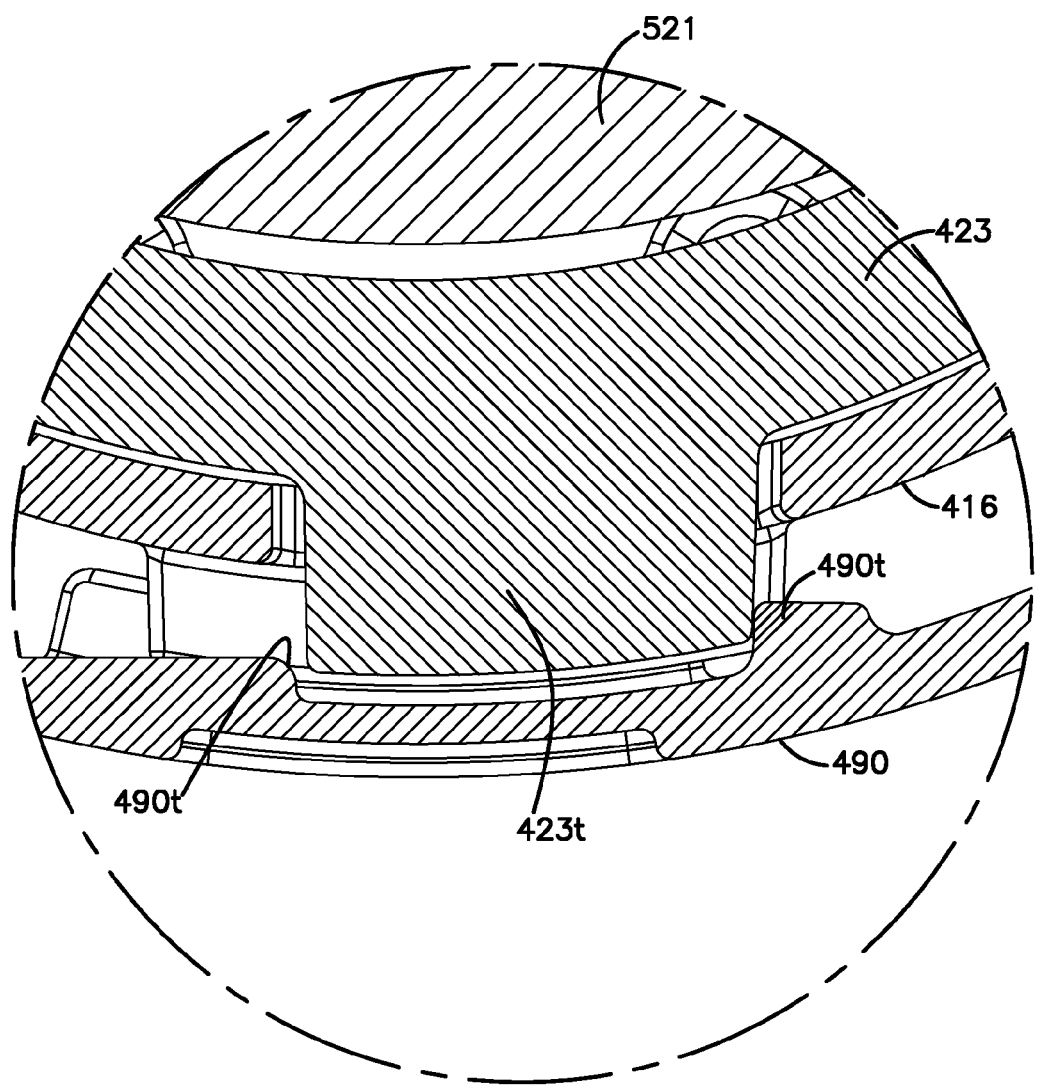

Still referring to FIG. 60, attention is directed to projection arrangement 490t positioned along an interior of ring 490. The projection arrangement 490t is positioned to provide a snug, anti-rotation, interaction with the spaced tabs 423t on the filter cartridge, when the ring 490 is rotated to a locked position. This interaction is shown in FIGS. 63 and 64, which are cross-sectional views through the related portion of the assembly 401. The interaction is sufficient to inhibit undesired rotation, but not so great that it cannot be overcome by hand force.

The cover section 491, FIG. 55 analogously to outer section 91, can be provided with radial interference portion shown at 501, so that once ring 490 is pressed over cover section 491, it tends not to separate unless forced. Some interference can be used to affect this.

Referring back to FIG. 55, attention is directed to vent valve assembly 414. Vent valve assembly 414 is shown in exploded view in FIG. 55, over vent valve aperture 415 through cover section 491. Vent valve assembly 414 comprises valve member 507 seated, when the valve arrangement 414 is closed, over access aperture 505. The valve member 507 is positioned on and supported by disc 508. The support disc is biased to maintain the valve member 507 in the closed position (until overcome by internal pressure within an assembly 401) by biasing arrangement 509, in the example depicted comprising a spring. The assembly 414 includes a cover 414c.

In FIG. 59, bottom perspective view of cover section 491 is depicted. It can be seen that the cover section 491 includes an upwardly projecting receiver 491r in an inner surface thereof, positioned to receive projecting therein projection arrangement 453 (i.e. handle 455) FIG. 52, on the cartridge 420, in the example shown, only when the cover section 491 is properly rotationally aligned with respect to the cartridge 420. Thus, the assembly 401 includes a "access cover-to-cartridge" or "cartridge-to-access cover" rotational (indexing) alignment arrangement, in this instance in part comprising a projection/receiver arrangement allowing for only one rotational orientation between the two.

Rotational alignment among the: filter cartridge 420 and housing base 416; the filter cartridge 420 and access cover 417; and, the access cover 417 and housing base 416 can be of significance in arrangements including selected ones of the features described herein. For each of these, a projection/receiver arrangement or a plurality of projection/receiver arrangements can be used to accomplish the desired result.

Referring first to filter cartridge rotational orientation and alignment, attention is directed to the projection/receiver arrangement identified by the projection 444 in the housing base, and the receiver 424r in the cartridge. These are shown, for example, in FIG. 44. Since the projection 444 extends upwardly into the cartridge 420, and is eccentrically positioned with respect to the central axis X, it can only be received in receiver 424r, which is also eccentrically positioned with respect to the central axis X, if the cartridge 420 is rotated to a proper orientation for alignment. In the example depicted, only one rotational alignment between the cartridge 420 and the housing base 416, around the central axis X, will allow for the cartridge 420 to be lowered with the receiver 424r receiving the projection 444. (Alternatives are possible). Of course, the receiver 424r and projection 444 can also be shaped so that only one alignment is possible, even if centrally positioned.

It is also noted that additional rotational alignment is provided by the spaced receivers 424y, FIG. 61 being sized, spaced and located so that selected ones of them are received projection 416k in the housing base 416, FIG. 57, projecting therein as the cartridge is lowered. This helps stabilize the cartridge. It also helps ensure that the cartridge 420 is the proper one for the assembly of concern.

Rotational alignment between the cartridge 420 and the access cover 417 is provided by the access cover 417 having receiver 491r, FIG. 59, therein oriented to receive projecting therein, projection 453 (handle 455) on the cartridge 420, FIG. 49. This interaction is shown, for example, in FIGS. 44 and 45. It operates as a cartridge-to-housing access cover rotational (indexing) alignment arrangement.

It is noted that there is an additional rotational alignment provided by the non-circular seal member 450a aligning with its seal surface 416us, FIG. 55a, as the cartridge 420 is lowered. Here, the mating oval shape to the tube, allows for limited possible orientations.

With respect to the access cover-to-housing base alignment, attention is directed back to FIG. 59, and in particular to projection 520 which extends downwardly from inlet 403. The projection 520 includes lower extension 521 and is sized and oriented so that the access cover 417 can only be fully lowered, if the projection 521 is appropriately oriented relative to the projection arrangement 444 in the housing base 416. Typically, lower extension or projection 521, then, will extend to a location below a top of projection 444, typically at least 3 mm lower, usually at least 5 mm lower.

It is noted that portions of the projection 520 can be provided (optionally) with an inertial impactor arrangement analogous to the arrangement of FIGS. 1-37 discussed above.

Figure 62:
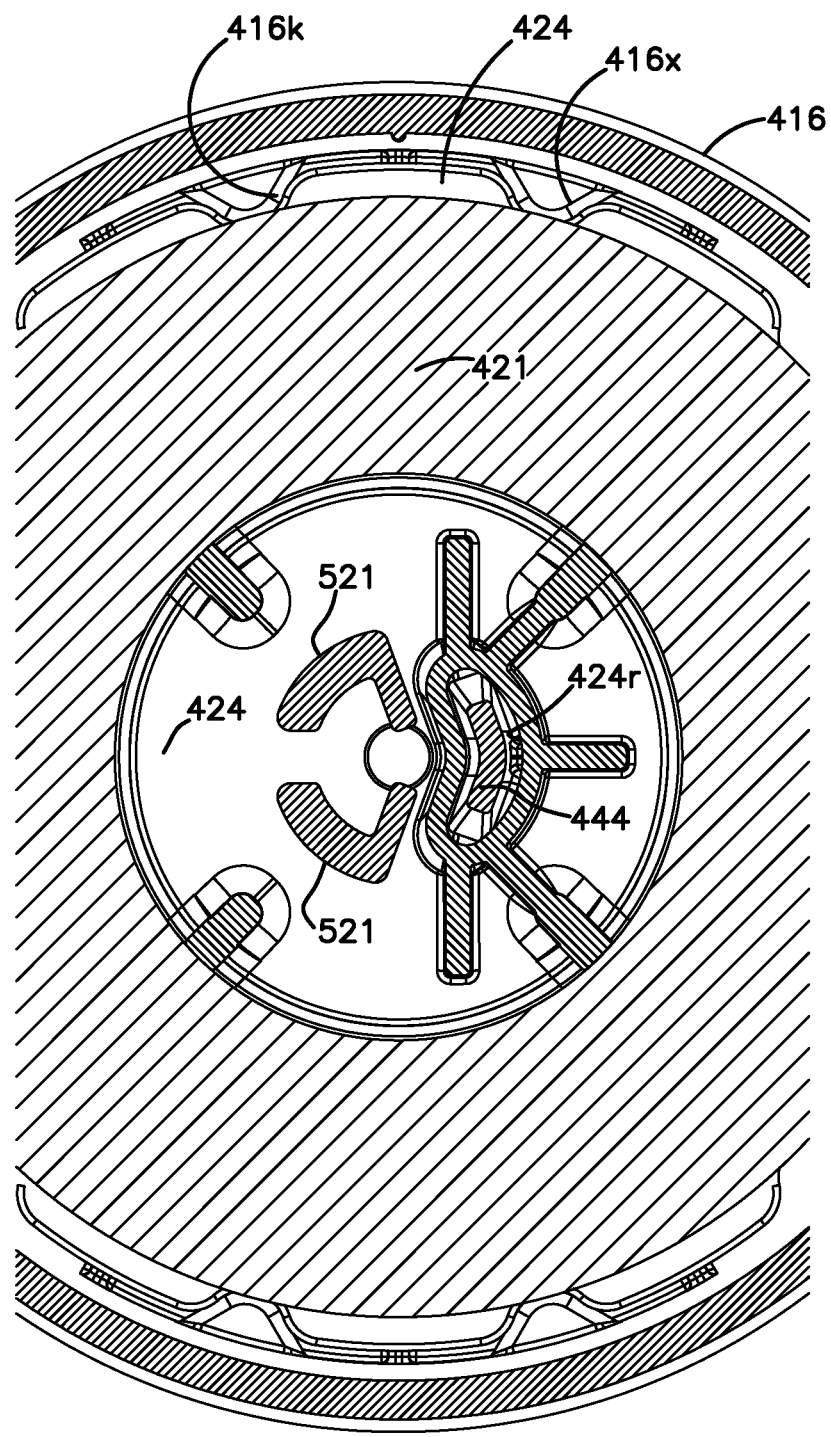
FIG. 62 is a schematic, enlarged, fragmentary cross-sectional view of a portion of the assembly of FIG. 39.

In FIG. 62, alignment among the various described features in the cartridge housing base and tube 520 is shown in cross-section.

The assembly 401 includes a vertical spacer arrangement in general accord with U.S. Ser. No. 61/503,063 and U.S. Ser. No. 61/664,340 incorporated herein by reference. The vertical spacer arrangement can be understood by reference to FIGS. 42 and 43. In particular, spaced projections 425t, discussed in connection with the cartridge 420, FIG. 49, can be seen to project radially outwardly in a direction away from central axis X a distance greater than an amount of extension of the seal arrangement 450, i.e. the individual seal members 450a, 450b. Indeed, the spacers 423t extend sufficiently far, and at an appropriate location, to be positioned between a portion of cover member 491 and upper end 416e of housing bottom 416. Unless a cartridge 420 is positioned, which includes such a spacer arrangement, typically access cover 491 will not be spaced sufficiently far from the end 416e of the sidewall 416, for the locking ring 490 to appropriately tighten when rotated. Typically, to account for this, the spacer arrangement comprising 423t will have a thickness, i.e. result in a vertical spacing, at least 0.25 mm, typically at least 0.5 mm.

VIII. General Comments and Observations

According to the present disclosure, systems, assemblies, components, features and methods are described, usable in applications involving crankcase ventilation filters. There is no specific requirement that all of the specific features described herein be applied, in order to obtain some benefit according to the present disclosure. Selected features, methods, techniques and components can be modified from the specifics shown, and can be applied without all of the features, methods and components, etc. described.

In accord with selected principles of the present disclosure, filter cartridges for use in gas liquid separation is provided. A filter cartridge, using selected ones of the features characterized herein, may comprise an extension of filter media surrounding and defining an open filter interior; and, first and second end pieces. The media is positioned between the first and second end pieces. The first end piece has a central flow aperture therethrough in gas flow communication with the open filter interior. The first end piece also includes a perimeter rim having a portion projecting at least 3 mm generally axially toward the second end piece while also completely surrounding the media.

In the filter cartridge characterized, the second end piece is has a (typically closed) external receiver therein projecting into the open filter interior and toward the first end piece, typically a distance of at least 3 mm, often at least 5 mm, preferably at least 7 mm (and often more) from an end of the media adjacent the second end piece.

A housing seal arrangement is positioned on the perimeter rim at a location with at least a portion of the housing seal arrangement completely surrounding the media. In an example arrangement depicted, the housing seal arrangement includes an end directed away from the first end piece axially, and generally in the direction of the second end piece, which forms an axially directed seal with a portion of a housing in use. The housing seal arrangement can be molded-in-place on the first end piece, or can be removably mounted thereon.

In alternate example arrangement, the housing seal arrangement is configured to seal radially against a housing component in use. An example housing seal arrangement in this embodiment is depicted, which includes two housing seal members, spaced axially away from one another along a central axis of the cartridge. However, in some alternate configurations, only a single radially directed seal member can be used.

In example arrangements depicted, the (closed) external receiver in the second end cap comprises an eccentrically positioned receiver pocket or receiver. Typically, the closed external receiver extends into the open filter interior and toward a first end piece a distance of at least 10 mm from an end of the media adjacent the second end piece, usually at least 15 mm in this direction, and often at least 18 mm in this direction.

Typically and preferably, the closed external receiver in the second end piece is a closed receiver having a single eccentrically positioned receiver pocket therein, defined by a single projection tip projecting toward the first end piece.

Typically the first end piece includes a perimeter rim having a portion projecting at least 3 mm toward the second end piece while completely surrounding the media. Typically, the amount of projection is at least 5 mm and often at least 7 mm.

The media can be configured in a variety of manners. Example arrangements are described in which the media comprises a multi-layer coil of media. That is, the media would comprise a layer of material coiled to form a media pack. This coiling, for example, can be around a central cartridge support.

In an arrangement described, the first end piece has an inner surface directed toward the media, the inner surface including an optional rib arrangement thereon that presses against an end of the media. The rib arrangement can be one or more ribs, and typically includes at least one continuous rib in extension around the cartridge central axis. When a plurality of ribs are used, typically they are oriented concentrically, each being continuous in extension around the cartridge central axis. Typically, there is at least one rib, usually at least two, and in an example described, at least three. The optional rib arrangement can be used with either embodiment described.

In an example described the central flow aperture in the first end piece is centered on a cartridge central axis, although alternatives are possible.

In an example arrangement described, the first end piece includes a receiver aperture arrangement therethrough, spaced from the central flow aperture. The receiver aperture arrangement, in an example described, comprises a plurality of receiver apertures spaced from the central flow aperture and oriented to receive projections on a central cartridge support.

In examples described, the cartridge includes a preform comprising a second end piece and central cartridge support; with the first end piece being secured onto the preform, for example by snap-fit, heat weld, sonic weld or adhesive.

In an example arrangement characterized, the first end piece has an inner surface and a first member of a (first) cartridge projection/receiver arrangement thereon; the extension of media surrounds a central cartridge support; and, the central cartridge support includes a first end remote from the second end piece. The first end of the central cartridge support, from the first end piece, includes a second member of the first cartridge projection/receiver thereon.

In an example arrangement, the first cartridge projection/receiver arrangement is a rotational alignment indexing arrangement configured such that the first end piece can only fully engage the first end of the central cartridge support, with an inner surface of the filter end piece directed toward the media, in one (or more) selected defined rotational orientations relative to the cartridge central axis and the central cartridge support. That is, the first end piece cannot be attached to the central cartridge support in just any rotational orientation, but only in selected defined orientations. In an example shown, the first cartridge projection/receiver arrangement is configured so that the first end piece can only fully engage the central cartridge support in a single rotational arrangement.

In an assembly described, the first member of the first cartridge projection/receiver arrangement is a receiver arrangement on the first end piece; and, the second member of the first cartridge projection/receiver arrangement is a projection arrangement on the central cartridge support. A specific example involves a plurality of receiver apertures through the first end piece, and a plurality of projections on the central cartridge support, configured to engage the apertures. A particular arrangement in which one of the receiver apertures has a greatest aperture width, and one of the plurality of projections on the central cartridge support is sufficiently wide so that it can only engage the receiver aperture of greatest width provides for rotational orientation. In a typical arrangement, the second member of the projection/receiver arrangement comprises a plurality of flexible members.

Typically, the receiver apertures in the first end piece remain at least partly open, even when fitted with the flexible hook members for air flow communication with the open filter interior in part being through the receiver apertures.

Cartridges are described which preferably include an optional media axial overlap drain arrangement therein. An example such arrangement is described, in which the second end piece includes an outer perimeter with a plurality of recesses therein that extend to a location underneath the media.

An example cartridge is described in which the first end piece includes an outer surface with a projection arrangement projecting therefrom in a direction away from the media. The projection arrangement typically comprises at least one projection member that projects to a location at least 5 mm from adjacent portions of the first end piece in a direction away from the media, typically projecting at least 10 mm in this manner.

In an example cartridge described, the projection arrangement comprises at least two projection members, each of which project at least 5 mm, typically at least 10 mm, from adjacent portions of the first end piece.

In an example depicted, the projection arrangement comprises two radially spaced projection members that are radially asymmetrically spaced relative to the cartridge central axis. The one or two projection members can comprise handle member(s). A preferred handle member definition is one in which each handle member has an axially directed portion and a radially outwardly directed lip or rail to facilitate handling.

Typically, each handle member (is more than one) is solid, i.e. it has no aperture therethrough, and each handle member (or projection member) is arcuate. In an example, the one or more handle members extend over a radial arc within the range of 50°-150°, inclusive, around the cartridge central axis, although alternatives are possible.

Typically, the housing seal arrangement is an axially directed seal having a lower seal end directed away from the first end piece and toward the second end piece. Again, the axially directed seal can be molded-in-place on the first end piece.

Also, according to the descriptions herein, the filter cartridge can be defined with selected ones of the characterized features and not include all of the features depicted and described herein. In an example, the filter cartridge includes an extension of filter media surrounding and defining an open filter interior and first and second end pieces, with the media positioned between the end pieces. The second end piece in such an assembly could, for example, be a closed end piece having a closed external receiver therein, projecting into the open filter interior and toward the first end piece. The cartridge would include a central cartridge support around which the media is positioned and to which the first end piece is attached, for example by snap-fit, heat weld, sonic weld, or adhesive. Of course, the filter cartridge may include additional features as characterized herein.

According to an additional definition provided herein, a filter cartridge may comprise an extension of media surrounding and defining an open filter interior and first and second end pieces, with the media therebetween. The first end piece would include an outer surface with a projection arrangement projecting therefrom in a direction away from the media, the projection arrangement being generally as characterized herein above, and may comprise, for example, a first (and in some instances a second) projection member which can operate as a handle member. Other variations can be as characterized herein above.

Also, according to the present disclosure, crankcase ventilation filter assemblies are described. The assemblies would typically include a housing defining an housing interior including gas flow inlet arrangement; gas flow outlet arrangement; and, a liquid drain outlet arrangement. A filter cartridge in accord with descriptions provided herein, would be operably and removably positioned in the housing interior.

Typically, the housing includes a housing base and a removable service cover, the housing base including a liquid drain arrangement in the service cover and including a gas flow inlet arrangement therein. The gas flow inlet arrangement can comprise a gas flow inlet tube including an inner tube section projecting toward the housing base and into the open filter interior by extension through a central flow aperture of the first end piece of a filter cartridge.

An arrangement is described in which the inner tube section includes an inertial impactor plate extending thereacross, and gas flow outlet passageway through the inner tube section. Also, an arrangement is depicted in which the inner tube section includes a lower extension that projects to a location within the housing lower than a top end of a projection in the cartridge defining the closed receiver access in the filter cartridge; typically to a location at least 3 mm lower, usually at least 5 mm lower, and sometimes at least 10 mm lower. Indeed, the lower end of the inlet tube can include an outer perimeter having a perimeter (for example recess) therein defined to mate with, i.e. to receive projecting therethrough, the receiver projection extending upwardly from a lower end of the filter cartridge.

Typically, the arrangement is such that the filter cartridge includes one or more of the features characterized herein above.

Also, in accord with the present disclosure, a method of assembly of a filter cartridge for a crankcase ventilation filter assembly is described. The method generally comprises steps of positioning media on a central cartridge support and around a central interior and although an end piece to the central cartridge support in overlap with an end of the media. The step of positioning of the media can comprise coiling the media on a central cartridge support.

The method of assembly may include providing as the first end piece, an end piece having one or more the various features characterized herein above. The engagement may involve a snap-fit, such as a flexible hook/receiver arrangement also described herein. The engagement can be by alternate means.

Herein, two example embodiments are described in detail, the embodiment of FIGS. 1-37 and the embodiment of FIGS. 39-64. As indicated herein, features of each can be implemented in the other, to advantage.

Again, there is no specific requirement that a method, assembly, component, feature or technique involve all of the detail and advantageous characteristics described with respect to the preferred embodiment depicted, in order to obtain some advantage according to the present disclosure.

What is claimed:

1. A filter cartridge for use in gas/liquid separation; the filter cartridge comprising:
    (a) an extension of filter media surrounding and defining an open filter interior;
    (b) first and second end pieces;
        (i) the media being positioned between the first and second end pieces;
        (ii) the first end piece having a central flow aperture therethrough in gas flow communication with the open filter interior;
        (iii) the first end piece includes a perimeter rim having a portion projecting at least 3 mm toward the second end piece while completely surrounding the media; and,
        (iv) the second end piece has a closed external receiver therein projecting into the open filter and toward the first end piece a distance of at least 7 mm from an end of the media adjacent the second end piece;
        (v) the external receiver in the second end cap comprising an eccentrically positioned receiver pocket defined by a projection tip projecting into the open filter interior and toward the first end piece, a distance of at least 10 mm from an end of the media adjacent the second end piece; and,
    (c) a housing seal arrangement positioned on the first end piece at a location with at least a portion of the housing seal arrangement completely surrounding the media.

2. A filter cartridge according to claim 1 wherein:
    (a) the housing seal arrangement includes: a first seal member located at a position completely surrounding the media; and, a second seal member.

3. A filter arrangement according to claim 2 wherein:
    (a) the second seal member is spaced from the first seal member, in a direction away from the second end piece.

4. A filter cartridge according to claim 1 wherein:
    (a) the first end piece has an inner surface directed toward the media;
        (i) the inner surface including a rib arrangement thereon; the rib arrangement pressing against an end of the media.

5. A filter cartridge according to claim 1 wherein:
    (a) the first end piece includes a receiver aperture arrangement therethrough spaced from the central flow aperture.

6. A filter cartridge according to claim 5 wherein:
    (a) the receiver aperture arrangement comprises a plurality of receiver apertures spaced from the central flow aperture.

7. A filter cartridge according to claim 1 wherein:
    (a) the extension of filter media surrounds a central cartridge support.

8. A filter cartridge according to claim 7 wherein:
    (a) the cartridge includes a first preform comprising the second end piece and a central cartridge support; and,
    (b) the first end piece is part of a second preform secured onto the first preform after media is positioned on the first preform.

9. A filter cartridge according to claim 1 wherein:
    (a) the first end piece has: an inner surface; and, a first member of a first cartridge projection/receiver arrangement;
    (b) the extension of filter media surrounds a central cartridge support; and,
    (c) the central cartridge support includes a first end remote from the second end piece;
        (i) the first end of the central cartridge support having a second member of the first cartridge projection/receiver arrangement thereon;
    (d) the first cartridge projection/receiver arrangement also being a rotational indexing arrangement configured such that the first end piece can only fully engage the first end of the central cartridge support, with an inner surface of the filter end piece directed toward the media, in one or more selected defined rotational orientations relative to a cartridge central axis and the central cartridge support.

10. An air filter according to claim 9 wherein:
    (a) the first cartridge projection/receiver arrangement is configured so that the first end piece can only fully engage the central cartridge support in a single rotational orientation.

11. A filter cartridge according to claim 9 wherein:
    (a) the first member of the first cartridge projection/receiver arrangement comprises a receiver arrangement; and,
    (b) the second member of the first cartridge projection/receiver arrangement comprises a projection arrangement.

12. A filter cartridge according to claim 9 wherein:
    (a) the first member of the first cartridge projection/receiver arrangement comprises a plurality of receiver apertures in the first end piece;
        (i) one of the receiver apertures having a greatest aperture width; and,
    (b) the second member of the first cartridge projection/receiver arrangement comprises a plurality of projections one of which has a width dimension too large to engage any of the plurality of receiver apertures in the first member other than the one of greatest aperture width, to provide the rotational indexing arrangement.

13. A filter cartridge according to claim 9 wherein:
(a) the first end piece is snap-fit onto the central cartridge support; and,
(b) a member of the first cartridge projection/receiver arrangement comprises a plurality of receiver apertures that remain at least partly open, in communication with the open filter interior, after the first end piece is snap-fit on the central cartridge support.

14. A filter cartridge according to claim 1 wherein:
(a) the first end piece includes an outer surface with a projection arrangement projecting therefrom in a direction away from the media.

15. A filter cartridge according to claim 14 wherein:
(a) the projection arrangement comprises at least one projection member that projects to a location a distance of at least 10 mm from adjacent portion of the first end piece, in a direction away from the media.

16. A filter cartridge according to claim 15 wherein:
(a) the projection member comprises a handle member.

17. A filter cartridge according to claim 16 wherein:
(a) the handle member is a projection having an axially directed portion and a radially outwardly directed end lip.

18. A filter cartridge according to claim 15 wherein:
(a) the at least one projection member is arcuate and extends over a radial arc.

19. A filter cartridge according to claim 1 wherein:
(a) the housing seal arrangement is an axially directed seal having a lower seal end directed away from the first end piece and toward the second end piece.

20. A filter cartridge according to claim 1 wherein:
(a) the housing seal arrangement includes a first radially directed seal member.

21. A filter cartridge according to claim 20 wherein:
(a) the first radially directed seal member defines a non-circular outer perimeter.

22. A filter cartridge according to claim 20 wherein:
(a) the housing seal arrangement includes a second radially directed seal member.

23. A filter cartridge according to claim 1 wherein:
(a) the cartridge includes a vertical spacer arrangement projecting radially outwardly beyond a furthest radial outward extension of first and second seal members.

24. A crankcase ventilation filter assembly comprising:
(a) a housing defining a housing interior and including: a gas flow inlet arrangement; a gas flow outlet arrangement; and a liquid drain outlet arrangement; and,
(b) a filter cartridge in accord with claim 1 operably and removably positioned in the housing interior.

25. A filter cartridge for use in gas/liquid separation; the filter cartridge comprising:
(a) an extension of filter media surrounding and defining an open filter interior;
(b) first and second end pieces;
  (i) the media being positioned between the first and second end pieces;
  (ii) the first end piece having a central flow aperture therethrough in gas flow communication with the open filter interior;
  (iii) the first end piece includes a perimeter rim having a portion projecting at least 3 mm toward the second end piece while completely surrounding the media;
  (iv) the first end piece having an inner surface directed toward the media;
    (A) the inner surface including a rib arrangement thereon; the rib arrangement pressing against an end of the media; and,
  (v) the second end piece having a closed external receiver therein projecting into the open filter and toward the first end piece a distance of at least 7 mm from an end of the media adjacent the second end piece; and,
(c) a housing seal arrangement positioned on the first end piece at a location with at least a portion of the housing seal arrangement completely surrounding the media.

26. A filter cartridge for use in gas/liquid separation; the filter cartridge comprising:
(a) an extension of filter media surrounding and defining an open filter interior;
(b) first and second end pieces;
  (i) the media being positioned between the first and second end pieces;
  (ii) the first end piece having a central flow aperture therethrough in gas flow communication with the open filter interior;
  (iii) the first end piece includes a perimeter rim having a portion projecting at least 3 mm toward the second end piece while completely surrounding the media;
  (iv) the first end piece includes a receiver aperture arrangement therethrough spaced from the central flow aperture; the receiver aperture arrangement comprising a plurality of receiver apertures spaced from the central flow aperture; and,
  (v) the second end piece has a closed external receiver therein projecting into the open filter and toward the first end piece a distance of at least 7 mm from an end of the media adjacent the second end piece; and,
(c) a housing seal arrangement positioned on the first end piece at a location with at least a portion of the housing seal arrangement completely surrounding the media.

27. A filter cartridge for use in gas/liquid separation; the filter cartridge comprising:
(a) an extension of filter media surrounding and defining an open filter interior;
(b) first and second end pieces and a central cartridge support;
  (i) the media being positioned between the first and second end pieces; the media comprising an extension of filter media surrounding the central cartridge support; and,
  (ii) the first end piece having a central flow aperture therethrough in gas flow communication with the open filter interior; and, the first end piece having: an inner surface; and, a first member of a first cartridge projection/receiver arrangement;
  (iii) the first end piece including a perimeter rim having a portion projecting at least 3 mm toward the second end piece while completely surrounding the media; and,
  (iv) the second end piece having a closed external receiver therein projecting into the open filter and toward the first end piece a distance of at least 7 mm from an end of the media adjacent the second end piece;
  (iv) the central cartridge support including a first end remote from the second end piece;
    (A) the first end of the central cartridge support having a second member of the first cartridge projection/receiver arrangement thereon; and,
    (B) the first cartridge projection/receiver arrangement also being a rotational indexing arrangement configured such that the first end piece can only fully engage the first end of the central cartridge support, with an inner surface of the filter end piece directed toward the media, in one or more selected defined rotational orientations relative to a cartridge central axis and the central cartridge support; and,
(c) a housing seal arrangement positioned on the first end piece at a location with at least a portion of the housing seal arrangement completely surrounding the media.

28. An air filter according to claim 27 wherein:
(a) the first cartridge projection/receiver arrangement is configured so that the first end piece can only fully engage the central cartridge support in a single rotational orientation.

29. A filter cartridge according to claim 27 wherein:
(a) the first member of the first cartridge projection/receiver arrangement comprises a receiver arrangement; and,
(b) the second member of the first cartridge projection/receiver arrangement comprises a projection arrangement.

30. A filter cartridge according to claim 27 wherein:
(a) the first member of the first cartridge projection/receiver arrangement comprises a plurality of receiver apertures in the first end piece;
   (i) one of the receiver apertures having a greatest aperture width; and,
(b) the second member of the first cartridge projection/receiver arrangement comprises a plurality of projections one of which has a width dimension too large to engage any of the plurality of receiver apertures in the first member other than the one of greatest aperture width, to provide the rotational indexing arrangement.

31. A filter cartridge according to claim 27 wherein:
(a) the first end piece is snap-fit onto the central cartridge support; and,
(b) a member of the first cartridge projection/receiver arrangement comprises a plurality of receiver apertures that remain at least partly open, in communication with the open filter interior, after the first end piece is snap-fit on the central cartridge support.

32. A filter cartridge for use in gas/liquid separation; the filter cartridge comprising:
(a) an extension of filter media surrounding and defining an open filter interior;
(b) first and second end pieces;
   (i) the media being positioned between the first and second end pieces;
   (ii) the first end piece having a central flow aperture therethrough in gas flow communication with the open filter interior;
   (iii) the first end piece including a perimeter rim having a portion projecting at least 3 mm toward the second end piece while completely surrounding the media; and,
   (iv) the second end piece having a closed external receiver therein projecting into the open filter and toward the first end piece a distance of at least 7 mm from an end of the media adjacent the second end piece;
(c) a housing seal arrangement positioned on the first end piece at a location with at least a portion of the housing seal arrangement completely surrounding the media; and,
(d) the first end piece including an outer surface with a projection arrangement projecting therefrom in a direction away from the media;
   (i) the projection arrangement comprising at least one projection member that projects to a location a distance of at least 10 mm from an adjacent portion of the first end piece, in a direction away from the media;
   (ii) the at least one projection member being arcuate and extending over a radial arc.

* * * * *